United States Patent [19]
Watanabe et al.

[11] Patent Number: 5,701,403
[45] Date of Patent: Dec. 23, 1997

[54] CAD SYSTEM

[75] Inventors: Hideo Watanabe; Satoru Boh; Akira Miyata; Keiichi Shiotani, all of Hyogo, Japan

[73] Assignee: Mitsubishi Denki Kabushiki Kaisha, Tokyo, Japan

[21] Appl. No.: 447,791

[22] Filed: May 23, 1995

[30] Foreign Application Priority Data

Jun. 3, 1994 [JP] Japan .................................. 6-122771

[51] Int. Cl.$^6$ .................................................. G06T 17/40
[52] U.S. Cl. ................. 395/119; 364/368.04; 364/368.09
[58] Field of Search .......................... 395/119, 127, 395/964, 133, 118; 364/474.24, 474.29, 578, 468.03, 464.04, 468.01, 468.04, 468.09, 468.1, 427.24, 427.29

[56] References Cited

FOREIGN PATENT DOCUMENTS 2-41573  2/1990  Japan .
4-111067 4/1992  Japan .

OTHER PUBLICATIONS

Dori, D., "Preprocessing of Engineering Drawings for 3D Reconstruction", *Systems Integration, 1990 1st International Conference*, pp. 285–293.

Dori, D. et al, "Paper Drawings to 3-D CAD: A Proposed Agenda", *Document Analysis, 1993 International Conference*, pp. 866–869.

Dori, Dov, "Dimensioning analysis: toward automatic understanding of engineering drawings", *Communications of the ACM*, v35, n10, pp. 92–104, Oct., 1992.

Vaxivière, P., et al, "Celesstin IV: Knowledge–Based Analysis of Mechanical Engineering Drawings", *Systems Engineering, 1993 International Conference*, pp. 242–245.

Vaxivière, P., et al, "Celesstion: CAD conversion of Mechenical Drawings", *Computer Magazine*, Jul. 92, pp. 46–54.

*Primary Examiner*—Joseph H. Feild
*Assistant Examiner*—Rudolph Buchel
*Attorney, Agent, or Firm*—Wolf, Greenfield & Sacks, P.C.

[57] ABSTRACT

The CAD system has a correspondence between predetermined drawing regulations and three-dimensional objects and a section for building a three-dimensional product model on the basis of a two-dimensional drawing, which is created under one of the predetermined drawing regulations, by reference to the correspondence. The building section can reconstruct a product model by reference to an attribute added to a view. In a preferred embodiment, the CAD system has predetermined rules each for relating a predetermined piece of information about drawings to a placement or a construction of a three-dimensional product model. When a command of placement is input and one predetermined piece of information is given, the building section arranges a two-dimensional projected figure or a two-dimensional drawn figure on a drawing in accordance with a predetermined rule by reference to information about a correspondence between the view and a corresponding three-dimensional product model to arrange the corresponding product model in three-dimensional model space in accordance with the placement of the two-dimensional projected figure.

21 Claims, 37 Drawing Sheets

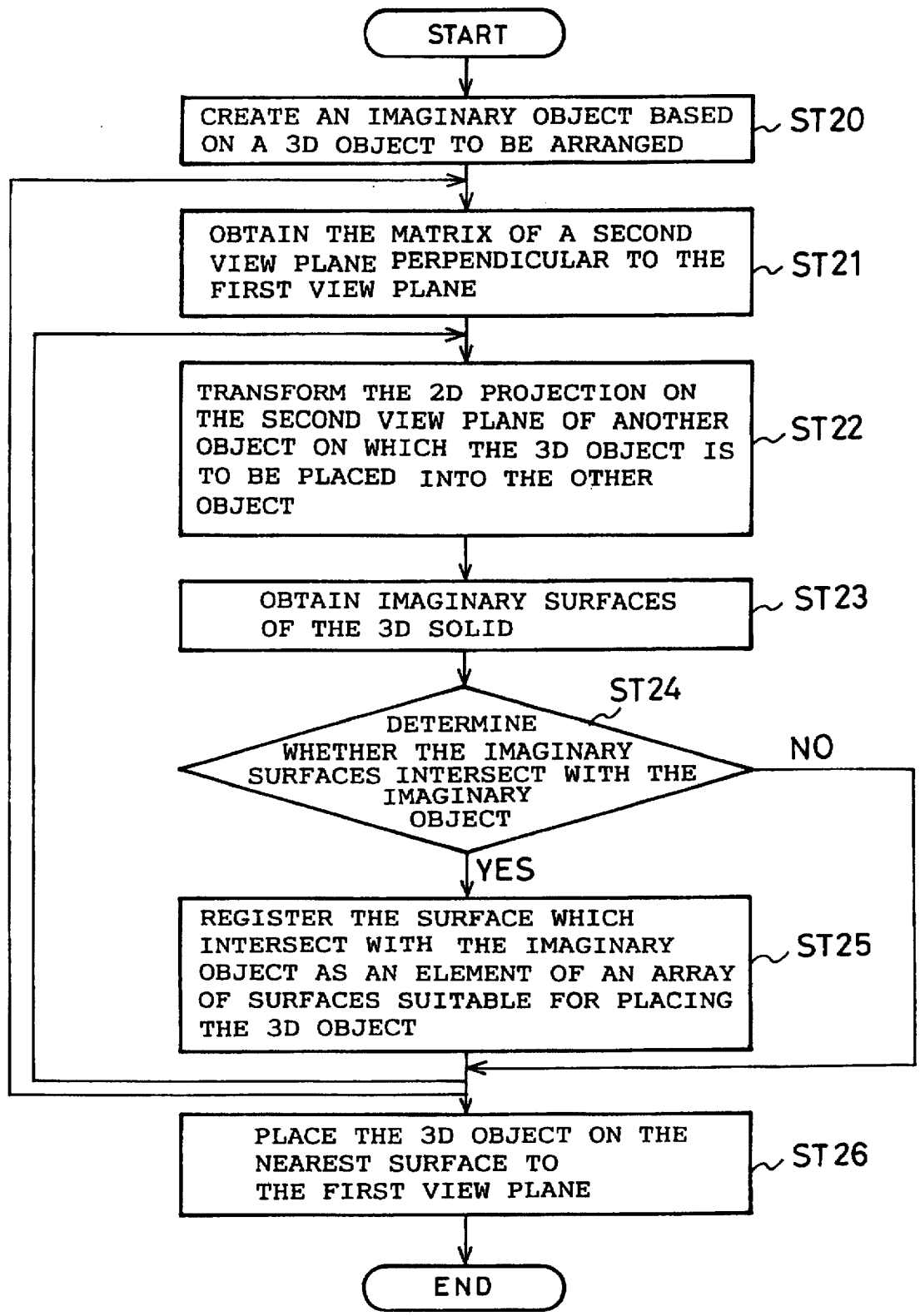

FIG 38
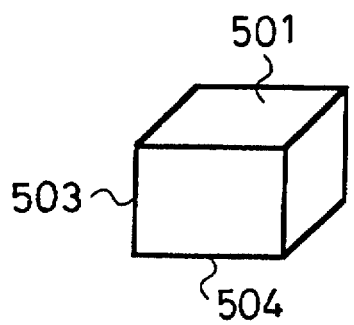
FIG 39
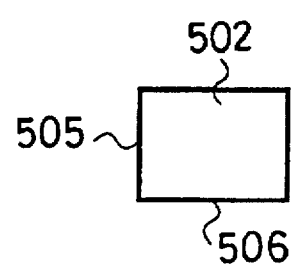
FIG. 40
| PART OF 3D OBJECT | PART OF 2D FIGURE | PROJECTION CONTROL FLAG |
|---|---|---|
|  |  |  |
| 5 0 3 | 5 0 5 | ON |
| 5 0 4 | 5 0 6 | ON |
|  |  |  |
FIG. 41
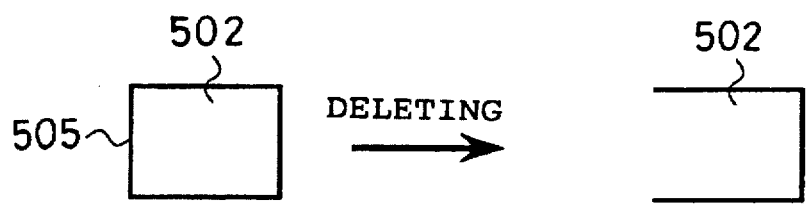

FIG. 42
| PART OF 3D OBJECT | PART OF 2D FIGURE | PROJECTION CONTROL FLAG |
|---|---|---|
|  |  |  |
| 5 0 3 | — | OFF |
| 5 0 4 | 5 0 6 | ON |
|  |  |  |
FIG. 43
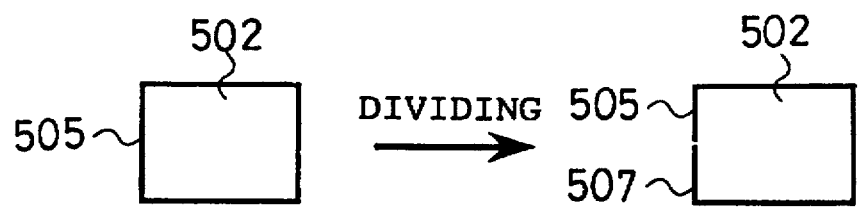
FIG. 44
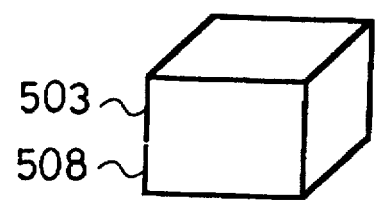

FIG. 45
| PART OF 3D OBJECT | PART OF 2D FIGURE | PROJECTION CONTROL FLAG |
|---|---|---|
|  |  |  |
| 5 0 3 | 5 0 5 | ON |
| 5 0 4 | 5 0 6 | ON |
| 5 0 8 | 5 0 7 | ON |
|  |  |  |
FIG. 46
FIG. 47
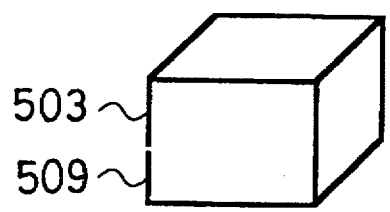

FIG.48
| PART OF 3D OBJECT | PART OF 2D FIGURE | PROJECTION CONTROL FLAG |
|---|---|---|
|  |  |  |
| 5 0 3 | 5 0 5 | ON |
| 5 0 4 | 5 0 6 | ON |
| 5 0 9 | — | OFF |
|  |  |  |
FIG.49
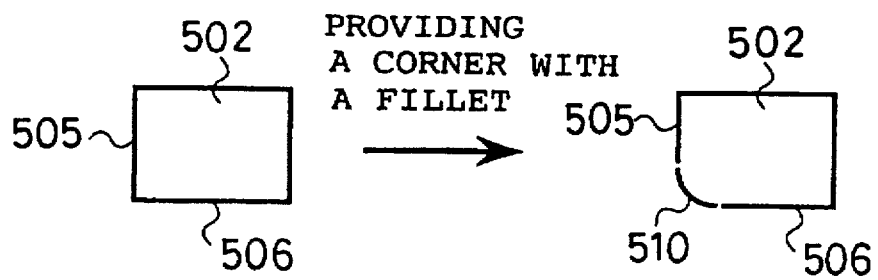
PROVIDING A CORNER WITH A FILLET
FIG.50
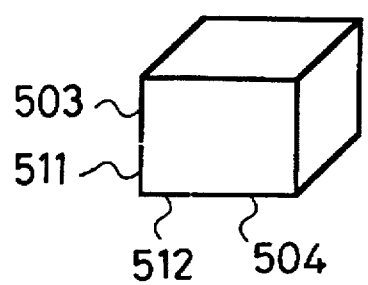

| PART OF 3D OBJECT | PART OF 2D FIGURE | PROJECTION CONTROL FLAG |
|---|---|---|
|  |  |  |
| 5 0 3 | 5 0 5 | ON |
| 5 0 4 | 5 0 6 | ON |
| 5 1 1 | — | OFF |
| 5 1 2 | — | OFF |
|  |  |  |

CAD SYSTEM

BACKGROUND ON THE INVENTION

1. Field of the Invention

The present invention relates to a CAD system which supports machine designs using a computer, and to a CAD system capable of manipulating both a two-dimensional drawn figure which is created by a user and a two-dimensional projected figure obtained by projection of a three-dimensional object on the same drawing by relating the figure to the view.

2. Description of the Prior Art

In general, a prior art CAD system for machine designs creates or modifies a drawing including a plurality of two-dimensional figures, such as multiple orthographic views, a cross-sectional view and the like, from a three-dimensional product model data, which is to be designed, having a shape data and an attribute data in order for users to reconsider or examine their design ideas and inform another person of their design ideas. Such a CAD system is able to automatically create plural views by projection of a corresponding three-dimensional product model. Therefore, an advantage is that users can perform a drafting task efficiently.

A CAD system has been proposed to perform a modification operation on a three-dimensional object in accordance with a modification to a two-dimensional projected figure, which has been obtained by projection of the object, by relating the view to the object, and to obtain new projections of the modified object in which the content of the modification to the three-dimensional object is reflected. Thus, when one orthographic view of an object is modified, the CAD system automatically modifies other orthographic views of the object. Hereinafter, a two-dimensional projection (or a projection), i.e., a two-dimensional projected figure (or a view) is referred to as a figure obtained by orthographic projection of a three-dimensional object onto a view plane. A two-dimensional drawn figure is referred to as a figure which is created by users. Furthermore, a two-dimensional figure may be a view or a figure which is created by users.

Referring now to FIG. 1, it illustrates a block diagram showing the structure of such a prior art CAD system, which is able to perform a modification operation on a three-dimensional object in accordance with a modification to a two-dimensional projected figure, which has been obtained by projection of the object, by relating the view to the object, disclosed in Japanese Patent Laying Open (KOKAI) No. 4-111 067. In the figure, reference numeral 31 denotes a graphical input device for inputting a figure by use of a command and data input by users, reference numeral 32 denotes a command processing section for interpreting an input command and input data, reference numerals 33 and 34 denote a 3D data management section and a 3D data display section which are enabled by the command processing section 32, respectively, reference numeral 35 denotes a 2D and 3D integration section which is enabled by the command processing section 32 and 3D data display section 34, reference numeral 36 denotes a 2D data management section which is enabled by the command processing section 32 and 2D and 3D integration section 35, reference numeral 37 denotes a 2D data display section which is enabled by the 2D data management section 36, reference numeral 38 denotes a graphic data storage device for storing data sent from the 3D data management section 33, 2D and 3D integration section 35 and 2D data management section 36, and reference numeral 39 denotes a graphics display device for displaying graphics according to a display instruction from the 3D data display section 34 or 2D data display section 37.

When one two-dimensional projected figure of a three-dimensional object is modified, the known CAD system with such the structure modifies the shape of the object in synchronization with a modification to the two-dimensional projected figure by mutually linking the three-dimensional shape of the object with the two-dimensional projection so as to modify the other two-dimensional projected figures in synchronization with the modification to the view.

In operation, when a user inputs a command and data with the graphical input device 31, the command processing section 32 interprets the command and data input through the graphical input device 31 and then enables the 3D data management section 33, 3D data display section 34, 2D and 3D integration section 35, 2D data management section 36 and 2D data display section 37 to create a desired product model and views of the product model in the CAD system.

The 3D data management section 33, which is enabled by the command processing section 32, reads and writes three-dimensional graphic data from and to the graphic data storage device 38. The 3D data display section 34 sends a three-dimensional graphical display instruction for displaying or erasing a three-dimensional object according to three-dimensional data produced or modified by the command processing section 32 to the Graphic data display section 34, and then it enables the 2D and 3D integration section 35 only if the two-dimensional data of views need to be manipulated in synchronization with the three-dimensional data of the object. If the 2D and 3D integration section 35 is enabled by the command processing section 32 or 3D data display section 34, it reads and writes 2D-3D link data from and to the Graphic data storage device 38 by synchronizing the two-dimensional data of views and the three-dimensional data of the object. If the 2D data management section 36 is enabled by the command processing section 32 or 2D and 3D integration section 35, it reads and writes two-dimensional figure data from and to the Graphic data storage device 38, and then it enables the 2D data display section 37. If the 2D data display section 37 is enabled by the 2D data management section 36, it receives the two-dimensional figure data transferred between the 2D data management section 36 and the Graphic data storage device 38 and then sends a two-dimensional Graphical display instruction for displaying or erasing a two-dimensional figure according to the two-dimensional figure data to the Graphic data storage device 39.

Thus, when a modification to a figure element, i.e., a part of a two-dimensional figure is started, the prior art CAD system determines whether the part to be modified of the two-dimensional figure is associated with an edge of a product model. If the part of the two-dimensional figure is not associated with any edge of product models, the command processing section 32 modifies the two-dimensional figure. If the part of the two-dimensional figure is associated with an edge of a product model, the command processing section 32 transforms the two-dimensional modifying operation into the corresponding three-dimensional modifying operation to change the three-dimensional data of the object, and then updates the two-dimensional data of views of the object according to the modification to the object. In this specification, "figure element" of a two-dimensional figure such as a two-dimensional projected figure is referred to as a part of the figure such as a curve, a point or the like, and "figure element" of a three-dimensional object is referred to as a part of the object such as an edge, a face or the like.

The prior art CAD system has information about a correspondence between two-dimensional projections and a three-dimensional object. The CAD system is adapted to determine the way of processing an edge of a three-dimensional product model which corresponds to a modified part of a projection of the product model on the basis of a command and data input on a two-dimensional drawing. To this end, the CAD system searches for the edge of the product model which corresponds to the modified part of the two-dimensional projected figure among internal data stored in the CAD system so as to modify the three-dimensional product model. Furthermore, the CAD system searches for the two-dimensional figure elements of other views which correspond to the edge of the modified three-dimensional object among internal data stored in the CAD system so as to automatically update the two-dimensional figure data of the drawing.

While such the prior art CAD system can eliminate a inconsistency between views dramatically, it suffers form the following disadvantages. The CAD system is merely provided with a correspondence between two-dimensional data such as two-dimensional geometric figure elements, e.g., points, line segments in two dimensional space and three-dimensional data such as three-dimensional geometric figure elements, edges of a solid object. Therefore, the CAD system is not able to create or modify a drawing which is finally obtained by a drafting task by using a drawing symbol illustrated on a drawing, drawing practice or drawing custom which govern ways of drawing figures characteristic of mechanical drafting.

Furthermore, the CAD system has a command for modifying a three-dimensional object according to a modification to a two-dimensional figure element, however, it has no function of utilizing a two-dimensional figure for the creation of a three-dimensional object. The CAD system merely modifies edges and surfaces in three dimensional space in accordance with a modifying operation in two dimensional space. There are some cases in which the CAD system cannot modify the shape of a product model in three dimensional space under the condition that elements in two dimensional space are simply converted into ones in three dimensional space so that the two dimensional space extends to the three dimensional space. For example, deleting an edge of a three-dimensional object or a surface of an object according to a deleting of a line segment of a view of the object is not suitable for a three-dimensional operation. Therefore, there is nothing that the prior art CAD system can do except inhibit itself from performing a modification to a view which cannot be simply transformed into a modification to a corresponding object in three space. As a result, the flexibility of two-dimensional modifying operations on a view instructed by users gets worse.

Since the CAD system does not consider a mutual relationship between a two-dimensional drawn figure, which is created by a user and is not associated with a three-dimensional object, and a two-dimensional projected figure obtained by projection of a three-dimensional object on a view plane, a drawing including a two-dimensional drawn figure and a two-dimensional projection, which has been drawn according to a user's intention, may be changed into the one, which does not match another user's intention of modifying the drawing, due to modifications to the view and the product model which is the source of the view. Furthermore, since the operation of creating views from a product model is performed on only edges of the product model, a silhouette curve of a three-dimensional surface of a object cannot be reflected in any one of two-dimensional projections of the object. In such a case, the CAD system cannot establish a correspondence between two-dimensional projected figures and a three-dimensional curved surface. For example, no two-dimensional projection is obtained by projection of a sphere, and therefore no two-dimensional operation is performed on a sphere. Furthermore, since the CAD system performs a placement operation of arranging a three-dimensional object in three-dimensional model space by positioning only one projection of the object on a view plane, the place where the three-dimensional object can be arranged is limited to the view plane.

SUMMARY OF THE INVENTION

It is therefore an object of the present invention to provide a CAD system adapted to consider a mutual relationship between figure elements of a two-dimensional drawing and the shape of a three-dimensional product model together with drawing regulations, efficiently reconstruct a three-dimensional object, i.e., a product model from two-dimensional projected figures, and automatically create views such as a front view, a top view (or plane view) and a right side view from a product model.

It is a further object of the present invention to provide a CAD system capable of creating a product model and views according to a user's intention by guessing it.

It is a still further object of the present invention to provide a CAD system capable of creating and modifying a three-dimensional object by using a two-dimensional drawn figure which is created by users and a two-dimensional projected figure, modifying both of the figure and the view without discrimination and with no limit to a modifying operation on the view, and simply performing an operation of arranging an object in three space by utilizing a correspondence between information about drawings and information of three-dimensional objects.

It is a further object of the present invention to provide a CAD system which creates the outline of an object using a two-dimensional drawn figure which is created by users or a two-dimensional projected figure, forms the shape of the object by providing the outline with a thickness or rotating the outline or directly creates the shape of the object, e.g., a cuboid object, a cylinder-shaped object, etc, and automatically creates a plurality of views by projection of the solid object onto plural view planes.

It is a still further object of the present invention to provide a CAD system capable of modifying both a two-dimensional drawn figure which is added to a drawing by users and a two-dimensional projected figure automatically created without discrimination when reconstructing a product model or modifying a two-dimensional drawing.

It is a further object of the present invention to provide a CAD system capable of automatically modifying a two-dimensional drawn figure which is created by users in accordance with a two-dimensional projected figure modified due to a modification to a solid object.

It is a still further object of the present invention to provide a CAD system which automatically computes the placement parameters required for a placement operation of arranging a thee-dimensional object in three space by utilizing information about a correspondence between information about drawings and drawing regulations, information about three-dimensional objects, and information about a relationship between two-dimensional data and three-dimensional data, and therefore reduces the amount of input operations carried out by users.

According the present invention, there is provided a CAD system comprising a section for defining a correspondence between predetermined drawing regulations and three-dimensional objects and a section for building a three-dimensional product model on the basis of a two-dimensional drawing, which is created under one of the predetermined drawing regulations, by reference to the defining section.

In operation, the product model building section constructs a product model by use of graphic data or annotations on a drawing by reference to placement rules governing the CAD drafting, and hence it provides a CAD environment in which users are able to build a three-dimensional product model .as if to create a drawing in a general drawing situation.

According to a preferred embodiment of the invention, the CAD system comprises a section, responsive to an instruction input by users, for providing a two-dimensional drawing with a shape attribute for showing a three-dimensional shape of a corresponding product model. Further, the product model building section forms a shape of a product model in accordance with a shape attribute added to a view of the product model. Thus, since the CAD system according to an embodiment of the present invention makes it possible to build a product model in accordance with attributes provided by users, users are able to construct a product model by using terms which are familiar to users.

Preferably, the CAD system further comprises a section for creating a plurality of views of a three-dimensional product model constructed by the building section by reference to the defining section and in accordance with a shape attribute added to a view of the product model. The creating section automatically creates a plurality of views such as a front view, a top view and a right side view from a product model, thereby providing users with a drawing including views easily understandable.

According to a preferred embodiment, the building section includes a section for modifying a product model in accordance with a modification to a view of the product model. The view creating section creates other views of the product model modified by the modifying section using a drawing regulation. When a view is modified by the modifying section, the view creating section automatically creates other views, such as a top view, a front view, a right side view or the like of the product model which is the source of the modified view. Thus, users are able to perform a modifying operation on a view leaving a relationship between views out of consideration. Furthermore, users do not need to perform a further modifying operation on other views.

Furthermore, according to the present invention, there is provided a CAD system comprising a projection section for creating two-dimensional projected figures by projection of a three-dimensional product model, a section for storing information about a correspondence between two-dimensional projected figures and a three-dimensional product model which is the origin of the two-dimensional projected figures, a section for defining rules each for relating a predetermined piece of information about drawings to a placement or a construction of a three-dimensional product model, and a section, responsive to an input command of placement and one predetermined piece of information given, for arranging a two-dimensional projected figure, which is the target of the input command, on a drawing in accordance with a rule which corresponds to the given piece of information and by reference to information about a correspondence between the view and a corresponding three-dimensional product model stored in the storing section, and for arranging the corresponding product model in three-dimensional model space in accordance with the placement of the two-dimensional projected figure.

In operation, the production building section issues a instruction of performing a three-dimensional placement operation for arranging an object in three-dimensional model space by using information about two-dimensional drawings input by users. The CAD system determines whether or not the input information about drawings corresponds to one of the rules, that is, it guesses the user's intention, i.e., the idea of what a user is going to do with the information. The CAD system specifies the user's intention by reference to the 2D-3D correspondence information stored in the storing section, e.g., by comparing the input drawing information with the shape of a three-dimensional object which is the target of the placement operation. Thus, the CAD system determines the three-dimensional placement parameters for the placement operation by utilizing information about drawing regulations, information about drawings which has been created on a two-dimensional drawing and information about shapes of solid objects so as to arrange a three-dimensional object in three dimensional space, thereby reducing the amount of input processes and input data required for the three-dimensional placement.

According to a preferred embodiment of the invention, the defining section defines a rule for relating an annotation such as a symbol, note or the like shown on a drawing as one determined piece of information about drawings to a placement of a two-dimensional projected figure on the drawing which is the target of the input command so as to arrange a corresponding product model in three-dimensional model space. When users inputs an instruction of arranging a solid object by selecting or referring to an annotation on a view, the product model building section determines the three-dimensional placement parameters for the placement operation to arrange the solid object, which corresponds to the two-dimensional projected figure to be arranged, in accordance with the placement rule defined by the annotation. When a command of moving a view is input, a figure element, e.g. a side of the two-dimensional projected figure to be arranged, and a point on the view and a point to which the view is moved for determining the amount of movement are also input. Thereby the amount of input processes and input data required for the three-dimensional placement can be reduced. Preferably, the annotation is any one of characters or a symbol for showing an absolute direction in three-dimensional model space or a direction relative to a two-dimensional figure, and a symbol for showing a shape of a corresponding product model.

According to a preferred embodiment of the invention, the defining section defines a rule for relating a predetermined two-dimensional figure such as a dashed line segment, a dashed cross line or the like, which is based on a drawing method defined by drawing regulations, input by users as one predetermined piece of information about drawings to a placement of a two-dimensional projected figure on a drawing which is the target of the input command so as to arrange a corresponding product model in three-dimensional model space. When users input an instruction of arranging a solid object by inputting a two-dimensional figure element, which is one for restricting the placement operation on the solid object based on a drawing regulation, the CAD system computes the axis and surfaces of the corresponding three-dimensional product model in three space from the information about the view plane and the position of the selected figure element on the view plane. Then, the CAD system computes the origin and angles of the product model to be arranged from the shape information about the three-dimensional product model in consideration of the drawing regulation about the figure element. Thus, the calculation is performed by use of the two-dimensional drawing information and the drawing regulation to obtain the geometric information about the product model in three space. The CAD system determines the three-dimensional placement parameters on the basis of the above two calculating results, thereby reducing the amount of input processes and input data required for such the three-dimensional placement. Preferably, when one predetermined piece of information about drawings is given on a two-dimensional projected figure of an existing three-dimensional object on a view plane, the building section creates and arranges a two-dimensional projection of another three-dimensional object on the former view in accordance with the given piece of information about drawings, and, in order to determine a position of the other three-dimensional object in a direction perpendicular to the view plane, the building section searches for at least a surface of the existing three-dimensional object which intersects with a three-dimensional figure obtained by indefinitely extending the other object in the direction.

According to a preferred embodiment of the invention, the defining section defines a rule for relating at least a two-dimensional figure on a drawing and at least a part of a three-dimensional object which are selected as one predetermined piece of information about drawings by users by establishing a correspondence between the two-dimensional figure and the part of the three-dimensional object to a placement of a two-dimensional projected figure of the object on the drawing for making the view overlap the two-dimensional figure so as to arrange the corresponding object in three-dimensional model space. When users inputs an instruction of arranging a solid object by selecting a two-dimensional figure element, the CAD system automatically establishes a correspondence between the solid object, which users intend to arrange, and the two-dimensional figure element, which users select, on the basis of the shapes of the product model and two-dimensional figure element. Then, the CAD system computes the axis and surfaces of the object in three space from the information about the view plane and the position of the selected two-dimensional figure element on the view plane. Furthermore, the CAD system computes the origin and angles of the object in three space to be arranged on the basis of the information about the view plane and the shape information about the two-dimensional figure element in consideration of the type of plane geometric projection. The CAD system determines the three-dimensional placement parameters on the basis of the above two calculating results, thereby reducing the time required for the calculation of three-dimensional placement parameters, and reducing the amount of input operations and input data required for the three-dimensional placement operations. The defining section defines a rule for relating at least a two-dimensional figure on a drawing and at least a part of a three-dimensional object which are selected as one piece of information about drawings by users by establishing a correspondence between the two-dimensional figure and the part of the three-dimensional object to a placement of a two-dimensional projected figure of the object on the drawing for making the center of the view overlap the center of the two-dimensional figure so as to arrange the corresponding object in three-dimensional model space.

According to a preferred embodiment of the invention, the defining section defines a rule for relating at least a two-dimensional figure and at least a part of a two-dimensional figure on a view plane which are selected as one piece of information about drawings by users by establishing a correspondence between the parts of the two-dimensional figures to a placement of the two-dimensional figures on the view plane for making the part of one of the two-dimensional figures abut on the part of the other figure and for arranging corresponding objects in three-dimensional model space in consideration of other two-dimensional figures of the objects on another view plane, at least one of which is obtained by projection of the corresponding object, which correspond to the former two-dimensional figures, respectively. When users inputs an instruction of arranging a first solid object by selecting two-dimensional figure elements of a second solid object, the CAD system compares the information about the first view plane, on which the selected two-dimensional figure elements of the second object having a correspondence with the figure elements of the first object are drawn, with information about another view plane, and compares the positions of the figure elements of the first solid object on the first view plane with the positions of the selected two-dimensional figure elements of the second solid object on the other view plane so as to extract the two-dimensional figure on the second view plane which corresponds to the two-dimensional figure elements of the first solid object having the above correspondence with the two-dimensional figure elements of the second solid object. Furthermore, the CAD system compares the extracted figure with the figure on the second view plane which corresponds to the selected two-dimensional elements of the second object to determine the position of the extracted figure on the other view plane. The CAD system obtains information about dimensions of the solid object with respect to the direction of depth perpendicular to the first view plane required for arranging the three-dimensional object on the second two-dimensional view plane to determine the three-dimensional placement parameters. Thus, users do not need to designate figure elements and coordinates of solid objects to be arranged on plural view planes. The amount of input data required for such the three-dimensional placement operation can be reduced.

According to a preferred embodiment of the invention, the CAD system further comprises a section for providing an edge of a three-dimensional product model with a shape attribute showing a detailed shape such as a fillet, a chamfer or the like. When creating two-dimensional projected figures from a constructed product model, the projection section creates them in accordance with a shape attribute added to the product model so that a projection of an edge with the shape attribute has a corresponding detailed shape. The CAD system provides an edge of a product model with a detailed shape such as a fillet or chamfer. That is, when forming a fillet or a chamfer with a two-dimensional modifying operation, if the target of the modification is a two-dimensional figure, the CAD system modifies the two-dimensional figure with a two-dimensional drawing function. If the target of the modification is a two-dimensional projected figure, the CAD system judges that the forming is directed to a modification to the corresponding product model for providing an edge with a fillet or a chamfer, and then providing an edge of the corresponding product model with a shape attribute such as a fillet attribute or a chamfer attribute without performing a three-dimensional shaping operation to form the detailed shape of the product model. When projecting the product model onto view planes, the projection section recreates the view in accordance with shape attribute data added to the product model. Therefore, the CAD system can eliminate a three-dimensional forming process to provide a product model with a fillet or a chamfer. Furthermore, if users intend to obtain the original shape of a product model by cancelling all the particular shapes of details of the object, the user only erases all the shape attributes. Thereby the load of the CAD system is lightened. In addition, the CAD system can easily draw shaded lines required for realistically showing the detailed shape of an object on a view plane to realize the realistic expression of details of a object on a two-dimensional drawing.

According to a preferred embodiment of the invention, the CAD system further comprises a section, according to a modification to a part of a two-dimensional projected figure of a three-dimensional product model, for providing an edge of the product model, which corresponds to the part of the view, with a projection attribute showing a way of projection of the edge on a view plane, which depends on the modification to the two-dimensional projected figure, and wherein when creating two-dimensional projected figures from a constructed product model the projection section creates them in accordance with a projection attribute added to the product model. When a two-dimensional figure is modified, if the modified figure is a two-dimensional drawn figure which is created by the user, the CAD system modifies the two-dimensional drawn figure by use of the two-dimensional drawing function of the CAD system. In the case that the modified two-dimensional figure is a two-dimensional projection of a product model, the CAD system determines the way of modifying the three-dimensional object according to the modification to the two-dimensional projected figure from the figure elements of the product model which correspond to the modified part of the two-dimensional projection and by reference to the information about the modification to the projection to obtain a processing procedure to realize the modification to the product model. Then, the CAD system performs the modification process on the product model. Furthermore, the CAD system obtains the processing procedure to recreate a two-dimensional projected figure which satisfies the two-dimensional modification made by the user and then performs the two-dimensional projection on the product model. Thus, the CAD system transforms a modification to a two-dimensional projected figure into modifications to the corresponding three-dimensional object and other views according to the user's intention. As a result, users do not need to conceive an operation to modify the shape of a three-dimensional object so as to obtain the desired shape of a two-dimensional projected figure of the three-dimensional object. In addition, there is no limit to modifying operations to a two-dimensional projected figure.

Preferably, the CAD system comprises a modifying section, according to a connection of a two-dimensional figure with a modified two-dimensional projected figure, for creating a three-dimensional figure which is connected with a three-dimensional object which corresponds to the modified two-dimensional projected figure from the added two-dimensional figure by reference to information about the connection between the two-dimensional projected figure and the two-dimensional figure and information about projection attributes. When ends of the two-dimensional drawn figure created by a user is connected with ends of an opened loop a part of which is deleted or cut off due to a modification to a two-dimensional projected figure so as to create a closed loop composed of the opened loop, which corresponds to the modified view, and the two-dimensional figure, the CAD system transforms the two-dimensional modifying operation into a local operation of adding a corresponding three-dimensional object to the existing object in order to obtain a three-dimensional modifying operation. Therefore, users are able to perform such the three-dimensional operation without thinking of a complicated three-dimensional operation required for such a local operation when modifying a product model.

According to a preferred embodiment of the invention, the CAD system comprises a section for modifying a two-dimensional figure which is associated with a two-dimensional projected figure in accordance with a modification to the view and by reference to information about a relationship between the two-dimensional figure and the two-dimensional projected figure before the modification is performed and information about a correspondence between the modified two-dimensional projected figure and a corresponding product model stored in the storing section. If a two-dimensional projected figure, which is in contact with a two-dimensional drawn figure drawn by a user, is modified, the CAD system automatically performs a modification operation on the two-dimensional figure linked with the modification to the view by reference to the information about the connection between the two-dimensional projection and the two-dimensional figure. That is, the CAD system is adapted to move a two-dimensional drawn figure element which is drawn by a user in accordance with a modification to a two-dimensional figure element which belongs to a projection of a product model and in consideration of a connection between the two-dimensional figure element and the two-dimensional projected figure element. Thus, the CAD system automatically modify not only other projections but also a two-dimensional drawn figure which has a close relationship with the modified projection in connection with the modification to the two-dimensional projected figure. Thereby, users do not need to modify the two-dimensional drawn figure which has a close relationship with the modified projection.

Further objects and advantages of the present invention will be apparent from the following description of the preferred embodiments of the invention as illustrated in the accompanying drawings.

BRIEF DESCRIPTION OF THE DRAWINGS

FIG. 21 is a flow diagram showing the placement operation in the direction of depth shown in FIGS. 19(a) to 20(b).

FIG. 38 is a diagram showing a solid object on which a modification is performed by a CAD system according to another embodiment.

FIG. 39 is a view showing an example of a view on which a modification is performed by the CAD system.

FIG. 40 is a part of a table showing projection control flags of two-dimensional figure elements of the view in FIG. 39.

FIG. 41 is a diagram explaining a modifying operation on the view in FIG. 39.

FIG. 42 is a part of a table showing projection control flags of two-dimensional figure elements of the modified view in FIG. 41.

FIG. 43 is a diagram explaining a modifying operation on the view in FIG. 39.

FIG. 44 is a diagram showing the solid object which corresponds to the modified view in FIG. 43.

FIG. 45 is a part of a table showing projection control flags of two-dimensional figure elements of the modified view in FIG. 43.

FIG. 46 is a diagram explaining a modifying operation on the view in FIG. 39.

FIG. 47 is a diagram showing the solid object which corresponds to the modified view in FIG. 46.

FIG. 48 is a part of a table showing projection control flags of two-dimensional figure elements of the modified view in FIG. 46.

FIG. 49 is a diagram explaining a modifying operation on the view in FIG. 39.

FIG. 50 is a diagram showing the solid object which corresponds to the modified view in FIG. 49.

DETAILED DESCRIPTION OF THE PREFERRED EMBODIMENTS

Figure 1:
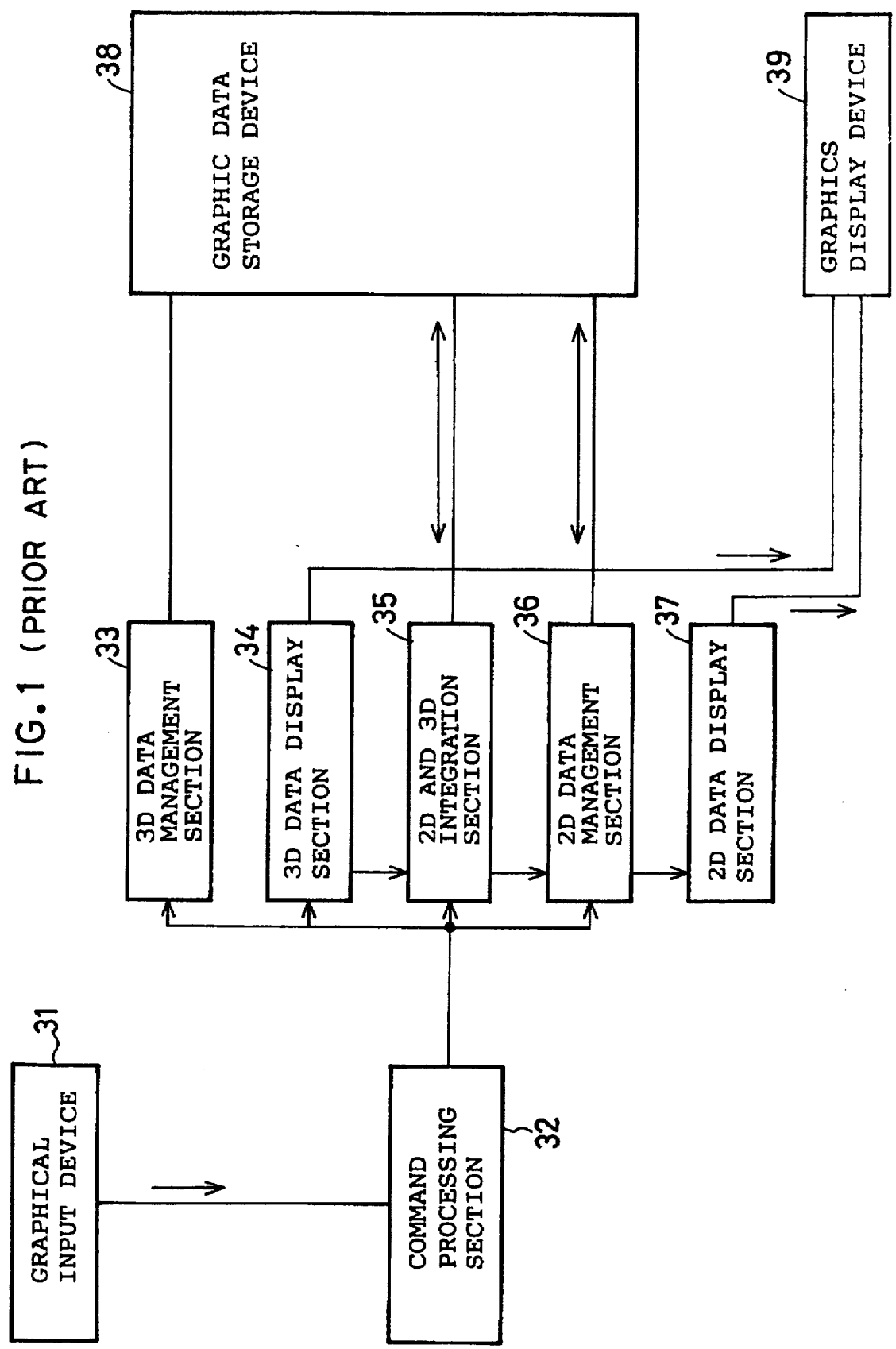
FIG. 1 is a block diagram showing the structure of a prior art CAD system.
Figure 2:
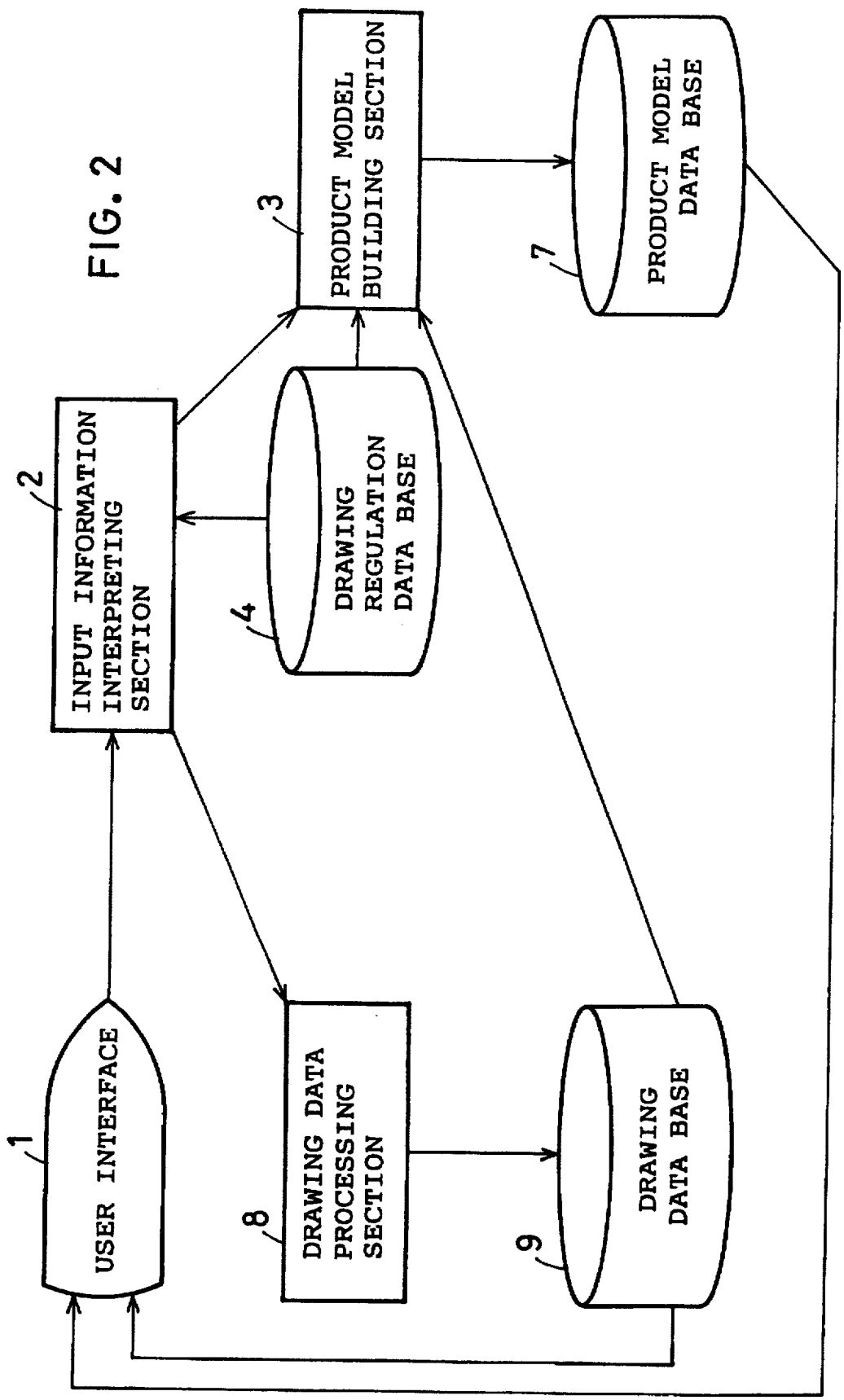
FIG. 2 is a block diagram of a CAD system according to an embodiment of the present invention.

Referring now to FIG. 2, it illustrates a schematic block diagram of a CAD system according to an embodiment of the present invention. In the figure, reference numeral 1 denotes a user interface for receiving a command input by users and for providing users with a two-dimensional drawing and a three-dimensional object. Reference numeral 2 denotes an input information interpreting section for interpreting the content of a command input by users to enable specified processing sections according to the input command, reference numeral 3 denotes a product model building section which is allowed by the input information interpreting section 2 to construct a product model represented by a three-dimensional figure, and reference numeral 4 denotes a drawing regulation data base for storing data showing a correspondence between drawing regulations and drawings in the CAD system, that is, a relationship between drawing regulations such as drawing symbols based on JIS standard, ISO standard and the like and drawing annotations, and how such drawing regulations are embodied on a drawing in this CAD system.

Reference numeral 7 denotes a product model data base for storing data which represent the shape of a product model created by the product model building section 3, reference numeral 8 denotes a drawing data processing section which is allowed by the input information interpreting section 2 to create a two-dimensional drawing, and reference numeral 9 denotes a drawing data base for storing two-dimensional drawing data produced by the drawing data processing section 8. The input information interpreting section 2, product model building section 3 and drawing data processing section 8 are embodied by a CPU and programs included in a computer such as a workstation. The user interface 1 is embodied by an input device and a graphics display included in the same computer. The product model data base 7 and drawing data base 9 are embodied by a storage device or an auxiliary storage device included in the same computer.

The input information interpreting section 2 interprets a command which is input by users with the user interface 1. When the input information interpreting section 2 determines that the command is concerned with the creation of a two-dimensional drawing, it enables the drawing data processing section 8. Then, the drawing data processing section 8 creates a two-dimensional drawing through interactive input/output operations between users and the CAD system and stores the drawing data of the created two-dimensional drawing in the drawing data base 9.

When the input information interpreting section 2 determines that the input command is concerned with the creation of a product model, it enables the product model building section 3. Then, the product model building section 3 creates a product model by using data, which are input in turn by users, the input command, data stored in the drawing regulation data base 4 for defining a correspondence between drawing regulations and drawings, and drawing data stored in the drawing data base 9. After that, the product model building section 3 stores the product model data, which corresponds to the product model, in the product model data base 7.

When the command is concerned with a modification to a product model, the product model building section 3 retrieves a corresponding product model data from the product model storage section 7 and then modifies it. After that, the product model building section 3 stores the modifies product model data in the product model data base 7.

Figure 3:
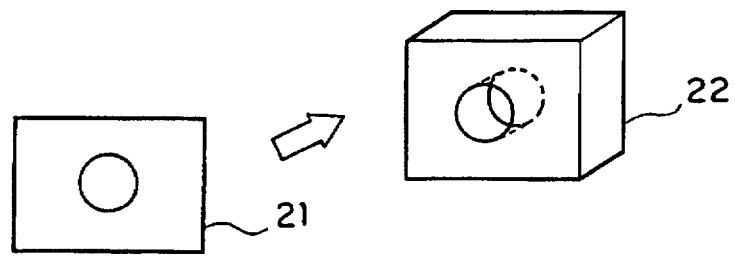
FIG. 3 is a view for explaining an operation of the product model building section.
Figure 11:
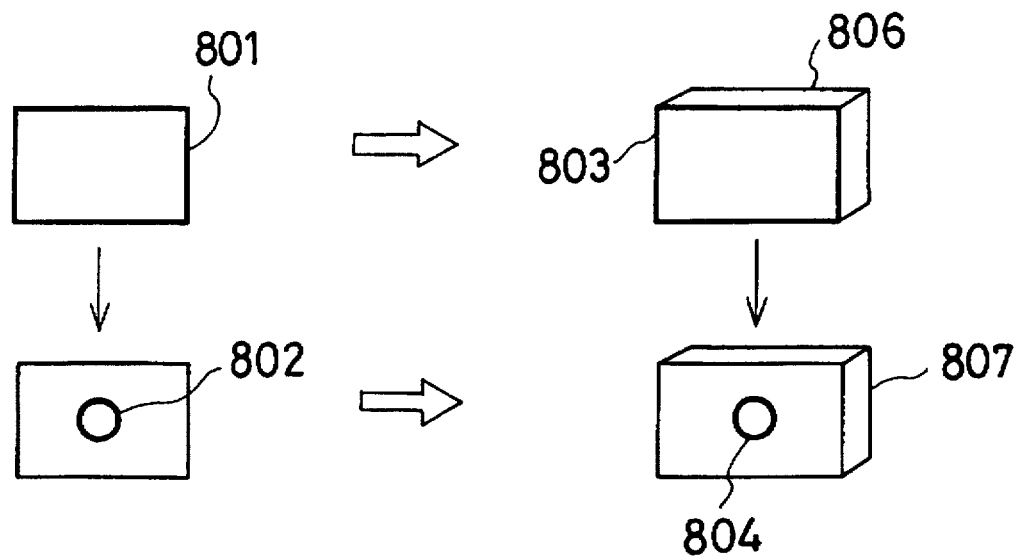
FIGS. 11(a) and 11(b) are views explaining the operation of another embodiment of the present invention.
Figure 11:
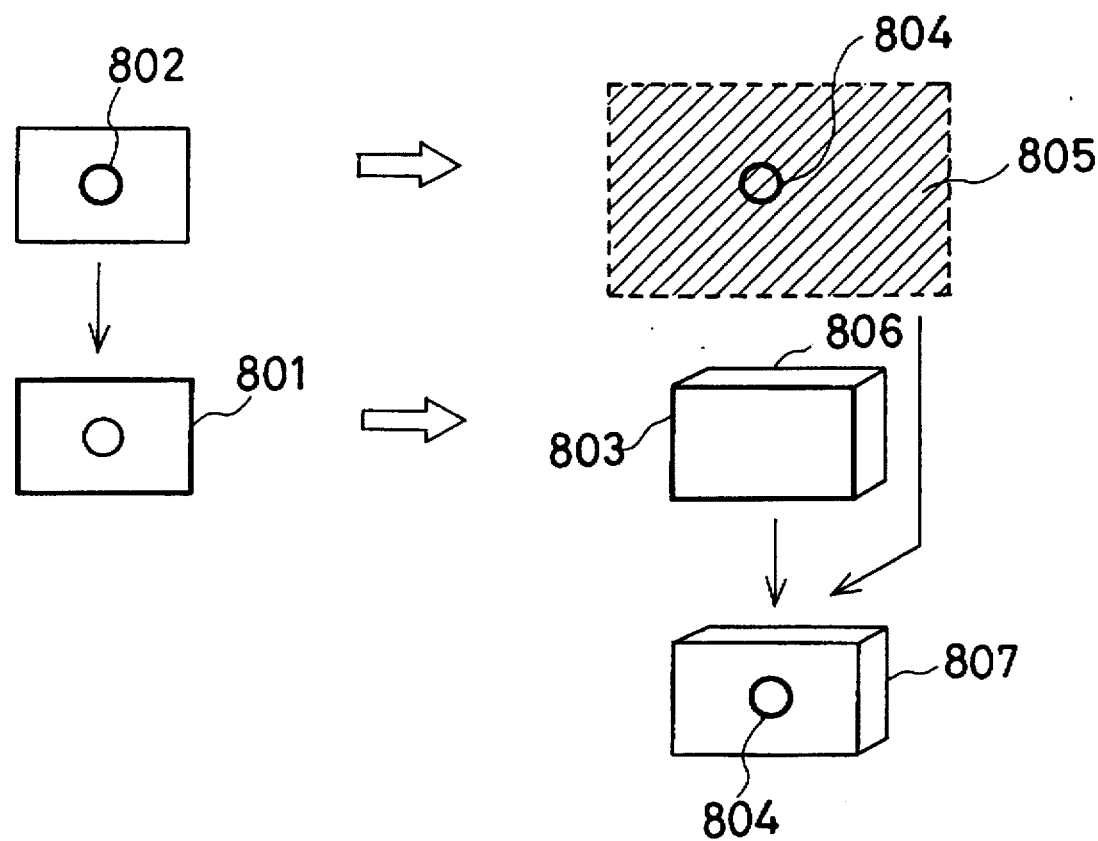

Referring now to FIG. 3, it illustrates a two-dimensional figure and a corresponding three-dimensional object which is created by the product model building section 3. Consider that a two-dimensional drawing including a FIG. 21 as shown in FIG. 3 has been created by the drawing data processing section 8 and its drawing data are stored in the drawing data base 9. When a user provides the drawing data with information about the thickness of the two-dimensional FIG. 21 and a shape attribute which describes a characteristic feature of the corresponding product model, e.g., one which shows that a circle in the two-dimensional figure shown in FIG. 3 is the projection of a penetrating hole of the corresponding object, and the user inputs a command which requests the reconstruction of the product model, the product model building section 3 creates the product model having the three-dimensional shape 22. Then, the product model building section 3 stores the data about the product model in the product model data base 7. Shape attributes will be explained in detail later by reference to FIG. 11.

According to a preferred embodiment of the present invention, the product model building section 3 can create a product model by reference to not only attribute data or the like which are input by users, but also data for defining a correspondence between drawing regulations and drawings to be illustrated stored in the drawing regulation data base 4. For example, consider that a half circle-shaped figure and a drawing symbol representing a Gear are drawn as a two-dimensional drawing by a user, as shown in the left-hand side of FIG. 4(a). When a user inputs a command which requests the creation of a corresponding product model from the two-dimensional figure shown in the left-side of FIG. 4(a), the input information interpreting section 2 enables the product model building section 3. In this case, the product model building section 3 finds a two-dimensional figure which is illustrated according to the drawing regulation about gears (in JIS standard, the addendum circle is drawn with a thick continuous line, the pitch circle is drawn with a dashed line, and the bottom circle is drawn with a fine continuous line) in the two-dimensional drawing data of the drawing and then searches for the data for defining a correspondence between the drawing regulation and the two-dimensional drawing to be illustrated stored in the drawing regulation data base 4. The product model building section 3 creates the corresponding three-dimensional product model having the real gear shape as shown in the right-hand side of FIG. 4(a) using the gear library in the data base 4 for defining a correspondence between drawing regulations and drawings to be illustrated. In the gear library, data for defining a correspondence between the drawing regulation about gears and the real gear shape data have been registered. The product model building section 3 stores the product model data which represent the created product model in the product model data base 7 together with a data which shows that the product model is a gear.

Figure 4:
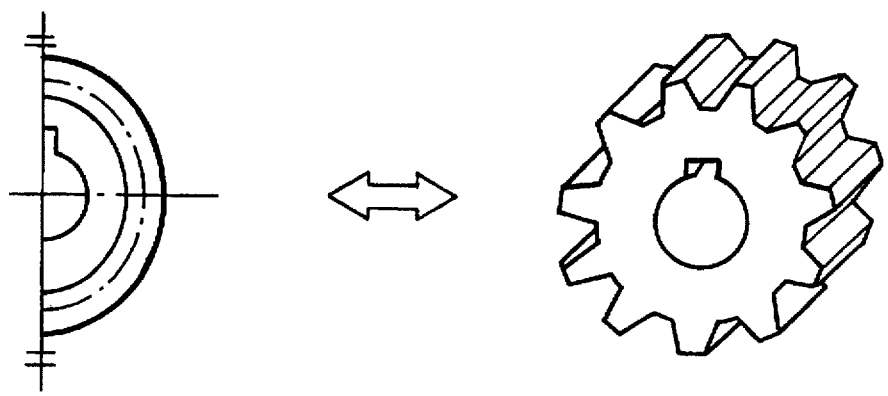
FIGS. 4(a)–4(c) are views each showing a correspondence between a two-dimensional figures created under a drawing regulation about shape and a product model.
Figure 4:
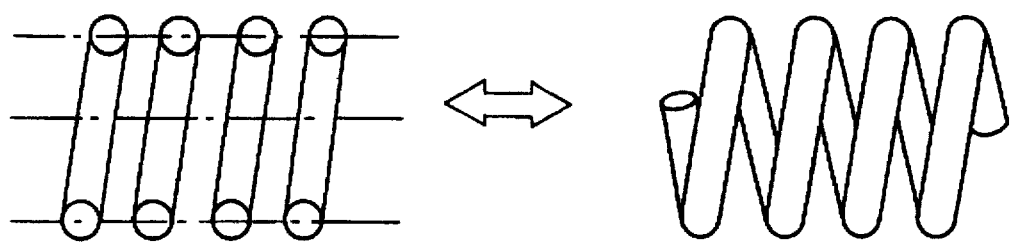
Figure 4:
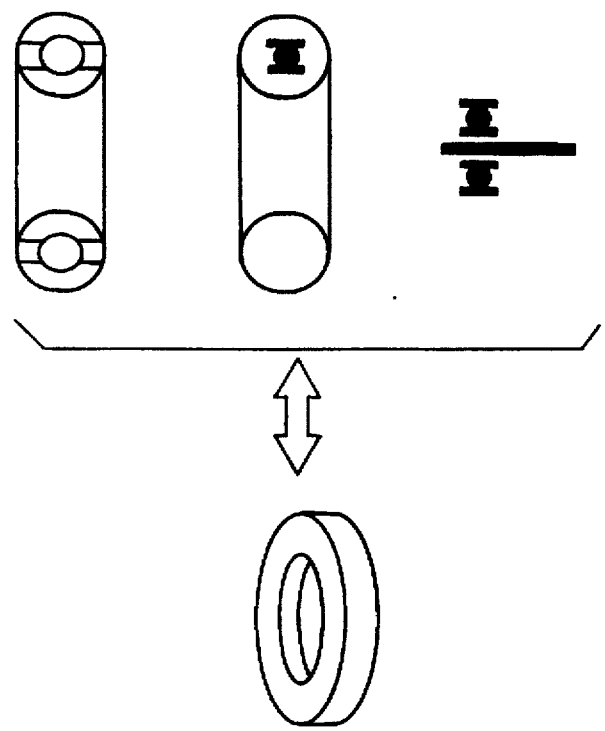

In the case of a two-dimensional figure which is drawn on a two-dimensional drawing by a user in accordance with the drawing regulation of springs, as shown in the left-hand side of FIG. 4(b), the product model building section 3 creates the corresponding three-dimensional product model having the real spring shape as shown in the right-hand side of FIG. 4(b) using the spring library in the data base 4 for defining a correspondence between drawing regulations and drawings to be illustrated.

In the case of a two-dimensional figure which is drawn on a two-dimensional drawing by a user in accordance with the drawing regulation of bearings, as shown in the left-hand side of FIG. 4(c), the product model building section 3 creates the corresponding three-dimensional product model having the real bearing shape as shown in the right-hand side of FIG. 4(c) using the bearing library in the data base 4 for defining a correspondence between drawing regulations and drawings to be illustrated. In this case, a plurality of methods of drawing a bearing on a two-dimensional drawing are applicable, but any one of the plurality of methods will create the same product model if the dimensions of two-dimensional drawings created by means of the different methods are the same.

A similar process will be performed for another drawing regulation. That is, when the product model building section 3 detects a two-dimensional figure created on the basis of a drawing regulation on a two-dimensional drawing, it searches data for defining a correspondence between drawing regulations and drawings to be illustrated stored in the drawing regulation data base 4 to obtain a drafting concept which corresponds to the drawing regulation. Then, the product model building section 3 reconstructs an object having the shape which corresponds to the drafting concept.

The product model building section 3 can handle not only drawing regulations about three-dimensional shapes but also drawing regulations about dimensions. For example, consider that a rectangular figure and a dimension symbol $\phi$ representing diameter are drawn on a two-dimensional drawing by a user, as shown in the left-hand side of FIG. 5(a). When the user inputs a command which requests the creation of a corresponding product model from the two-dimensional figure, the input information interpreting section 2 enables the product model building section 3. In this case, the product model building section 3 finds the dimension symbol $\phi$ which shows a diameter in the two-dimensional drawing data of the drawing and then searches data for defining a correspondence between drawing regulations and drawings to be illustrated stored in the drawing regulation data base 4. A data showing that the $\phi$ is concerned with the drawing regulation about diameters has been stored in the data base 4 for defining a correspondence between drawing regulations and drawings to be illustrated. The product model building section 3 creates the corresponding product model having the cylindrical shape as shown in the right-hand side of FIG. 5(a) using the drawing regulation about diameters stored in the drawing regulation data base 4 for defining a correspondence between drawing regulations and drawings to be illustrated.

Figure 5:
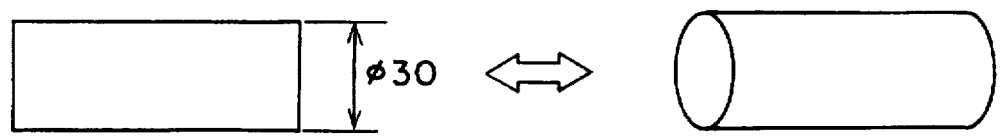
FIGS. 5(a)–5(c) are views each showing a correspondence between a two-dimensional figure created with a drawing symbol about dimensions and a product model.
Figure 5:
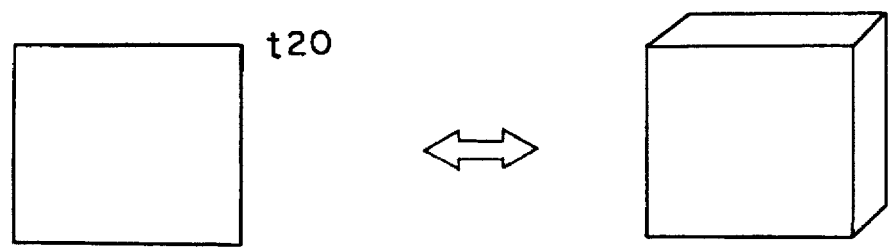
Figure 5:
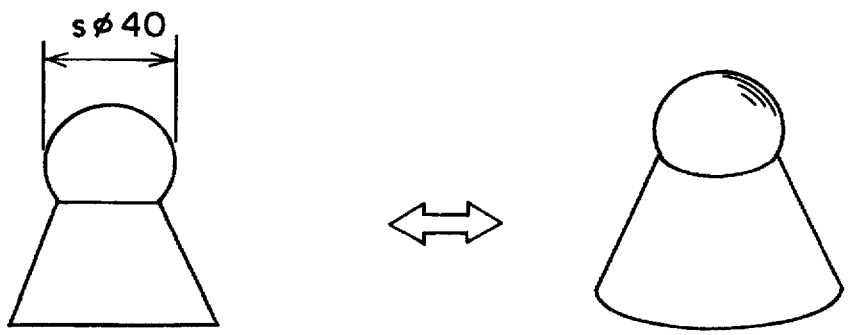

In the case of a dimension symbol t representing a board thickness which is illustrated on a two-dimensional drawing, as shown in the left-hand side of FIG. 5(b), the product model building section 3 creates the corresponding product model having the board thickness as shown in the right-hand side of FIG. 5(b) using the drawing regulation about thickness in the drawing regulation data base 4 for defining a correspondence between drawing regulations and drawings to be illustrated.

In the case of a dimension symbol s$\phi$ representing a sphere which is drawn on a two-dimensional drawing, as shown in the left-hand side of FIG. 5(c), the product model building section 3 creates the corresponding product model having the spherical shape as shown in the right-hand side of FIG. 5(c) using the drawing regulation about spheres in the drawing regulation data base 4 for defining a correspondence between drawing regulations and drawings to be illustrated.

A similar process can be performed for another dimension auxiliary symbol. That is, when the product model building section 3 detects such a dimension symbol as mentioned above on a two-dimensional drawing, it searches data for defining a correspondence between drawing regulations and drawings to be illustrated stored in the drawing regulation data base 4 to obtain a drafting concept which corresponds to the drawing regulation. Then, the product model building section 3 reconstructs an object having the shape which corresponds to the drafting concept.

The product model building section 3 can handle not only drawing regulations about three-dimensional shapes and dimension symbols but also drawing symbols about omission and repetition. For example, consider that a two-dimensional figure the lower and right halves of which are omitted and omission symbols which represent that the two-dimensional figure is symmetric with respect to dashed lines are drawn on a two-dimensional drawing by a user, as shown in the left-hand side of FIG. 6(a). When the user inputs a command which requests the creation of a corresponding product model from the two-dimensional figure, the input information interpreting section 2 enables the product model building section 3. In this case, the product model building section 3 finds the omission symbols in the two-dimensional drawing data of the drawing and then searches data for defining a correspondence between drawing regulations and drawings to be illustrated stored in the drawing regulation data base 4. A data showing that the omission symbols are concerned with the drawing regulation about omission has been stored in the drawing regulation data base 4 for defining a correspondence between drawing regulations and drawings to be illustrated. The product model building section 3 creates the corresponding product model in which the omitted parts are also illustrated in addition to the part which has not been omitted on the two-dimensional drawing as shown in the right-hand side of FIG. 6(a) using the drawing regulation about omission in the drawing regulation data base 4 for defining a correspondence between drawing regulations and drawings to be illustrated.

Figure 6:
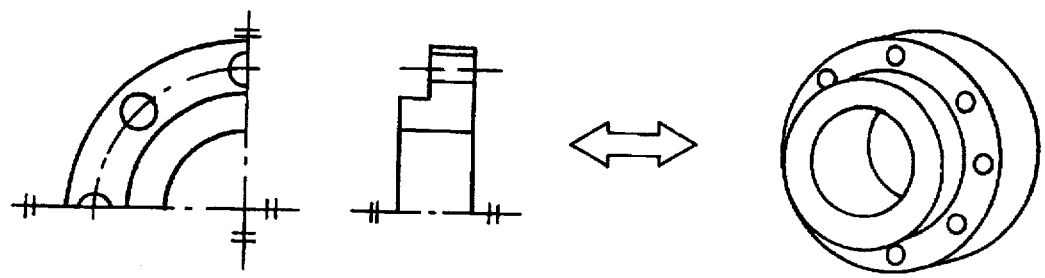
FIGS. 6(a)–6(c) are views each showing a correspondence between a two-dimensional figure created with a drawing symbol about omission or repetition and a product model.
Figure 6:
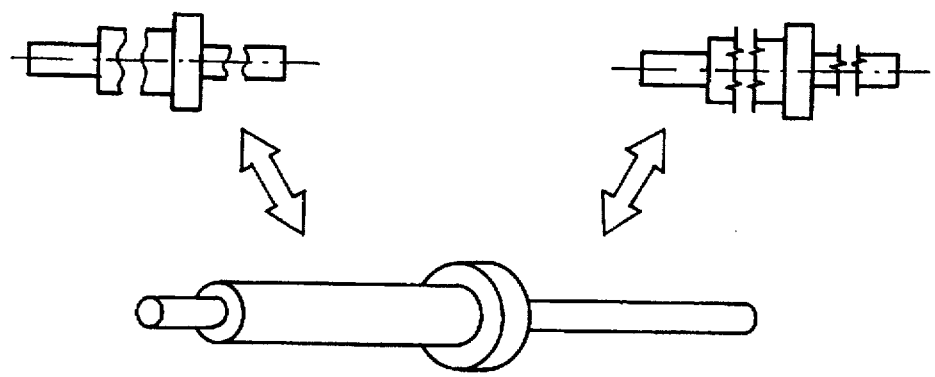
Figure 6:
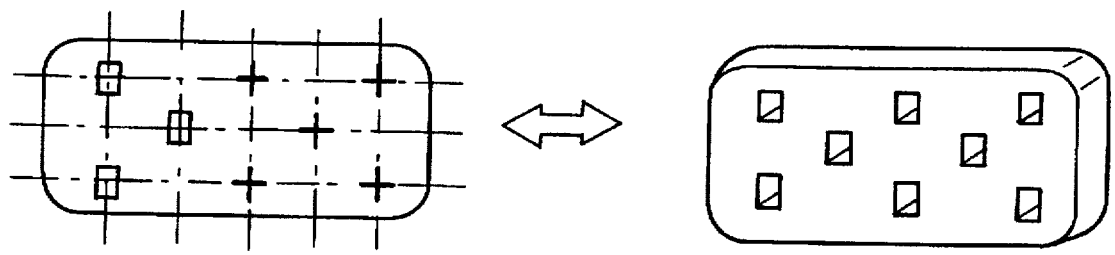

In the case of symbols for showing a partial omission on a two-dimensional drawing as shown in the upper side of FIG. 6(b), the product model building section 3 creates the corresponding product model in which the omitted parts are also illustrated in addition to the part which has not been omitted on the two-dimensional drawing as shown in the lower side of FIG. 6(b) using the drawing regulation about omission in the drawing regulation data base 4 for defining a correspondence between drawing regulations and drawings to be illustrated. In this case, the lengths of the omitted parts can be input by a user or given by the drawing data base 9.

In the case of symbols for showing a repetition on a two-dimensional drawing, as shown in the left-hand side of FIG. 6(c), the product model building section 3 creates the corresponding product model in which the omitted parts are also illustrated in addition to the parts which have been illustrated on the two-dimensional drawing as shown in the right-hand side of FIG. 6(c) using the drawing regulation about repetition in the drawing regulation data base 4 for defining a correspondence between drawing regulations and drawings to be illustrated. In this case, the product model building section 3 obtains the whole shape of the object by copying one part which is not omitted, e.g. one penetrating hole shown in the figure, to the positions where the omission symbols are illustrated.

Figure 7:
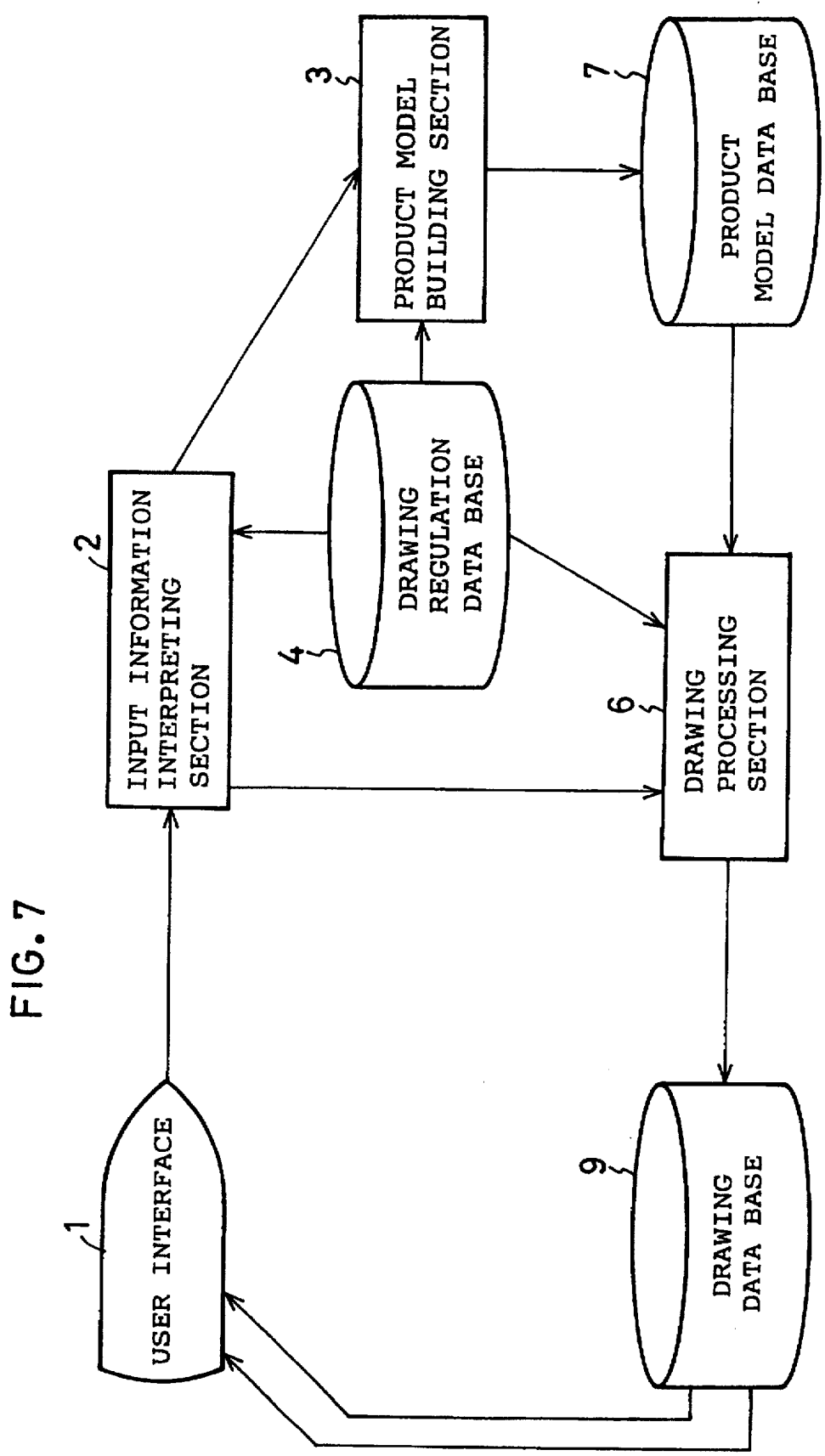
FIG. 7 is a block diagram of a CAD system according to another embodiment of the present invention

Referring now to FIG. 7, it illustrates a CAD system according to another embodiment of the present invention. In the figure, reference numeral 6 denotes a drawing processing section for creating two-dimensional drawings from a product model stored in the product model data base 7.

The input information interpreting section 2 interprets a command which is input by a user with the user interface 1. When the input information interpreting section 2 determines that the command is concerned with the creation of a product model, it enables the product model building section 3. Then, the product model building section 3 creates a product model using data which are input in turn by the user, the command, and data stored in the drawing regulation data base 4 for defining a correspondence between drawing regulations and drawings to be illustrated. After that, the product model building section 3 stores the product model data which corresponds to the product model in the product model data base 7.

In the case that the command is concerned with a modification to a product model, the product model building section 3 retrieves the corresponding product model data from the product model data base 7. Then, the product model building section 3 stores the modified product model data in the product model data base 7.

When the input information interpreting section 2 determines that the input command is concerned with the creation of a two-dimensional drawing, it enables the drawing section 6. The drawing section 6 retrieves the corresponding product model data from the product model data base 7. After that, the drawing section 6 creates two-dimensional orthographic views, e.g., a front view, a top view and a right side view, or views on view planes perpendicular to arbitrary viewing directions, in accordance with the shape of the three-dimensional product model by using the retrieved product model data.

Geometric parameters, e.g., coordinates and angles, which represent structural elements of a three-dimensional product model are stored as a data set about a product model in the product model data base 7. Therefore, the drawing processing section 6 obtains the coordinates and the like of the vertices, sides and so on of two-dimensional projections on view planes from Geometric data which represent a three-dimensional object so as to create the views on the basis of the obtained coordinates and the like.

The drawing section 6 refers to data for defining a correspondence between drawing regulations and drawings to be illustrated stored in the drawing regulation data base 4. When the drawing processing section 6 finds a desired data for defining a correspondence between a drawing regulation and a drawing to be illustrated, it retrieves the corresponding drawing regulation from the drawing regulation data base 4. The drawing processing section 6 applies the retrieved drawing regulation to the creation of views.

For example, consider that an existing product model data is one which corresponds to the solid object shown in the right-hand side of FIG. 4(a) and a data showing that the object is a gear is included in the product model data. The drawing section 6 obtains the drawing regulation about gears from the gear library stored in the drawing regulation data base 4 for defining a correspondence between drawing regulations and drawings to be illustrated. The drawing processing section 6 does not obtain orthographic projections by directly projection of the product model shown in the right-side of FIG. 4(a), but it recreates the view which obeys the drawing regulation, i.e., the view shown in the left-side of FIG. 4(a). Then, the drawing processing section 6 stores the drawing data which corresponds to the view in the drawing data base 9.

In the case that an existing product model data is one which corresponds to the solid object shown in the right-hand side of FIG. 5(a), the drawing processing section 6 creates the corresponding rectangle on the front view plane. Since the product model is cylindrical, the drawing processing section 6 searches for the auxiliary dimension symbol about diameters stored in the drawing regulation data base 4 for defining a correspondence between drawing regulations and drawings to be illustrated. The data showing that the auxiliary dimension symbol about diameters is "φ" has been stored in the drawing regulation data base 4. The drawing processing section 6 creates the front view including the auxiliary dimension symbol as shown in the left-side of FIG. 5(a) and stores the drawing data of the front view in the drawing data base 9. In addition, the drawing processing section 6 can create the top and side views of the product model. The drawing processing section 6 determines that the top projection of the solid object is rectangle-shaped and the side projection is circle-shaped from the product model data. Therefore, the top view on which the rectangle is drawn and side view on which the circle is drawn can be created and the corresponding drawing data are stored in the drawing data base 9.

In the case that an existing product model data is the one which corresponds to the solid object shown in the right-hand side of FIG. 6(a) and a data, which represents that a corresponding two-dimensional figure is partially illustrated because the solid object is symmetric with respect to a central line, is included in the product model data, the drawing section 6 obtains the drawing regulation about omission stored in the drawing regulation data base 4 for defining a correspondence between drawing regulations and drawings to be illustrated. The drawing processing section 6 does not obtain orthographic views by projection of the product model shown in the right-side of FIG. 6(a), but it recreates the view which obeys the drawing regulation, i.e., the view shown in the left-side of FIG. 6(a). Then, the drawing processing section 6 stores the drawing data which corresponds to the view in the drawing data base 9.

Figure 8:
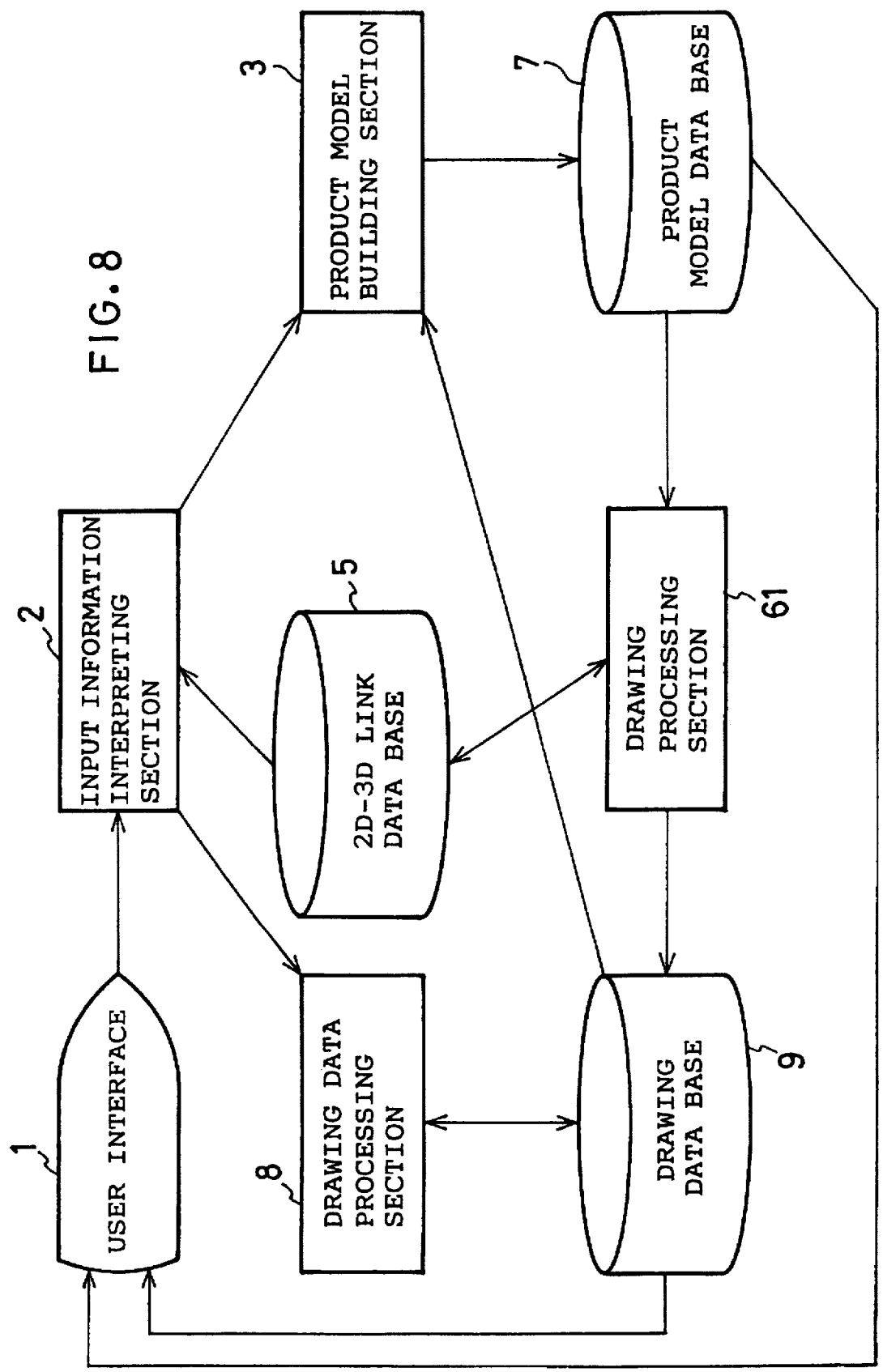
FIG. 8 is a block diagram of a CAD system according to another embodiment of the present invention

Referring now to FIG. 8, it illustrates a CAD system according to another embodiment of the present invention. In the figure, reference numeral 5 denotes a 2D–3D link data base having a table for showing a correspondence between two-dimensional drawing data in the drawing data base 9 and three-dimensional product model data in the product model data base 7, and reference numeral 61 denotes a drawing processing section which creates views from a product model data and stores the data of the views in the drawing data base 9, and then registers a correspondence between the created projections and the product model data in the 2D–3D link data base 5.

In operation, the product model building section 3 creates a product model according to a command input by a user.

After that, the product model building section 3 stores the product model data which corresponds to the product model in the product model data base 7. The drawing processing section 61 creates views from the product model data in the product model data base 7 in accordance with the command input by the user in the same manner as the drawing processing section of the above embodiment of FIG. 7 does. Then, the drawing processing section 61 registers information on a correspondence between the created views and the corresponding product model data stored in the product model data base 7 on the 2D–3D link data base 5.

When a user inputs a command of modifying a two-dimensional drawing, the input information interpreting section 2 enables the drawing data processing section 8. Then, the drawing data processing section 8 retrieves the two-dimensional drawing data and modifies it through an interactive input/output operation between the user and the CAD system and stores the drawing data of the modified two-dimensional drawing in the drawing data base 9.

After that, the input information interpreting section 2 enables the product model building section 3. The product model building section 3 retrieves the modified drawing data and recreates the product model which corresponds to the drawing data. The product model building section 3 performs the creating operation in the same manner as the building section of the first embodiment of FIG. 2 does. Then, the product model building section 3 updates the product model data by replacing the old product model data with the newly created product model data.

The input information interpreting section 2 enables the drawing processing section 61. The drawing processing section 61 searches for the two-dimensional drawing which corresponds to the updated product model data in the 2D–3D link data base 5 and retrieves the two-dimensional drawing data from the drawing data base 9. The drawing processing section 61 modifies the remaining views, which the user has not changed, included in the retrieved drawing data.

Figure 9:
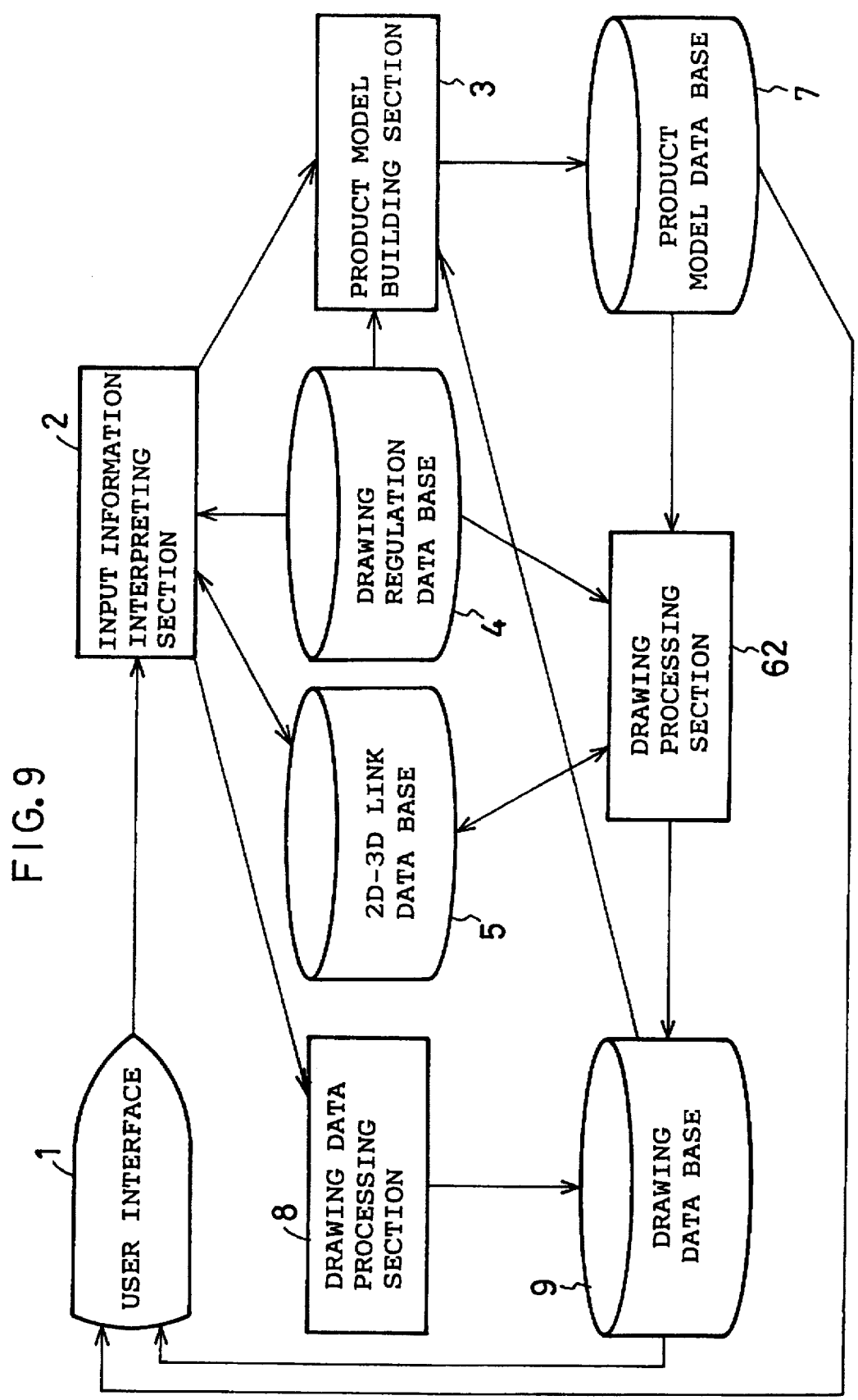
FIG. 9 is a block diagram of a CAD system according to another embodiment of the present invention
Figure 10:
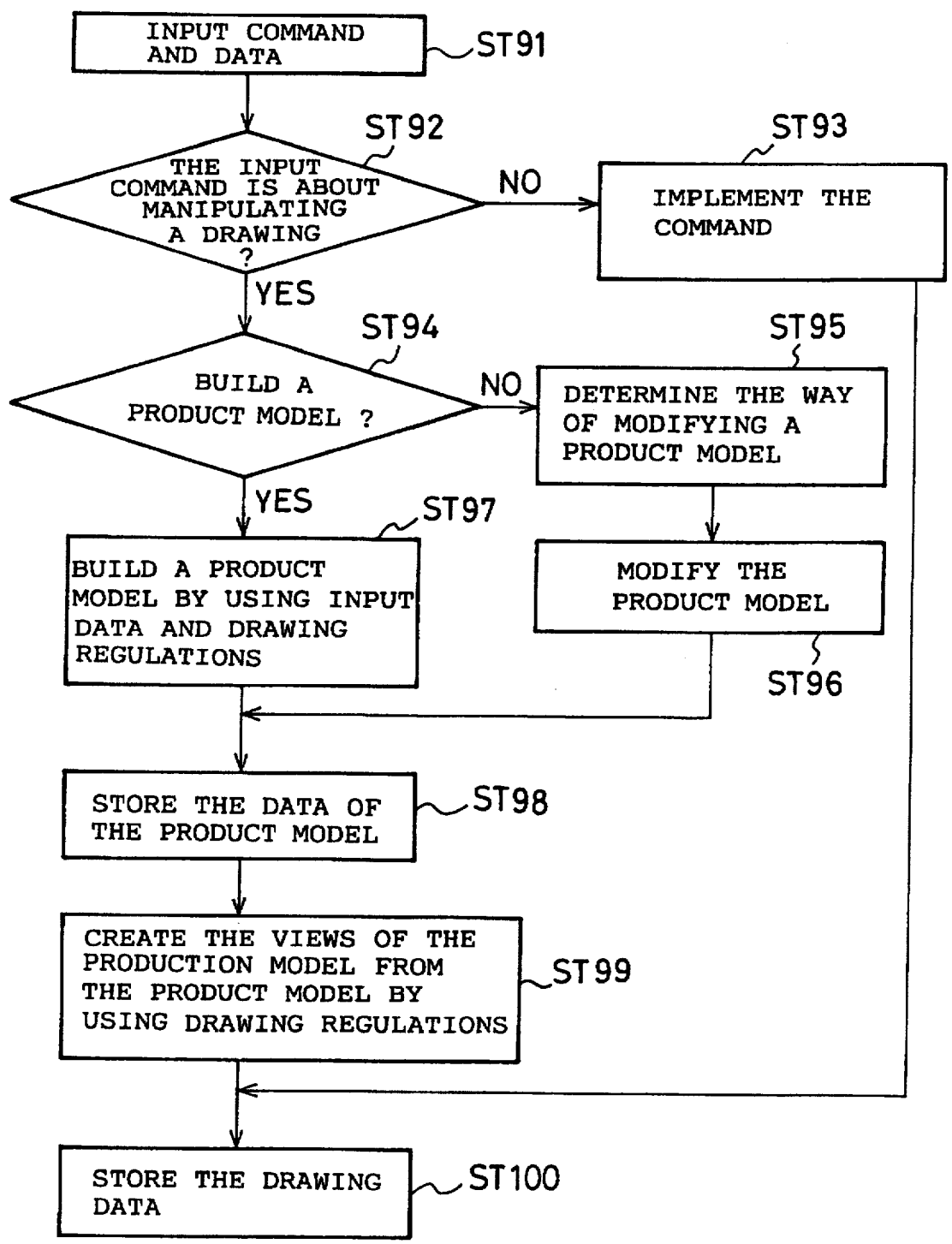
FIG. 10 is a flow diagram showing the operation of the CAD system according to the embodiment shown in FIG. 9.

Referring now to FIG. 9, it illustrates a CAD system according to another embodiment of the present invention. The CAD system is provided with all the structural elements according to the aforementioned embodiments. The drawing processing section 62 of this embodiment includes the drawing processing section 6 shown in FIG. 7 and drawing processing section 61 shown in FIG. 8. FIG. 10 is a flow diagram illustrating the operation of the CAD system according to this embodiment.

In operation, when a user inputs a command and data accompanied with the command in step ST91, the input information interpreting section 2 enables the processing sections in accordance with the input command. When the command and data associated with the creation of a two-dimensional drawing are input, the drawing data processing section 8 produces a two-dimensional drawing through an interactive input/output operation between the user and the CAD system in steps ST92 and ST93. Then, the drawing data processing section 8 stores the two-dimensional drawing data in the drawing data base 9 in step ST100.

When the command and data associated with the creation or modification to a product model are input, the product model building section 3, in steps ST94 to ST97, creates or modifies the product model by using input data followed by the command, data stored in the drawing regulation data base 4 for defining a correspondence between drawing regulations and drawings to be illustrated, and drawing data stored in the drawing data base 9. After that, the product model building section 3 stores the created or modified product model data in the product model data base 7 in step ST98.

Furthermore, using a further command and data which are input by the user, the drawing processing section 62 retrieves the corresponding product model data from the product model data base 7. Then, the drawing processing section 62 creates the two-dimensional views (the front view, top view and right side view, or a view onto an arbitrary view plane perpendicular to a viewing direction) by projection of the three-dimensional product model in step ST99 and stores them in the drawing data base 9 in step ST100. When a command of directly performing step ST99 and data are input, the drawing processing section 62 can perform the creating process of views without performing steps ST92 to ST97.

A modification to one view can automatically trigger modifications to other views. When a user inputs a command of modifying a two-dimensional drawing and data, the drawing data processing section 8 retrieves the two-dimensional drawing and modifies it through an interactive input/output operation between the user and the CAD system. The drawing data processing section 8 stores the modified two-dimensional drawing data in the drawing data base 9. After that, the product model building section 3 retrieves the modified drawing data and reconstructs the product model which corresponds to the modified drawing data. Then, the product model building section 3 updates the product model by replacing the old product model data with the newly created product model data. The drawing processing section 62 searches for the two-dimensional drawing which corresponds to the updated product model data in the 2D–3D link data base 5 and retrieves the two-dimensional drawing data from the drawing data base 9. The drawing processing section 62 modifies the remaining views, which the user has not changed, included in the retrieved drawing data.

For example, consider that the product model data as shown in the right side of FIG. 5(a) is stored in the product model data base 7 and the drawing data about the front view, top view and right side view of the product model are stored in the drawing data base 9. The front side view is like the one shown in the left side of FIG. 5(a). The top view is not shown but is also rectangle-shaped. The right side view is circle-shaped. When the drawing processing section 62 replaces the symbol "φ30" with "φ40" in the front view through an interactive operation between users and the CAD system, it stores the modified drawing data in the drawing data base 9. The product model building section 3 receives the drawing data about the front view, i.e., the rectangle data and the symbol data "φ40" from the drawing data base 9 and then recreates the cylindrical product model with a diameter of 40 mm by reference to data for defining a correspondence between drawing regulations and drawings to be illustrated stored in the drawing regulation data base 4. The old cylindrical product model with a diameter of 30 mm is updated by replacing the data with the newly created cylindrical product model data.

The drawing processing section 62 retrieves the drawing data which corresponds to the recreated product model from the drawing data base 9 to modify the top and right side views that have not been updated. That is, the drawing processing section 62 can create the top view on which the rectangle with a width of 40 mm is illustrated and the right side view on which the circle with a diameter of 40 mm is illustrated in the same manner that the drawing processing section of the aforementioned embodiment of FIG. 7 does. After that, the old drawing data are replaced by the newly created drawing data. Thus, when modifying one view of a product model, the CAD system of this embodiment updates the other views of the product model automatically.

Preferably, the CAD system comprises a 2D and 3D integrated data base in which both two-dimensional data and three-dimensional data can be manipulated together by mutually relating the two-dimensional data to the three-dimensional data. A drawing data in the drawing data base 9, a product model data in the product model data base 7 and a 2D-3D link data in the 2D-3D link data base 5 are integrated to be a two-dimensional and three-dimensional integrated data as a data structure. In this case, the drawing data processing section 8, product model building section 3 and drawing processing section 62 can access to the 2D and 3D integrated data base.

Referring now to FIGS. 11(a) and 11(b), they illustrate an operation of the CAD system according to another embodiment of the present invention. The CAD system has the same structure as the one according to the aforementioned embodiment of FIG. 9.

When a user provides a two-dimensional drawing, e.g., the rectangle 801 stored in the drawing data base 9 with a thickness defined by an attribute, as shown in the upper side of FIG. 11(a), the product model building section 3 is enabled by the input information interpreting section 2. The product model building section 3 arranges the FIG. 803 in three space, which corresponds to the rectangle 801, and creates the product model 806 by expanding the figure to the predetermined thickness in the direction of depth according to the attribute added to the rectangle 801. The constructed product model data is stored in the product model data base 7. The data showing a correspondence between the rectangle 801 and the product model is stored in the 2D-3D link data base 5.

When the user draws a circle 802 in the center of the rectangle 801 and provides the circle 802 with an attribute showing that the three-dimensional shape of the circle 802 is a penetrating hole, the input information interpreting section 2 detects the presence of the product model which corresponds to the rectangle 801 by searching contents of the 2D-3D link data base 5. Then, the input information interpreting section 2 enables the product model building section 3 in order to modify the product model. The product model building section 3 creates and arranges the FIG. 804 in three space, which corresponds to the circle 802, and reconstructs the product model 807 having the penetrating hole, the opening of which is shown by the FIG. 804, by comparing the position of the circle 804 with that of the existing product model 806.

Even if the attributes are provided in the reverse order, the product model 807 can be created similarly. As shown in FIG. 11(b), when a user provides the circle 802 with the attribute about penetrating holes, the input information interpreting section 2 knows that there is no product model which corresponds to the rectangle 801 from contents of the 2D-3D link data base 5. The input information interpreting section 2 allows the product model building section 3 to create the FIG. 804, which is defined on the imaginary plane 805, having the attribute of penetrating holes and store it. The data showing that the FIG. 804 is defined on the imaginary plane 805 is registered on the 2D-3D link data base 5.

When the user provides the rectangle 801 with an attribute of thickness, the input information interpreting section 2 enables the product model building section 3. The product model building section 3 arranges the FIG. 803 in three space, which corresponds to the rectangle 801, and creates the product model 806 by expanding the figure to the predetermined thickness in the direction of depth. The input information interpreting section 2 can detect the presence of the FIG. 804 on the imaginary plane 805 which corresponds to the rectangle 801 by searching contents of the 2D-3D link data base 5, and then determines whether the FIG. 804 on the imaginary plane 805 is suitable for the constructed product model 806. If the FIG. 804 is applicable to the product model 806, the product model building section 3 recreates the product model 807 having the penetrating hole, the opening of which is shown by the FIG. 804.

Figure 12:
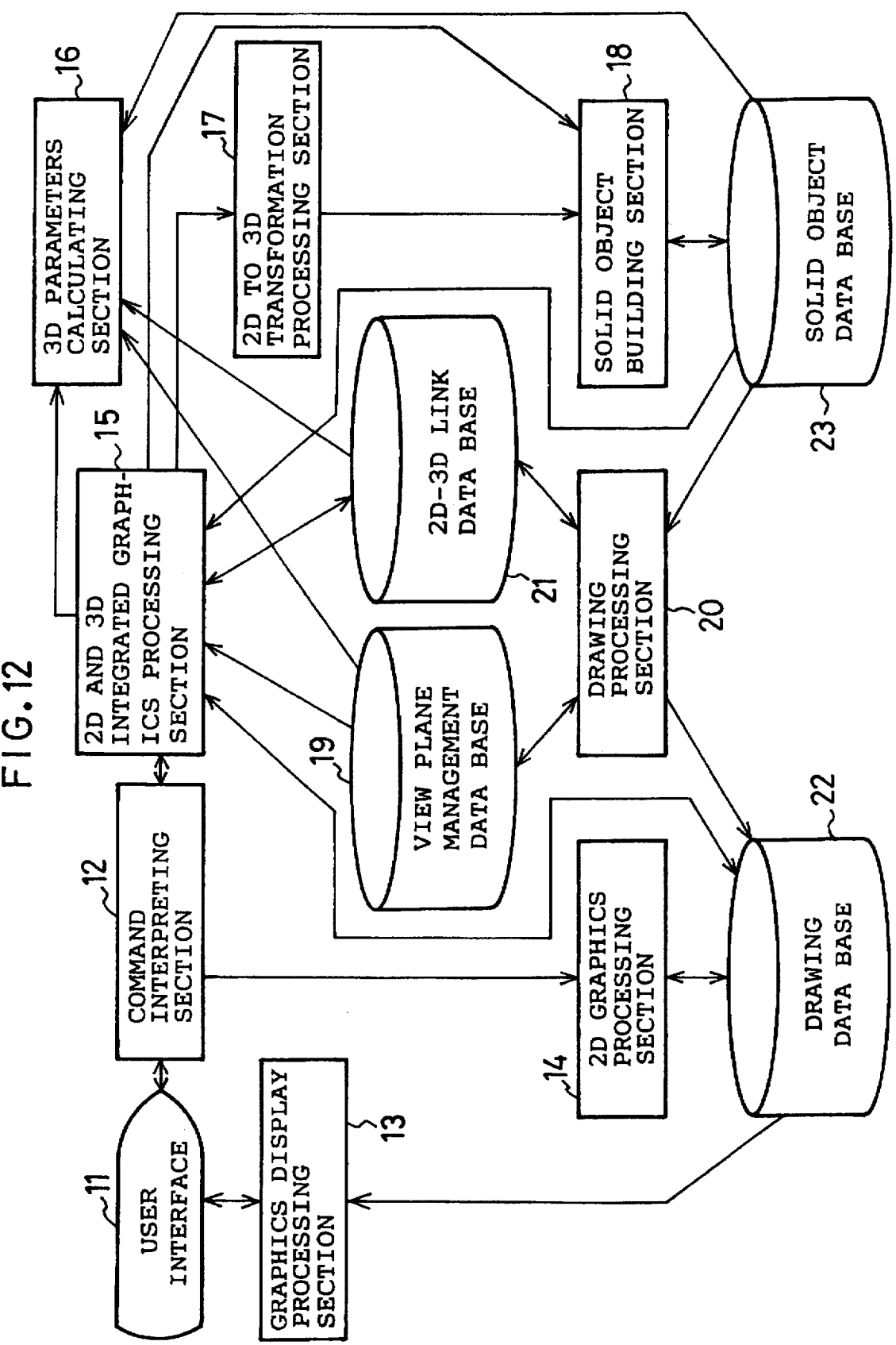
FIG. 12 is a block diagram of a CAD system according to an embodiment of the present invention.

Referring now to FIG. 12, it illustrates a block diagram of a CAD system according to an embodiment of the present invention. In the figure, reference numeral 11 denotes a user interface section, reference numeral 12 denotes a command interpreting section, reference numeral 13 denotes a graphics display section, reference numeral 14 denotes a 2D graphics processing section, reference numeral 15 denotes a 2D and 3D integrated graphics processing section, reference numeral 16 denotes a 3D parameter calculating section, reference numeral 17 denotes a 2D to 3D transformation processing section, reference numeral 18 denotes a solid object building section, reference numeral 19 denotes a view plane management data base, reference numeral 20 denotes a drawing processing section, reference numeral 21 denotes a 2D-3D link data base, reference numeral 22 denotes a drawing data base, and reference numeral 23 denotes a solid object data base.

The user interface section 11 is provided with input devices such as a mouse, a tablet, a keyboard and so on, through which users input commands and data and output devices such as a CRT display and so on, through which the CAD system provides users with a guidance and drawings. Users can start up the CAD system through the user interface section 11 and obtain the results output by the CAD system. The command interpreting section 12 receives a command and data input through the user interface section 11 and inquires of the 2D and 3D integrated graphics processing section 15 whether or not the target of the input command is associated with an existing solid object, i.e., an existing product model. If the command is not concerned with a product model, the command interpreting section 12 enables the 2D graphics processing section 14. If the command is associated with a solid object, the command interpreting section 12 enables the 2D and 3D integrated graphics processing section 15.

For example, when a user intends to move a two-dimensional projection on a view plane, the user inputs the command of moving and the amount of movement and so on for moving the two-dimensional projection at a predetermined position through the keyboard or the like. A figure element of the two-dimensional projection to be moved and a figure element of the destination two-dimensional figure to which the projection is moved may be selected as input data by using the mouse or the like. Alteratively, users may input the coordinates data of a point on the view plane, and then the CAD system arranges the two-dimensional projection so that a selected point of the projection overlaps the former point. Not only a translation transformation but also a rotation transformation about an axis perpendicular to the view plane can be applied. Thus, the input data can be a figure element of a two-dimensional figure or two-dimensional coordinates. Furthermore, according to the present embodiment the CAD system is adapted to utilize symbol and character information such as an annotation, a symbol or the like on a two-dimensional drawing, which is input as a data by users, together with a figure element of a two-dimensional figure or the like in order to perform a placement operation on a projection by relating the projection to the two-dimensional figure.

The 2D and 3D integrated graphics processing section 15 corresponds to the input information interpreting section 2 of the aforementioned embodiment of FIG. 9 and includes the drawing regulation data base 7. The 2D and 3D integrated graphics processing section 15 judges whether or not a two-dimensional figure element, which is input as a data, is associated with a product model by reference to 2D–3D link data stored in the 2D–3D link data base 21. If the two-dimensional figure element is associated with a product model, the 2D and 3D integrated graphics processing section 15 enables the 3D parameters calculating section 16 and 2D to 3D transformation processing section 17 in consideration of the shape of the solid object and the input command if necessary. Then, the 2D and 3D integrated graphics processing section 15 obtains the internal processing command and determines the placement parameters for positioning a two-dimensional projection to be moved so as to enable the solid object building section 18.

The 3D parameters calculating section 16 is adapted to compute data required for three-dimensional processes in accordance with a user's intention and by reference to input data provided by the user on a two-dimensional drawing, the view plane management data base 19, the 2D–3D link data base 21 and the solid object data base 23. The solid object building section 18, which corresponds to the product model building section of the aforementioned embodiment of FIG. 9, implements all of the processing commands of creating, modifying and deleting solid objects to create, modify or delete solid object data in the solid object data base 23.

When the command interpreting section 12 judges that the user's operation is concerned with a placement operation, it transfers the data about the user's operation to the 2D and 3D integrated graphics processing section 15. The 2D and 3D integrated graphics processing section 15 analyzes a figure element data input or selected by the user through the mouse or the keyboard, two-dimensional coordinates data or the like and then determines whether or not the user's input operation is concerned with a three-dimensional placement operation. If the user's input operation is about a three-dimensional placement, the 3D parameters calculating section 16 specifies the placement parameters for the product model. After the placement parameters for the placement operation are determined, the 2D and 3D integrated graphics processing section 15 enables the solid object building section 18 to perform the three-dimensional placement processing.

The 2D to 3D transformation processing section 17 transforms the command input by the user on the basis of the command and input data so that the CAD system can perform a modification to a three-dimensional object due to a modification to a two-dimensional figure element of the object in accordance with a user's intention. That is, the CAD system does not suffer from the aforementioned conventional restriction on modifications based on a relationship between the two-dimensional figure element and the shape of the product model.

The drawing processing section 20 creates a plurality of views from the solid object data 23 by reference to the view plane management data base 19. When creating the plural views, the drawing processing section 20 refers to attribute data added to elements of the product model. Simultaneously, the drawing processing section 20 issues an instruction of creating, modifying or deleting a data in the 2D–3D link data base 21 to the data base 21.

The 2D graphics processing section 14, which corresponds to the drawing data processing section 8 of the aforementioned embodiment of FIG. 9, implements all of the instructions of creating, modifying and deleting a two-dimensional figure and modifying a two-dimensional projection to create, modify and delete a data in the drawing data base 22. The graphics display processing section 13 performs an output processing for displaying a two-dimensional figure read out of the drawing data base 22 on the graphical output device of the user interface section 11.

The view plane management data 19 includes information about view planes, e.g., what view plane is assigned to each two-dimensional orthographic view, and information about solid objects, e.g., what part of solid object data each is reflected or projected on each view plane. The 2D–3D link data base 21, which corresponds to the 2D–3D link data base of the aforementioned embodiment of FIG. 9, includes data for showing a correspondence between elements of a three-dimensional object and two-dimensional views of the object.

The solid object data base 23, which corresponds to the product model data base of the aforementioned embodiment of FIG. 9, includes shape data of a product model and attribute data added to figure elements of a product model. The drawing data 22 includes figure data of a two-dimensional drawing and data which are managed for a two-dimensional CAD operation such as attribute data for display.

Figure 13:
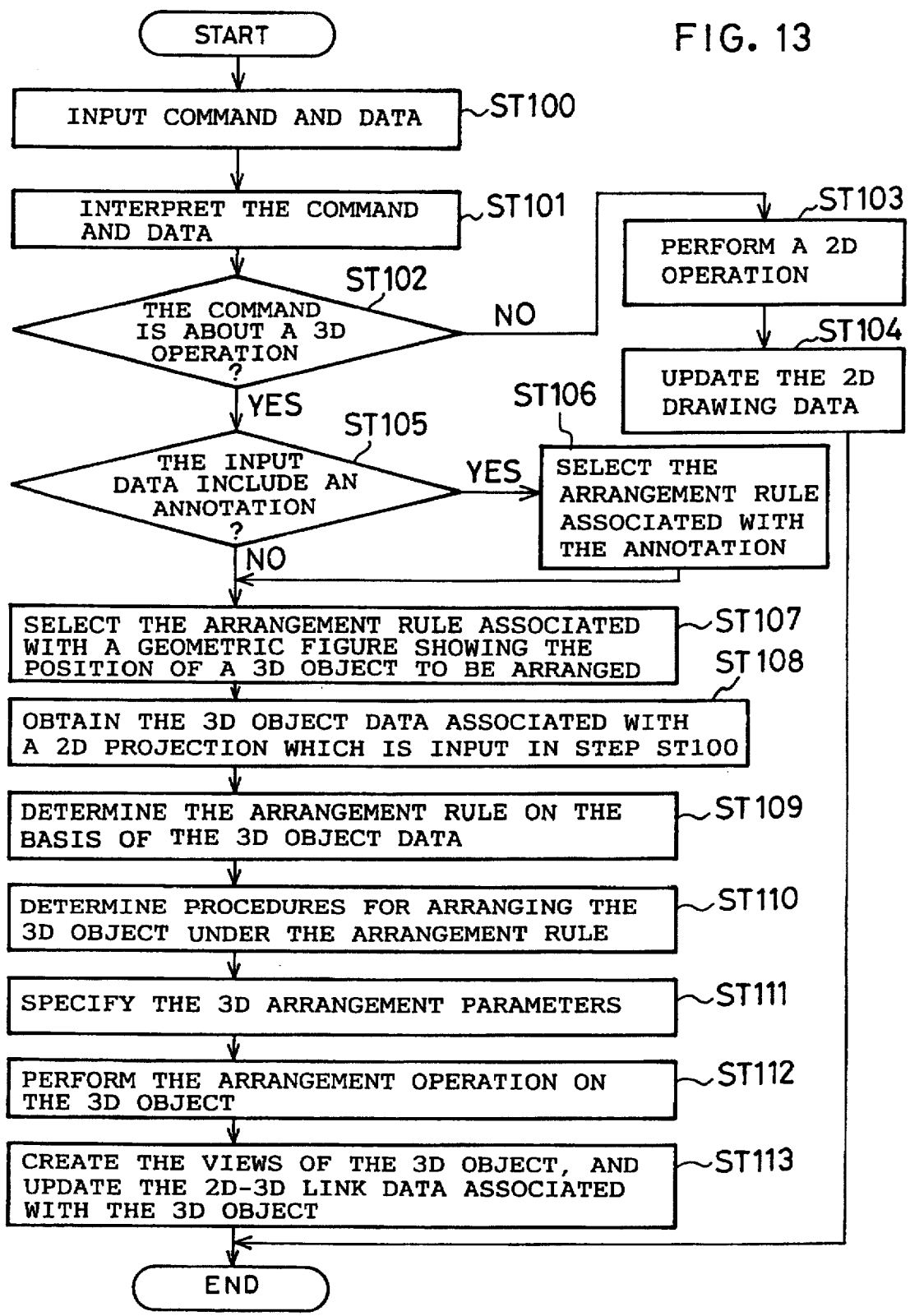
FIG. 13 is a flow diagram showing the operation of the CAD system according to the embodiment shown in FIG. 12.

Referring now to FIG. 13, it illustrates a flow diagram showing the operation of the CAD system according to this embodiment. In step ST100, a user inputs an instruction and a data through the input device of the user interface section 11. As previously mentioned, when the user intends to move a two-dimensional projection on a two-dimensional drawing, the user inputs the instruction of moving a two-dimensional figure and data, i.e., the amount of movement or the like for moving the two-dimensional projection at a specified position, through the keyboard or the like. A figure element of the two-dimensional projection and a figure element of the two-dimensional figure to which the projection is moved may be selected as the input data by use of the mouse or the like. Thus, the input data can be an element of a two-dimensional figure or two-dimensional coordinates. Furthermore, clicking the mouse on an annotation on a two-dimensional drawing, a symbol or the like makes it possible to perform a placement operation according to the selected annotation or the symbol.

The command interpreting section 12, in step ST101, interprets the command and data input through the user interface section 11 to enable both the 2D and 3D integrated graphics processing section 15 and the 2D graphics processing section 14. The 2D and 3D integrated graphics processing section 15 examines the input command and data by reference to the 2D–3D link data 21, drawing data base 22 and solid object data base 23 so as to enable both the 3D parameters calculating section 16 and the 2D to 3D transformation processing section 17, so that the 2D and 3D integrated graphics processing section 15 obtains the command required for processes to be performed by the 2D graphics processing section 14 and solid object building section 18 and then specifies the placement parameters for the placement operation. Then, the 2D and 3D integrated graphics processing section 15 creates a two-dimensional drawing and a solid object in accordance with a user's intention, and stores these data in the drawing data base 22 and solid object data base 23, respectively.

Hereinafter, the description will be directed to a placement processing of arranging a product model, more particularly to the operation mentioned above of the 2D and 3D integrated graphics processing section 15 by reference to FIG. 13. In step ST102, the command interpreting section 12 inquires of the 2D and 3D integrated graphics processing section 15 whether the selected two-dimensional figure which is to be moved is a view of a three-dimensional object, i.e., a two-dimensional projection of a product model. The 2D and 3D integrated graphics processing section 15 determines whether the selected two-dimensional figure which is to be moved is a view of a three-dimensional object by reference to the 2D–3D link data base 21 and then sends the result to the command interpreting section 12. If the selected figure is not a view of a three-dimensional object, the command interpreting section 12 allows the 2D graphics processing section 14 to update the corresponding drawing data in accordance with a user's operation on the two-dimensional drawing in steps ST103 and ST104.

If the selected figure is a two-dimensional projected figure of a three-dimensional object, the command interpreting section 12 provides the 2D and 3D integrated graphics processing section 15 with all of the input data. The 2D and 3D integrated graphics processing section 15 performs the following operation in order to specify the user's intention, which is shown in step ST102, about the placement operation. In step ST105, the 2D and 3D integrated graphics processing section 15 judges whether or not there is an annotation included in the input data such as a note, a symbol or the like associated with the placement. If the input data includes such an annotation, the 2D and 3D integrated graphics processing section 15 chooses a placement rule governing the placement operation according to the input data. The detail of the annotation will be described later. An annotation may be added to a two-dimensional figure element as attribute data. In general, such an annotation has been illustrated on a two-dimensional drawing. Alteratively, an annotation may be illustrated at an arbitrary position in a two-dimensional drawing. In the latter case, users may click the mouse on such the annotation in performing step ST100.

The 2D and 3D integrated graphics processing section 15, in step ST107, obtains drawing information about the selected figure elements which instruct how the selected other figure should be positioned from the drawing data base 22 and chooses a placement rule governing the placement operation by reference to the shape and attribute data of the selected figure elements. Then, in step ST108, the 2D and 3D integrated graphics processing section 15 obtains information about a corresponding solid object, one of the projections of which is the selected two-dimensional figure to be moved, from the solid object data base 23. The 2D and 3D integrated graphics processing section 15, in step ST109, judges whether or not the selected rule governing the placement operation is suitable for the shape of the product model. Then, the 2D and 3D integrated graphics processing section 15 determines to apply the placement rule to the placement operation finally. In step ST110, the 2D and 3D integrated graphics processing section 15 determines procedures for calling functions of processing shapes of solid objects to perform the three-dimensional placement operation according to the rule governing the placement operation.

In step ST111, the 2D and 3D integrated graphics processing section 15 specifies the three-dimensional placement parameters required for each of the functions of processing shapes of solid objects. Since data to be processed like the input data are two-dimensional coordinates or two-dimensional figure elements, these data must be transformed into three-dimensional data. The 3D parameters calculating section 16 computes the three-dimensional data of the place where the solid object, which is the target of the input command, is to be positioned. The 2D and 3D integrated graphics processing section 15 determines the parameters of the coordinate transformation in use for the placement operation such as a translation and a rotation of the solid object.

The 3D parameter calculating section 16 retrieves the information about the view plane associated with the input data from the view plane management data base 19 to obtain the viewing direction in three space and three-dimensional data of the view plane. When the input data is a two-dimensional orthographic projection, the 2D and 3D integrated graphics processing section 15 obtains the three-dimensional data of the product model by reference to the 2D–3D link data base 21. When the input data are two-dimensional coordinates, the 2D and 3D integrated graphics processing section 15 obtains the three-dimensional coordinates of the object from the intersection of the straight line at infinity extending in the viewing direction through the point represented by the two-dimensional coordinates with the view plane or the solid object. When the input data is a two-dimensional projection, the 2D and 3D integrated graphics processing section 15 obtains the three-dimensional coordinates of the object from the three-dimensional data of the elements of the solid object to determine the three-dimensional data of the place where the solid object, which is the target of the input command, is to be positioned. The orientation of the product model is also determined from the viewing direction of the view plane and the directions of surfaces of the solid object.

In step ST112, after the 2D and 3D integrated graphics processing section 15 determines the procedure of the placement operation and the placement parameters, it provides the solid object building section 18 with the procedure and parameters. The solid object building section 18 is allowed to update the product model data stored in the solid object data base 23. Then, in step ST113, the graphics processing section 20 creates views of the product model in accordance with the information about the view plane in the view plane management data base 19 and then stores the view data in the drawing data base 22. Furthermore, the data showing a correspondence between the two-dimensional data and the three-dimensional data in the 2D–3D link data base 21 is updated when creating these drawings.

Figure 14:
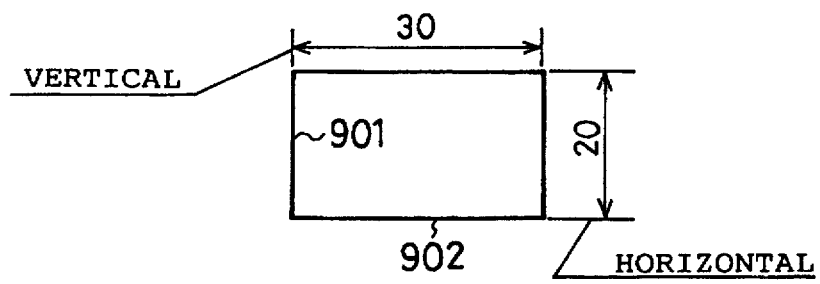
FIGS. 14(a) and 14(b) are views showing examples of an annotation shown in a drawing.
Figure 14:
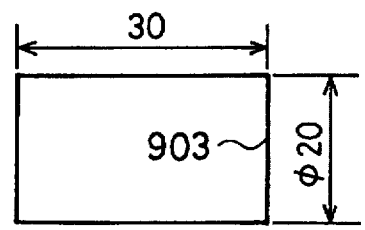

An annotation mentioned above is a note, a symbol, a label or the like which is composed of characters illustrated on a drawing. Among them, there are some examples of an annotation associated with placement operations, e.g., "horizontal (in three-dimensional model space)", "vertical (in three-dimensional model space)", "parallel (relatively)", "perpendicular (relatively)", "φ(dimension symbol)", "□ (perpendicular)", "//(parallel)" FIGS. 14(a) and 14(b) show examples of an annotation shown in a drawing. As shown in FIG. 14(a), the annotation "vertical" shows that the figure element 901 (a side or an edge) is vertical in three-dimensional model space and the annotation "horizontal" shows that the figure element 902 is horizontal in three-dimensional model space. As shown in FIG. 14(b), the annotation "φ" shows that the figure element 903 is a projection of an edge having a circle-shaped cross section. The CAD system according to this embodiment is adapted to utilize such an annotation showing a specified placement operation on a two-dimensional projection.

It is difficult for users to perform a placement operation on a product model in consideration of a desired position and desired angles of the product model in three-dimensional model space. Data input required for an placement operation is a troublesome task for users. To solve the problem, operating menus may be prepared for each of various placement operations. However, this results in increasing the number of menus. The CAD system according to this embodiment is adapted to arrange a two-dimensional projection and a corresponding three-dimensional object to reconstruct the product model by using annotations as mentioned above located on a two-dimensional drawing and two-dimensional figure information. Thus, the CAD system makes it possible to perform placement operations more easily since the number of menus is decreased.

The 2D and 3D integrated graphics processing section 15 in FIG. 12 has a plurality of placement rules each for defining a placement operation according to data, which are input together with the command of arranging (or moving), and annotations, and a plurality of placement rules each for defining a placement operation according to an input or selected two-dimensional figure as follows:

(1) placement rules by means of annotations (a) in the case of the annotation "vertical"; the CAD system arranges a selected solid object in such a manner that an edge or a surface of the object, which corresponds to a side of a corresponding projection selected on a view plane, is vertical in three-dimensional model space.

(b) in the case of the annotation "horizontal"; the CAD system arranges a solid object in such a manner that an edge or a surface of the object, which corresponds to a side of a corresponding projection selected on a view plane, is horizontal in three-dimensional model space.

(c) in the case of the annotation "perpendicular"; the CAD system arranges a solid object in such a manner that an edge or a surface of the object, which corresponds to a side of a corresponding projection selected on a view plane, is perpendicular to a reference element which is also designated.

(d) in the case of the annotation "parallel"; the CAD system arranges a solid object in such a manner that an edge or a surface of the object, which corresponds to a side of a corresponding projection selected on a view plane, is parallel to a reference element which is also designated.

(e) in the case of the annotation "φ"; the CAD system assumes that a reference element with the symbol has a circle-shaped cross section and then arranges a solid object in such a manner that the central axis of the object is coincident with the central axis of the reference element.

(2) placement rules by means of two-dimensional figure elements (a) in the case that a two-dimensional figure element representing a predetermined solid object is input; the CAD system arranges a solid object in such a manner that the central axis of the solid object is coincident with the axis represented by the input two-dimensional figure element, and searches for the surface of another object that intersect the former solid object and then arranges the former object on the surface of the latter object.

(b) in the case that a two-dimensional figure element is selected as a reference element which is an indicator of the placement operation together with a two-dimensional figure element of a solid object to be arranged; the CAD system arranges the solid object in such a manner that the projection obtained by projection of the latter two-dimensional figure element to be arranged is coincident with the former two-dimensional figure element which is a reference element of the placement operation, or the center of the projection of the latter selected two-dimensional figure element to be arranged is coincident with the center of former two-dimensional figure element.

(c) in the case that both two-dimensional figure elements of a solid object to be moved and two-dimensional figure elements of another solid object on which the former object is arranged are selected while establishing a correspondence between the elements; the CAD system arranges the solid objects in such a manner that the two-dimensional figure elements which correspond to each other are coincident, and in another view plane perpendicular to the view plane on which the figure elements have been chosen the projection of the figure element connected with the designated figure elements of the former object is coincident with the projection of the figure element connected with the designated figure elements of the latter object, or the center of the projection is coincident with the center of the other projection.

Figure 15:
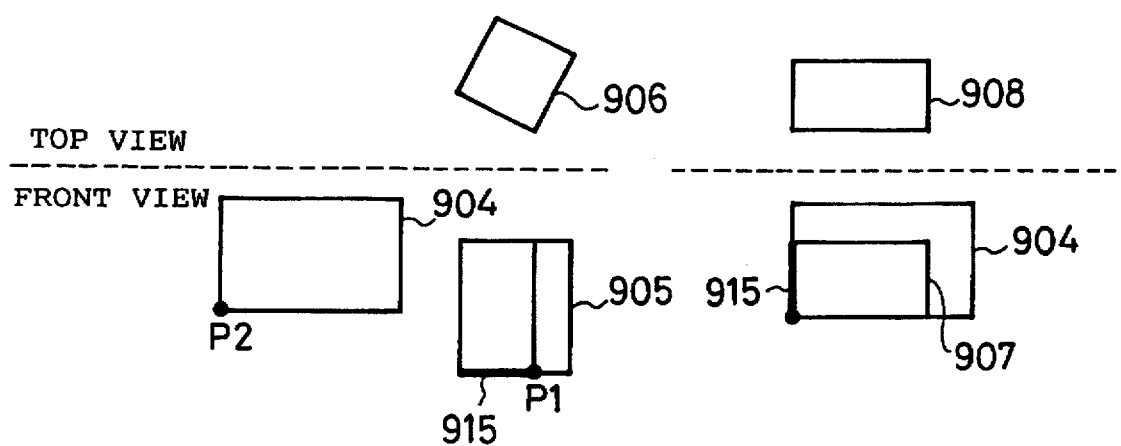
FIGS. 15(a) and 15(b) are views showing an example of a placement operation with an annotation according to the flowchart of FIG. 13.

Referring now to FIGS. 15(a) and 15(b), they illustrate an example of a placement operation by use of the annotation "vertical". FIG. 15(a) shows the front view 905 of a product model, the top view 906 of the product model and a two-dimensional FIG. 904 which is created by a user. After the user inputs the command of moving in order to move the two-dimensional projection 905 on the front view plane such that the point P1 on the projection 905 is coincident with the point P2 on the FIG. 904 and the two-dimensional figure element 915 is vertical, the user selects the annotation "vertical" by clicking the mouse on the annotation illustrated at an arbitrary position on the two-dimensional drawing, and further selects the two-dimensional figure element 915 which must obey the placement rule about the annotation and the points P1 and P2. The series of operations provide the views in which the projections are moved, as shown in FIG. 15(b). The annotation "vertical" can be added to a figure element of the two-dimensional figure to which the projection is moved as attribute data. In this case, the user may click the mouse on the two-dimensional figure element instead of the annotation.

As mentioned above, when a user inputs a command about placements and two-dimensional placement data in order to arrange a two-dimensional projection, the CAD system interprets the user's intention of the three-dimensional placement and automatically calculates the three-dimensional placement parameters to perform the three-dimensional placement operation. This results in decreasing the amount of data input by users and reducing the amount of operations such as a translation and a rotation of a solid object in three space.

According to this embodiment, the CAD system can display a mixture of a two-dimensional drawn figure which is drawn by a user with a conventional two-dimensional CAD function of drawing lines and a two-dimensional projection of a product model as a two-dimensional drawing on the screen of the graphical output device of the user interface 11. The CAD system provides a CAD environment in which both the two-dimensional drawn figure and the two-dimensional projection can be manipulated without discrimination, thereby strongly supporting user's drawing operations. The CAD system can arrange a three-dimensional product model which is the origin of a two-dimensional projection by using existing annotations and two-dimensional figure elements on a two-dimensional drawing which is familiar to users, thereby partially automatizing three-dimensional placement operations of the CAD system and therefore simplifying the placement operations on solid objects in three space.

The description will be directed to another embodiment of the present invention using placement rules about two-dimensional figure elements. The CAD system according to the embodiment is also provided with the structural elements shown in the block diagram of FIG. 12.

In the case of using the aforementioned placement rule (2)-(a), when the 2D and 3D integrated graphics processing section 15 and solid object building section 18 determine a procedure of operations and the placement parameters to perform a three-dimensional placement operation on a product model, they utilize a drawing method defined by drawing regulations and two-dimensional drawing information. The CAD system performs a three-dimensional placement operation on a product model by using at least a two-dimensional figure element which is input or selected as a piece of drawing information by a user. In this case, if the input or selected figure element is an element for restricting the placement operation in three space under a drawing regulation, that is, when a figure element, which has been drawn according to a drawing method associated with placement operations, is input or selected, the 2D and 3D integrated graphics processing section 15 computes the axis and surfaces of the corresponding three-dimensional product model in three space from the information about the view plane and the position of the input or selected figure element on the view plane. Then, the 2D and 3D integrated graphics processing section 15 computes the origin and angles of the product model to be arranged from the shape information about the three-dimensional product model in consideration of the drawing regulation about the figure element. Thus, the calculation is performed by use of the two-dimensional drawing information and drawing method defined by a plurality of drawing regulations to obtain the geometric information about the product model in three space. The 2D and 3D integrated graphics processing section 15 determines the three-dimensional placement parameters on the basis of the above two calculating results, thereby reducing the amount of input data required for such the placement operation in three space.

Figure 16:
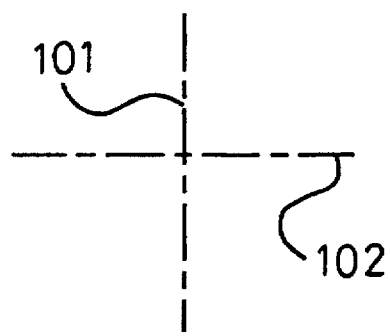
FIGS. 16(a)–(c) are schematic diagrams showing an example of a placement operation on a solid object by use of two-dimensional figure elements in a CAD system according to another embodiment of the present invention.
Figure 16:
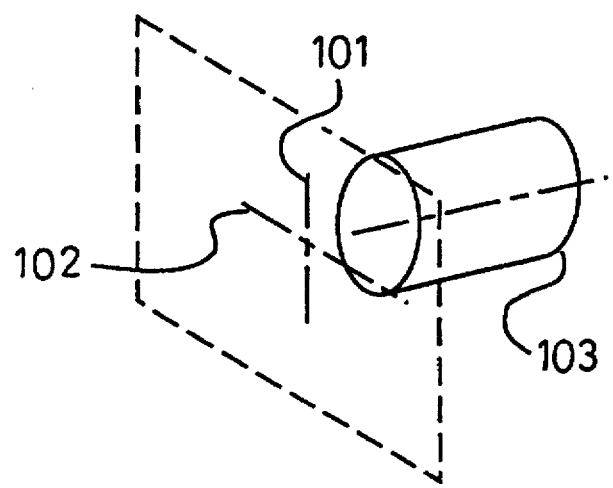
Figure 16:
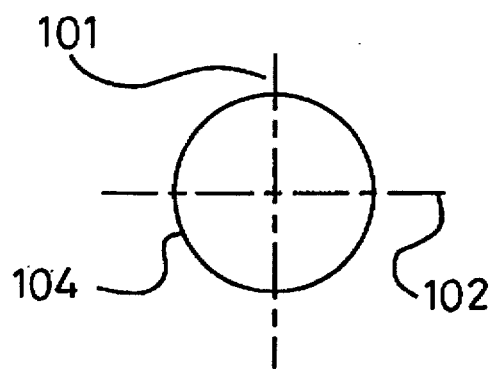
Figure 17:
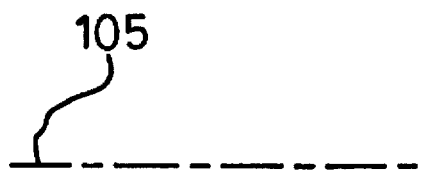
FIGS. 17(a)–(c) are schematic diagrams showing an example of a placement operation on a solid object by use of a two-dimensional figure element in the CAD system.
Figure 17:
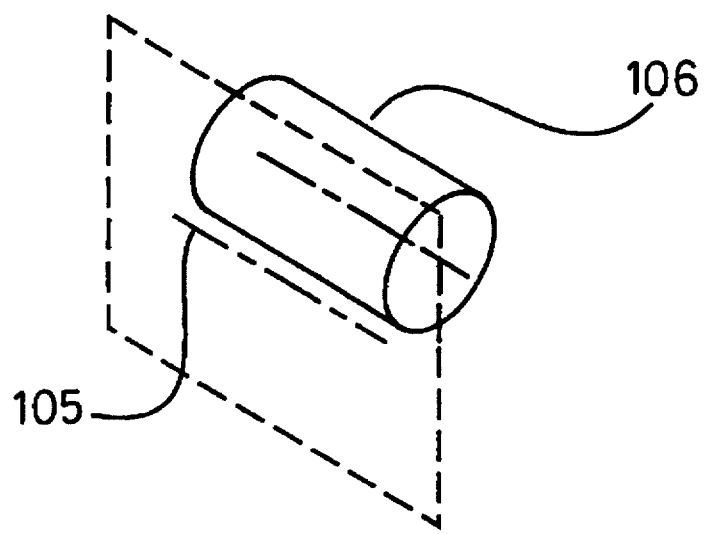
Figure 17:
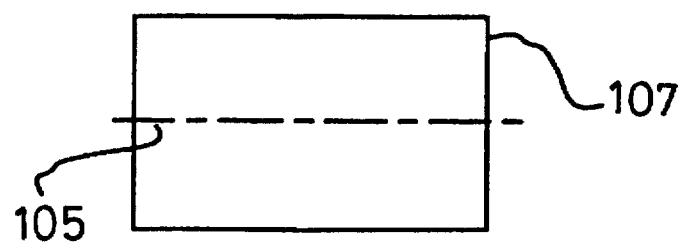

Now, the description will be directed to operations of the two-dimensional/three-dimensional integrated CAD system of this embodiment by reference to FIGS. 16(a)-(c) to 21. FIGS. 16(a)-(c) and 17(a)-(c) show examples of a placement operation on a cylinder by use of different reference figure elements for arranging the cylinder. In FIGS. 16(a)-(c), an example of an operation of arranging a cylinder is shown, and a dashed cross line is selected as a reference figure for arranging a cylinder. In FIGS. 17(a)-(c), another example of an operation of arranging a cylinder is shown, and a dashed center line is selected as a reference figure for arranging a cylinder.

FIG. 16(a) shows two-dimensional figure elements for applying a placement rule. In the figure, the two dashed lines 101 and 102 which go across each other are chosen as a reference figure for arranging a cylinder. Hereinafter, the first view plane is referred to as the view plane including these cross lines 101 and 102. FIG. 16(b) shows the internal three-dimensional placement process which is performed in accordance with the placement rule. When the lines 101 and 102 which cross are selected as the reference figure for arranging a cylinder, the CAD system arranges the cylinder 103 in such a manner that the central axis of the cylinder is perpendicular to the first view plane including the cross lines 101 and 102 and runs through the intersection of the Cross lines 101 and 102. The circle 104 shown in FIG. 16(c) is a projection of the cylinder 103 onto the first view plane.

FIG. 17(a) shows a two-dimensional figure element for applying a placement rule. In the figure, the center lines 105 is chosen as the reference figure for arranging a cylinder. The first view plane is referred to as the view plane including the center line 105. FIG. 17(b) shows the internal three-dimensional placement processing which is performed in accordance with the placement rule. When the center line 105 is selected as a reference figure for arranging a cylinder, the CAD system arranges the cylinder 106 in such a manner that the central axis of the cylinder is parallel to the first view plane including the center line 105 and is coincident with the center line 105 if the central axis of the cylinder is moved in the viewing direction. Furthermore, the cylinder 106 is positioned such that the line, which is perpendicular to the first view plane and runs through the midpoint of the center line 105, also runs through the midpoint of the central axis. The rectangle 107 shown in FIG. 17(c) is a projection of the cylinder 105 onto the first view plane.

Figure 18:
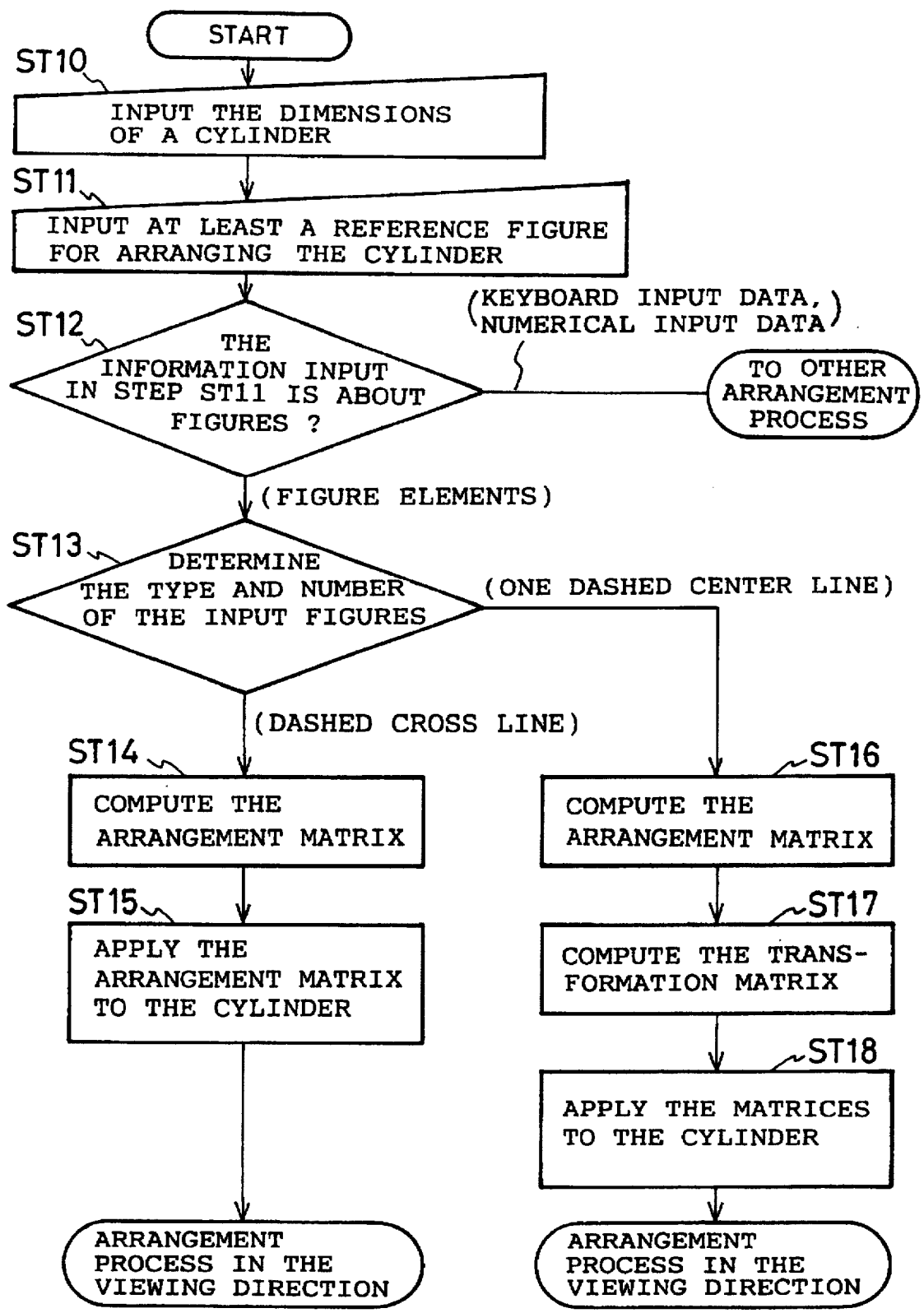
FIG. 18 is a flow diagram showing the placement operation of the CAD system by use of a two-dimensional figure.

Referring now to FIG. 18, it illustrates a flow diagram of the aforementioned placement operation of the CAD system according to this embodiment. In step ST10, a user inputs dimension parameters (diameter, height) of the cylinder. In step ST11, the user inputs a reference figure for arranging the cylinder. In step ST12, the CAD system judges the type of the information input by the user in the previous step. If the data are keyboard input data numerical input data such as the two-dimensional coordinates of a point, the CAD system shifts to perform another operation. When two-dimensional figure elements as shown in FIG. 16(a) or 17(a) are input, the CAD system, in step ST13, determines the type and number of the two-dimensional figure elements and then performs the following operations only if the input two-dimensional figure is equivalent to the one which has been already defined as the reference figure for arranging a cylinder according to the cylinder placement rule stored in the CAD system.

When the input reference figure for arranging a cylinder is equivalent to the dashed cross line as shown in FIG. 16(a), the CAD system, in step ST14, computes the placement matrix for arranging the central axis of the cylinder on the line which is perpendicular to the first view plane including the dashed cross line and runs through the intersection of the dashed cross line. In step ST15, the CAD system applies the placement matrix to the cylinder and advances to perform a further placement operation with respect to the viewing direction. When the input reference figure for arranging a cylinder is equivalent to the dashed center line as shown in FIG. 17(a), the CAD system, in step ST16, computes the placement matrix for arranging the cylinder in such a manner that the central axis of the cylinder is parallel to the first view plane including the center line and is coincident with the center line if the central axis of the cylinder is moved in the viewing direction. Furthermore, in step ST17, the CAD system computes the transformation matrix for positioning the cylinder in such a manner that the line, which is perpendicular to the first view plane and runs through the midpoint of the center line, also runs through the midpoint of the central axis. In step ST18, the CAD system applies the placement matrix to the cylinder and then advances to perform a further placement operation with respect to the viewing direction. Thus, the CAD system determines the position of the projection of the cylinder on the first view plane.

Figure 19:
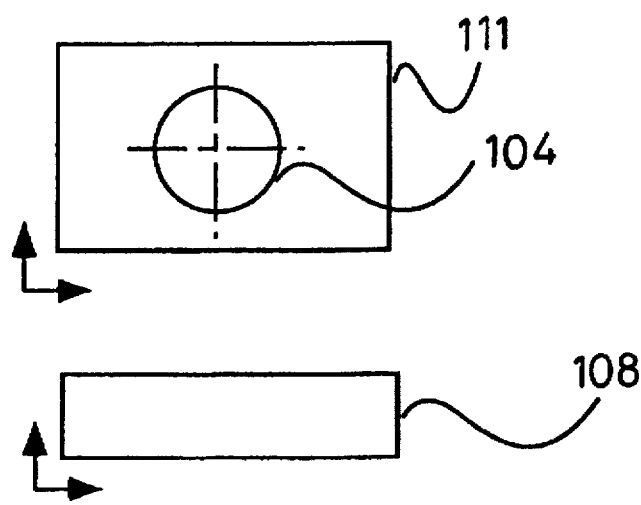
FIGS. 19(a) and 19(b) are schematic diagrams showing an example of the placement operation in the direction of depth according to the above embodiment.
Figure 19:
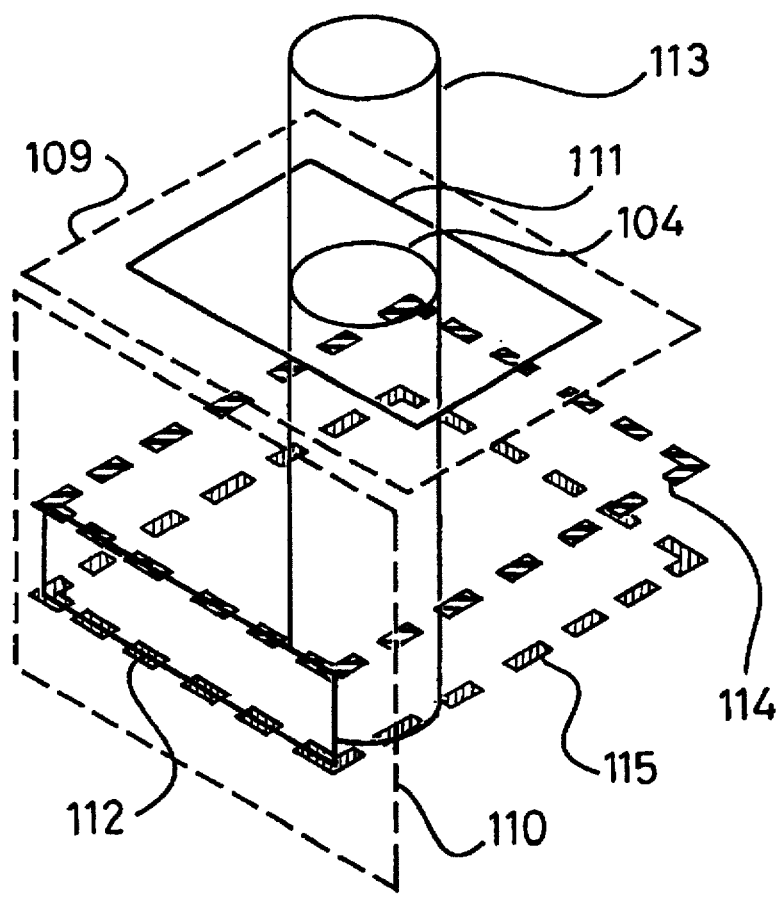

Next, the description will be directed to the further placement operation with respect to the direction of depth perpendicular to the first view plane in the case that the cross line in FIG. 16(a) is selected. FIGS. 19(a) and 19(b) shows an example of the placement operation in the viewing direction perpendicular to the first view plane. As shown in FIG. 19(a), the two-dimensional drawing includes the figure 104 which is arranged according to the placement operation shown in FIG. 18. Reference numeral 108 denotes a two-dimensional figure obtained by projection of another solid object on the second view plane which differs from the first view plane. The CAD system automatically computes the position of the cylinder from the two-dimensional figure in accordance with the following operation. Referring now to FIG. 19(b), it illustrates the concept of the placement operation with respect to the direction of depth. Reference numeral 109 denotes the first view plane in three space and reference numeral 110 denotes the second view plane in three space. Reference numerals 111 and 112 denote two-dimensional figures on the view planes, respectively. The CAD system creates an imaginary object 113, i.e., a lateral surface which is obtained when the circle-shaped projection 104 is indefinitely moved parallel to itself along the viewing direction perpendicular to the first view plane in order to determine the position of the cylinder in the direction of depth. That is, the imaginary object is a cylinder indefinitely extended in both directions of bases. Furthermore, the CAD system considers surfaces which are obtained when the two-dimensional FIG. 112 is moved parallel to itself along the viewing direction perpendicular to the second view plane 110. The CAD system obtains the surfaces 114 and 115 which intersect with the imaginary object 113. Then, the CAD system determines that the surface 114 is the one on which the cylinder is placed, since the surface 114 is the nearest surface to the first view plane 109.

Figure 20A:
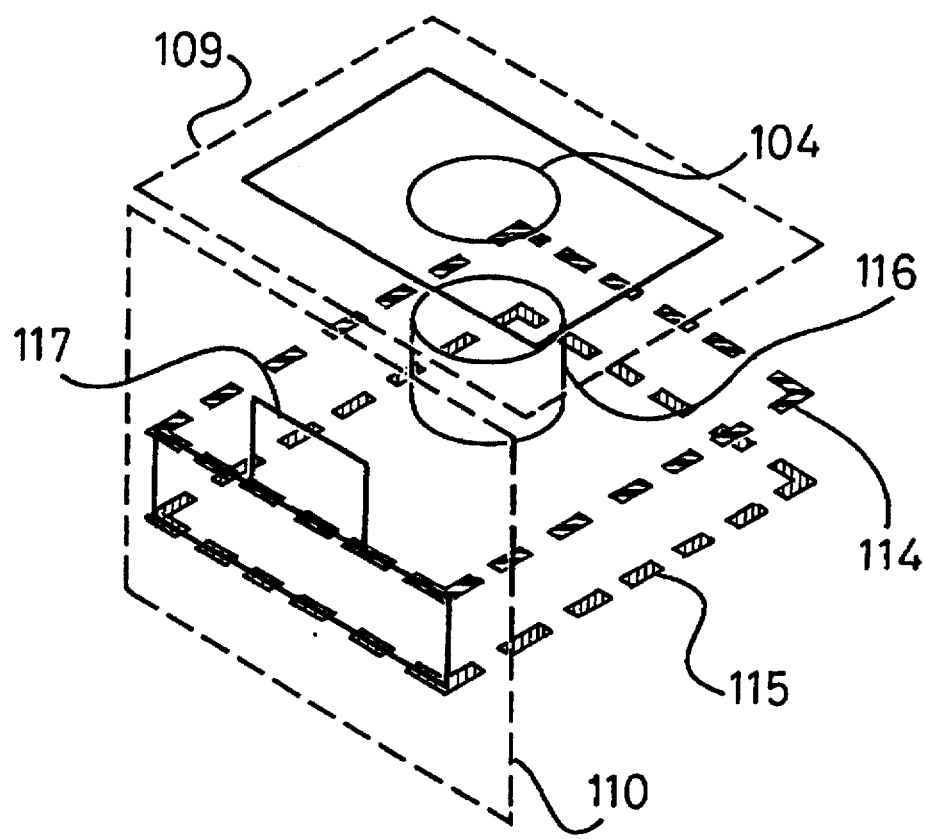
FIGS. 20(a) and 20(b) are schematic diagrams showing the result of the example of the automatically placement operation in the direction of depth shown in FIGS. 19(a) and 19(b).
Figure 20B:
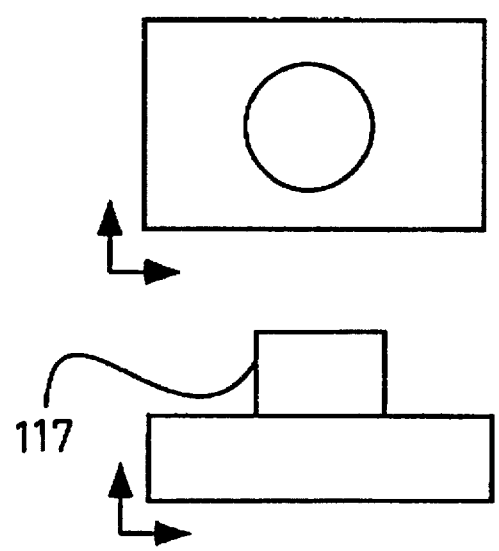

Referring now to FIGS. 20(a) and 20(b), they illustrate the result of the aforementioned example of the automatically placement operation in the direction of depth shown in FIGS. 19(a) and 19(b). As shown in FIG. 20(a), the right cylinder 116 is arranged on the surface 114 which is chosen according to the above placement operation. The two-dimensional figure 117 is a projection of the cylinder 116 onto the second view plane 110. FIG. 20(b) shows the top and front views created according to the above placement operation in the direction of depth.

Referring now to FIG. 21, it illustrates a flow diagram showing the placement operation in the direction of depth shown in FIGS. 19(a) to 20(b). In step ST20, the CAD system creates the imaginary object 113 by indefinitely moving the two-dimensional FIG. 104 parallel to itself along the viewing direction perpendicular to the first view plane and temporarily stores the imaginary object data in a memory. In step ST21, the CAD system selects surfaces of a solid object suitable for the place, on which the cylinder is to be placed, which intersect with the imaginary object by searching solid objects registered in the CAD system. Then, the CAD system performs the following operations to select the surface on which the cylinder is to be arranged.

In step ST22, the CAD system obtains the matrix of a view plane perpendicular to the first view plane, e.g., the second view plane, by reference to view information about view planes stored in the view plane management data base 19. In step ST23, the CAD system transforms a two-dimensional figure on the view plane, which is a projection of an object on which the cylinder is to be arranged, into a solid object by use of the matrix of the view plane. The CAD system generates the three-dimensional object by moving the two-dimensional figure parallel to itself along the viewing direction perpendicular to the view plane to provide the imaginary surfaces of the solid in step ST24. In step ST25, the CAD system determines whether the imaginary surfaces obtained in step ST24 intersect with the imaginary object 113 temporarily stored in the memory in step ST20. If any one of the imaginary surfaces intersect with the imaginary shape, the CAD system, in step ST26, registers all the surfaces which intersect with the imaginary object in the form of an array of surfaces suitable for the place on which the cylinder is to be arranged.

The processes in steps ST23 to ST26 are repeated if there is another two-dimensional figure on the view plane. Furthermore, the processes in steps ST22 to ST26 are repeated for another view plane perpendicular to the first view plane. In step ST27, the CAD system numbers the registered surfaces suitable for the place on which the cylinder is to be placed in the order of their distance from the first view plane and extracts the nearest surface to the first view plane. Finally, the cylinder is placed on the surface.

Thus, the CAD system automatically arranges a cylinder in three space and generates views as shown in FIG. 20(b) by inputting or selecting two-dimensional figure elements such as the dashed lines 101 and 102 which cross as shown in FIG. 16(a). The CAD system makes it possible to perform a three-dimensional placement operation by using a drawing method defined by a plurality of drawing regulations associated with placements and information on two-dimensional drawings. Furthermore, the CAD system computes the placement parameters in accordance with placement rules based on the drawing method defined by a plurality of drawing regulations, thereby reducing the amount of input operations and input data required for such the three-dimensional placement.

The description will be directed to another embodiment of the present invention using the aforementioned placement rule (2)-(b). The CAD system according to the embodiment is also provided with the structural elements shown in the block diagram of FIG. 12.

According to this embodiment, the 2D and 3D integrated graphics processing section 15 uses a two-dimensional figure element and information about a two-dimensional projection when performing a three-dimensional placement operation for a product model. That is, the 2D and 3D integrated graphics processing section 15 arranges a three-dimensional object or a product model using a two-dimensional figure element which is input or selected by a user. According to this embodiment, there can be two methods for arranging a product model. In the first method, users must determine a correspondence between the product model, which users intend to arrange, and the two-dimensional figure element which users select. In the second method, the CAD system automatically establishes a correspondence between the product model, which users intend to arrange, and the two-dimensional figure element which users select on the basis of the shapes of the product model and two-dimensional figure element. In this method, the 2D and 3D integrated graphics processing section 15 retrieves the data of the selected two-dimensional figure element from the drawing data base 22 and the three-dimensional shape data of the product model which is to be arranged from the solid object data base 23, and then compares those data to determine a correspondence between the two-dimensional figure element and the elements of the product model.

After the correspondence between the two-dimensional figure element and the figure elements of the solid object is determined, the 2D and 3D integrated graphics processing section 15 obtains information about view planes from the view plane management data base 19 and then computes the axis and surfaces of the object in three space as a reference for arranging the object from the position of the selected two-dimensional figure element on the view plane by means of the 3D parameters calculating section 16. The 2D and 3D integrated graphics processing section 15 computes the origin and angles of the object in three space in such a manner that the projection of a figure element of the product model is coincident with or similar to the selected two-dimensional figure element on the view plane. The solid object building section 18 specifies the three-dimensional placement parameters such as a translation matrix or a rotation matrix required for the placement operation. Thus, the 2D and 3D integrated graphics processing section 15 and solid object building section 18 can perform the placement operation on a three-dimensional object by use of information about a two-dimensional drawing and information about projections of the three-dimensional object, thereby reducing the time required for the calculation of three-dimensional placement parameters, and reducing the amount of input operations and input data required for the three-dimensional placement operations.

Figure 22:
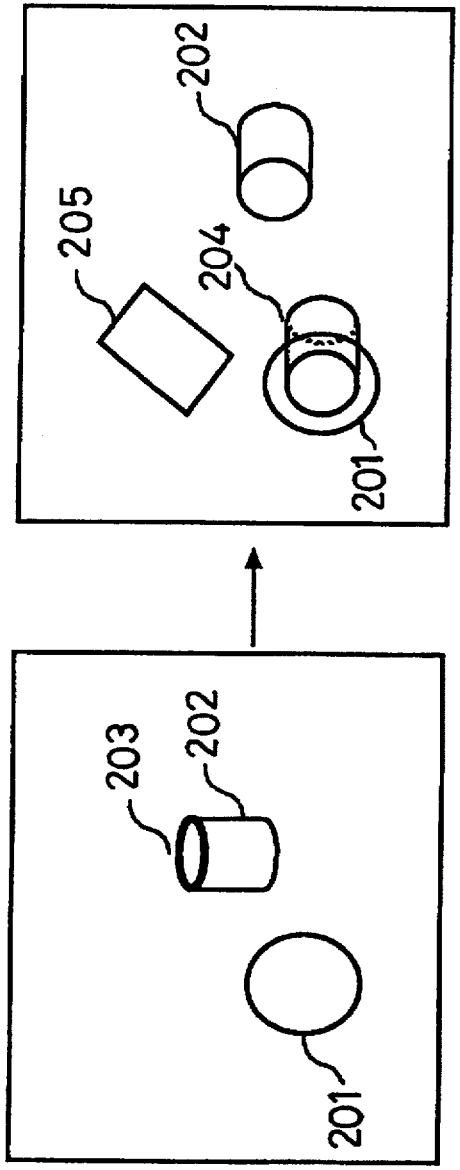
FIGS. 22(a) and 22(b) are views showing examples of a three-dimensional placement operation on a product model according to another embodiment of the present invention.
Figure 22:
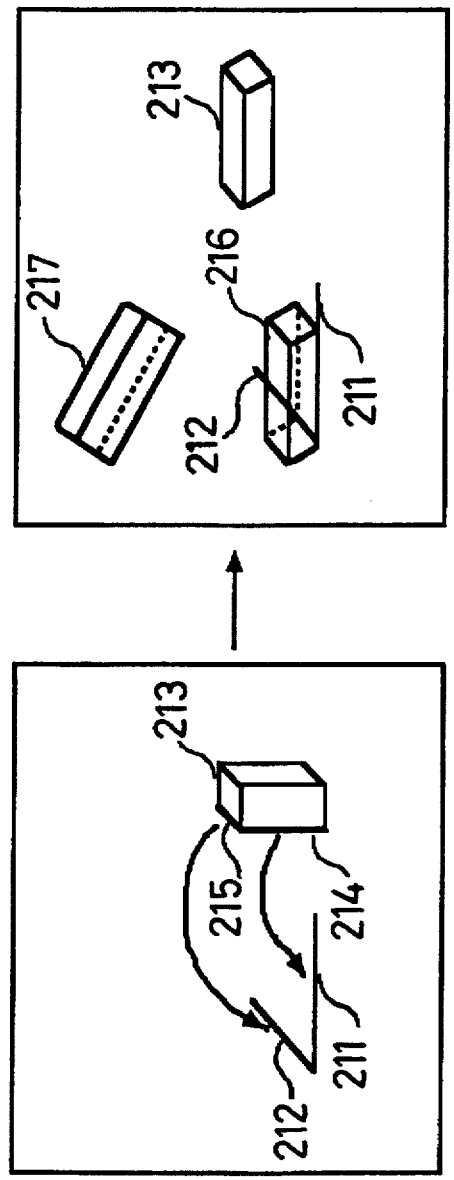
Figure 23:
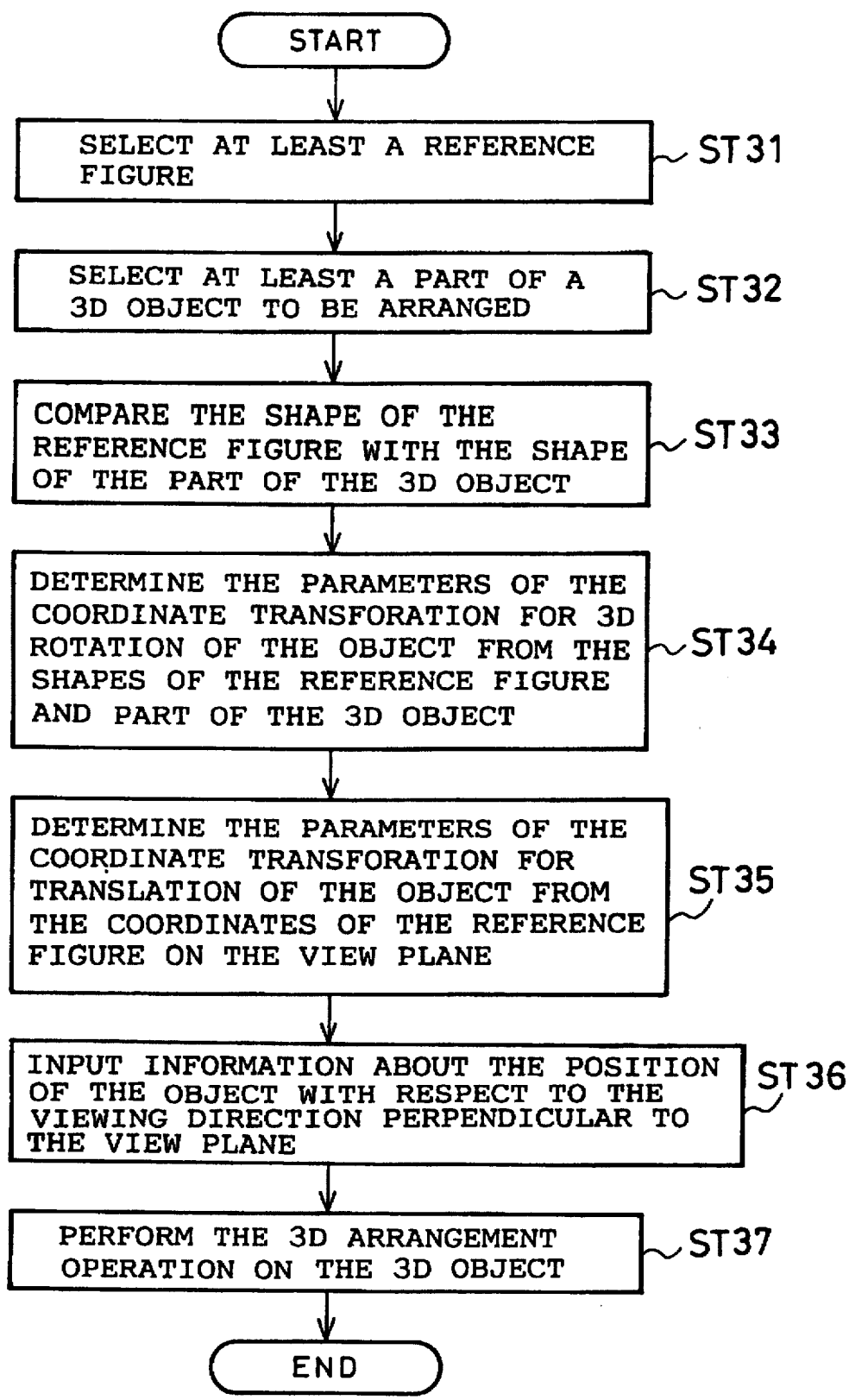
FIG. 23 is a flow diagram showing the three-dimensional placement operation of the embodiment.

Next, the description will be directed to examples of the aforementioned operation of the CAD system of this embodiment by reference to FIGS. 22(a), 22(b) and 23. FIGS. 22(a) and 22(b) show examples of the three-dimensional placement operation on a product model according to this embodiment. As shown in FIG. 22(a), when a user selects a two-dimensional FIG. 201, which is drawn on a drawing as a reference element for arranging an object, and an element 203 showing the origin for positioning the product model, e.g., the right cylinder 202, which is the target to be arranged, the CAD system receives these figure elements as input data together with the placement command. The CAD system determines that the user desires to arrange the right cylinder 202 in such a manner that the center of the ellipse 201 is coincident with the center of the element 203 and the ellipse 201 is similar to the orthographic projection of the element 203. In this case, the ellipse 201 is coincident with the projection obtained by projection of the element 203 if the major axis is equivalent to the diameter of the circle 203. The CAD system determines the parameters for the coordinate transformation to obtain the result on the view plane. Furthermore, the CAD system computes the parameters for the coordinate transformation to specify the position of the object 202 uniquely in three space by determining the placement parameters in the direction of depth perpendicular to the view plane. As a result, the CAD system applies the combination of transformations, i.e., a rotation followed by a translation of the three-dimensional object 202. The front view 204 is obtained by projection of the object 202 onto the front view plane. Orthographic projection of the object onto the top view plane creates the rectangle 205.

As shown in FIG. 22(b), when a user selects two-dimensional FIGS. 211 and 212, which are drawn on a drawing as reference elements for arranging an three-dimensional object, and elements 214 and 215 showing the origin for positioning the product model, e.g., a rectangular parallelepiped 213, which is the target to be arranged, the CAD system receives these figure elements as input data together with the placement command. The CAD system performs the placement operations on the object 213 in such a manner that the elements 214 and 215 have a one-to-one correspondence with the FIGS. 211 and 212. Since both the reference elements such as the FIGS. 211 and 212 and the origin elements of the object to be arranged such as the elements 214 and 215 are line segments, the CAD system judges that the figure elements 214 and 215 must overlap the reference elements 211 and 212 on the view plane, respectively. Furthermore, the CAD system determines the parameters of the coordinate transformation for rotation of the object such that the angle from the element 214 to the element 215 is equivalent to the angle from the FIG. 211 to the FIG. 212 on the view plane. After that, the CAD system obtains the parameters of the coordinate transformation to make the FIG. 211 overlap the projection of the element 214. Furthermore, the CAD system computes the parameters for the coordinate transformation to specify the position of the object 213 uniquely in three space by determining the placement parameters in the direction of depth perpendicular to the view plane. As a result, the CAD system applies the combination of transformations, i.e., a rotation followed by a translation to the object 213. The front view 216 is obtained by projection of the object 213 onto the view plane. Orthographic projection of the object onto the top view plane creates the two-dimensional FIG. 217.

Referring now to FIG. 23, it illustrates a flow diagram showing the aforementioned placement operation of this embodiment. The CAD system starts an operation of arranging a three-dimensional object by use of information about a drawing. In step ST31, a user selects at least one reference element for arranging a three-dimensional object. Furthermore, the user, in step ST32, selects at least one element of the three-dimensional object to be arranged, which will be manipulated independently just like a guide for arranging the main body of the object in three space. The CAD system compares the shapes of the reference element and element to be arranged in step ST33, and determines the parameters of the coordinate transformation for rotation of the object from the shapes of the reference element and element to be arranged in step ST34. Furthermore, the CAD system determines the parameters of the coordinate transformation for translation of the object in step ST35. Next, in step ST36, the user inputs the information about the position of the object with respect to the viewing direction perpendicular to the view plane. When the CAD system receives the input information, it determines the parameters of the coordinate transformation for the rotation followed by the translations in three space and applies the transformation to the solid object to be arranged, in step ST37. In step ST38, the three-dimensional placement operation is finished. In this embodiment, the reference figure for arranging an object is a figure which is created by users. Alternately, the reference figure is an orthographic projection. In this case, the CAD system must compare the shapes of the projection with the solid object which is the source of the projection to specify the placement parameters.

The CAD system according to this embodiment makes it possible to automatically determine the three-dimensional placement parameters of a transformation matrix for arranging a three-dimensional object so as to achieve the transformation of the object including rotations on the basis of information on two-dimensional figure elements, information about the shape of a three-dimensional object to be arranged and information about view planes. Therefore, when a user intends to arrange a three-dimensional object such that a selected element of the object is projected on a view plane according to a user's intention, the user does not need to give an instruction for arranging the object by use of three-dimensional coordinates. In addition, the user does not need to determine the order of rotations of the object and to calculate the rotational angles for the rotations. That is, the CAD system determines the parameters of the transformation matrix for rotations to automatically perform the rotational operations on a product model, thereby reducing the amount of input data required for the placement instruction, and further eliminating preparations for such the placement operation and shortening procedures of such the placement operation.

The description will be directed to another embodiment of the present invention using the aforementioned placement rule (2)-(c). The CAD system according to the embodiment is also provided with the structural elements shown in the block diagram of FIG. 12.

According to this embodiment, the 2D and 3D integrated graphics processing section 15 uses information about a plurality of orthographic views and information about shapes of product models when performing a three-dimensional placement operation on a product model. After a user gives an instruction of arranging a product model, the user needs to select two-dimensional figure elements on a view plane, i.e., the first view plane, so as to establish a one-to-one correspondence between figure elements of a solid object and figure elements of a two-dimensional figure. The 2D and 3D integrated graphics processing section 15 compares the information about the first view plane, on which the two-dimensional figure elements are drawn, with information about another view plane, i.e., the second view plane, and compares the positions of the figure elements of the solid object on first the view plane with the positions of the figure elements of the two-dimensional figure on the second view plane so as to extract the two-dimensional figure on the second view plane which corresponds to the selected figure elements of the solid object. Furthermore, the 2D and 3D integrated graphics processing section 15 compares the extracted figure with the figure on the second view plane which corresponds to the selected elements of the two-dimensional figure to determine the position of the extracted figure on the other view plane. The 2D and 3D integrated graphics processing section 15 obtains information about dimensions of the solid object with respect to the direction of depth perpendicular to the first view plane required for arranging the three-dimensional object on the second two-dimensional view plane to determine the three-dimensional placement parameters. Thus, the 2D and 3D integrated graphics processing section 15 and solid object building section 18 performs a three-dimensional placement operation on a product model by specifying the part of a solid object on which the former object is to be placed by using information about a plurality of views and information about the shapes of the solid objects, thereby reducing the amount of input data required for such the three-dimensional placement operation.

Figure 24:
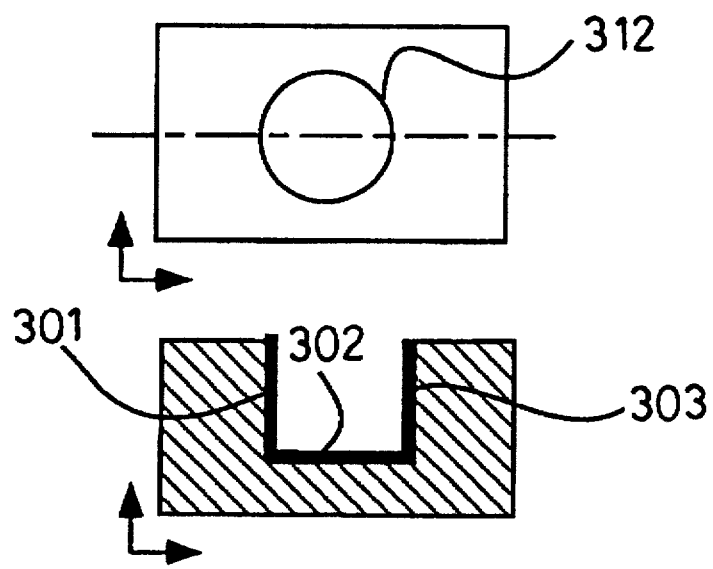
FIG. 24 is a diagram showing an example of a drawing on which a three-dimensional placement operation using two-dimensional figure elements is performed by a CAD system according to another embodiment of the present invention.
Figure 25:
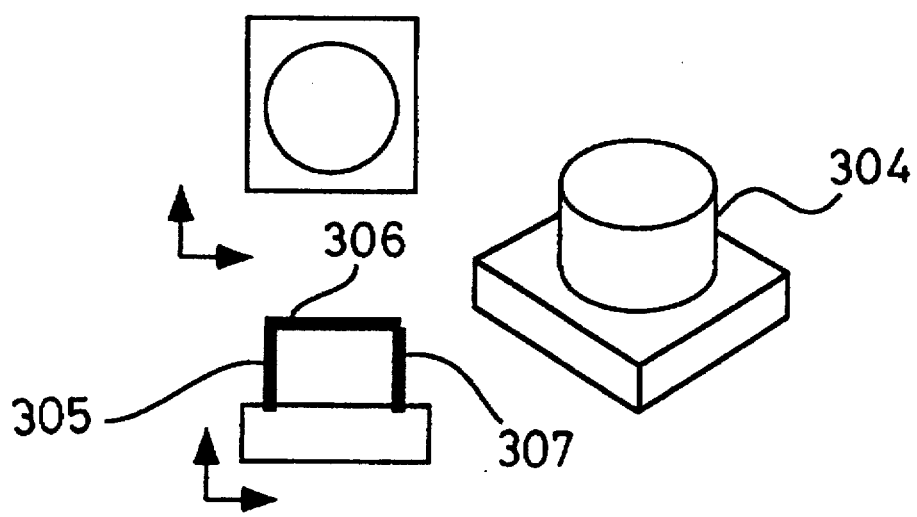
FIG. 25 is a diagram showing an example of a solid object, which is the target of the three-dimensional placement operation using two-dimensional figure elements according to the embodiment, and views of the object to be arranged.
Figure 26:
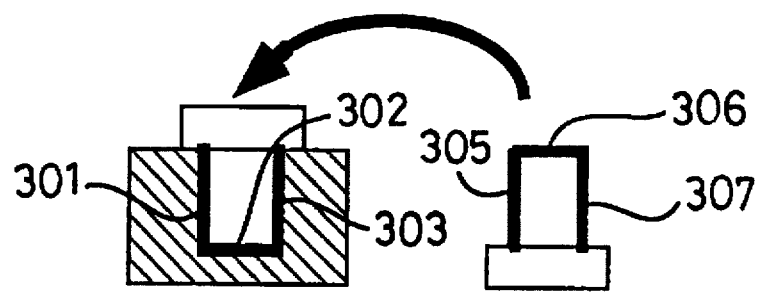
FIGS. 26(a) to 26(c) are diagrams showing the operation of arranging the solid object in FIG. 25 on the drawing in FIG. 24.
Figure 26:
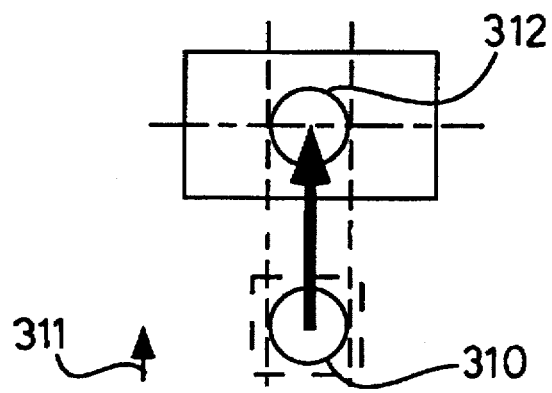
Figure 26:
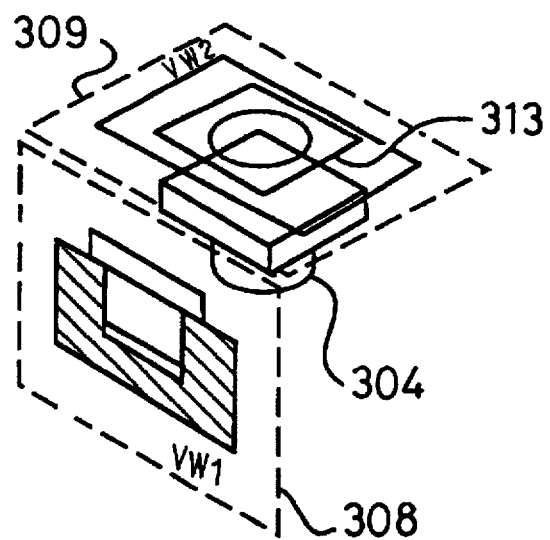
Figure 27:
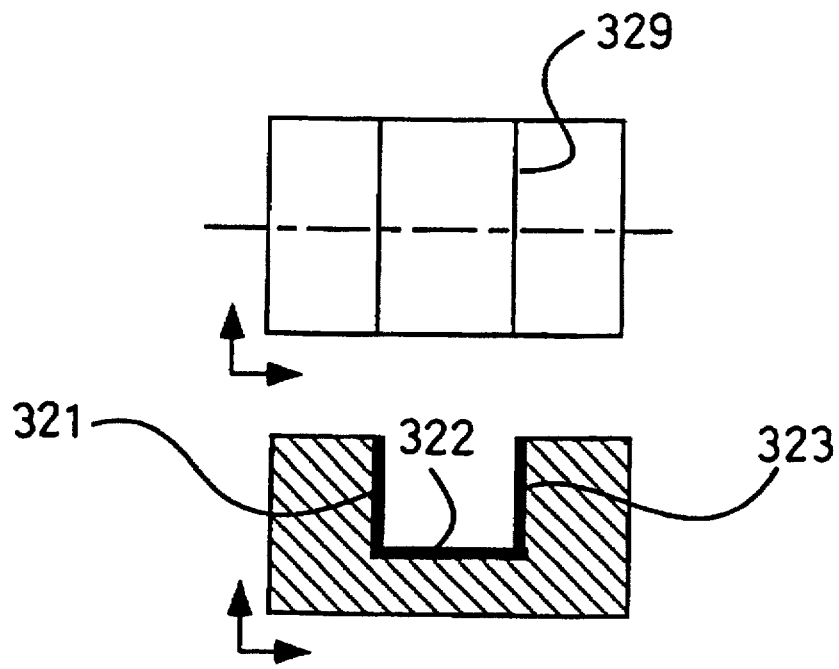
FIG. 27 is a diagram showing an example of a drawing on which a three-dimensional placement operation using two-dimensional figure elements is performed by the CAD system according to the embodiment.
Figure 28:
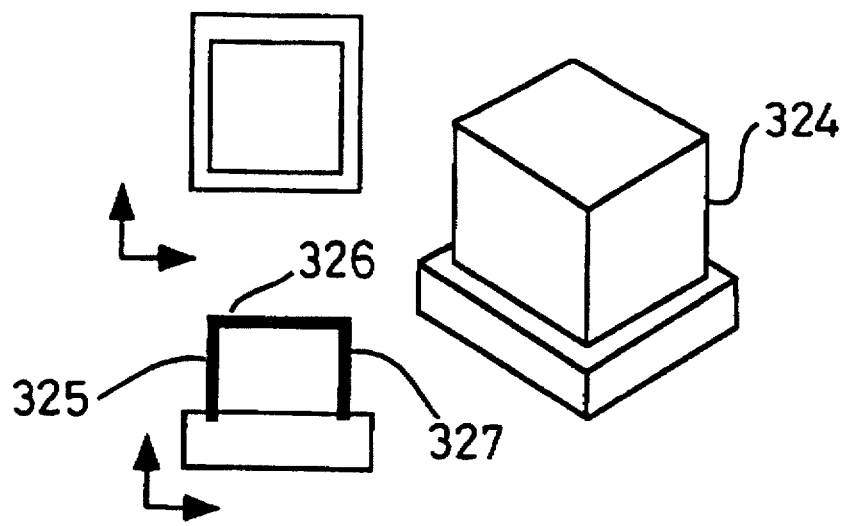
FIG. 28 is a diagram showing an example of a solid object, which is the target of the three-dimensional placement operation using two-dimensional figure elements according to the embodiment, and views of the object to be arranged.
Figure 29:
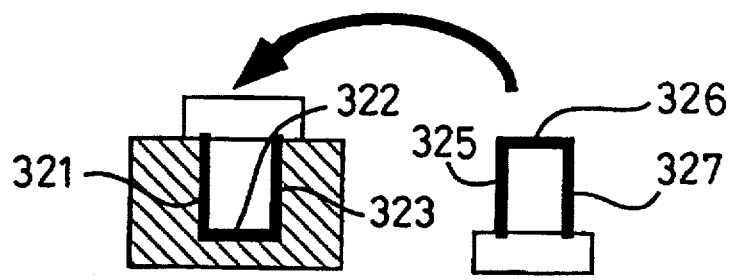
FIGS. 29(a) to 29(c) are diagrams showing the operation of arranging the solid object in FIG. 28 on the drawing in FIG. 27.
Figure 29:
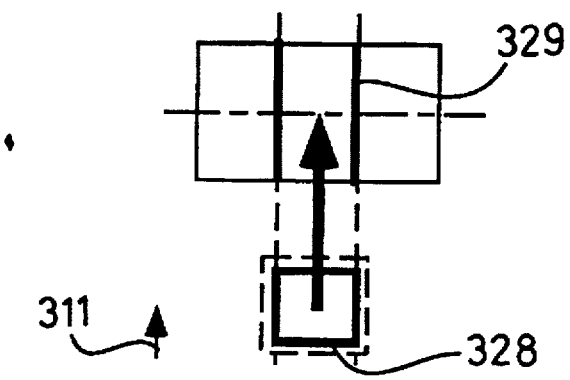
Figure 29:
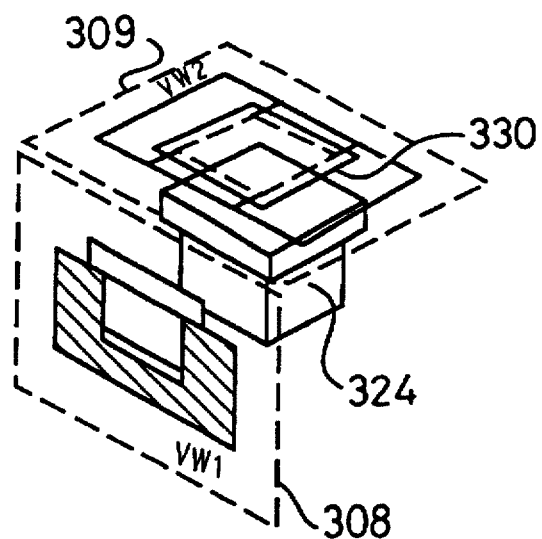

Hereinafter, the description will be directed to examples of the three-dimensional operation of the CAD system according to this embodiment by reference to FIGS. 24 to 30. In these examples, the CAD system arranges a orthographic projection of a solid object, which is created in the CAD system, on a drawing created by a user with a normal two-dimensional drawing function so as to arrange the solid object. FIGS. 24 and 27 show drawings, on which a solid object is to be arranged, created by a user with the two-dimensional drawing function. FIGS. 25 and 28 show product models to be arranged and the views of the product models created by the CAD system. FIGS. 26(a) to 26(c) show the operation of arranging the solid object in FIG. 25 on the drawing in FIG. 24. FIGS. 29(a) to 29(c) show the operation of arranging the solid object in FIG. 28 on the drawing in FIG. 27. The figure elements 305 and 307 of the solid object 304 in FIG. 25, which is the target of the placement operation, are projections of the lateral surface of the cylindrical protrusion. The figure elements 325 and 327 of the solid object 324 in FIG. 28, which is the target of the placement operation, are projections of the lateral flat surfaces of the rectangular parallelepiped-shaped protrusion. The placement operation mentioned below depends on the difference between the geometric shapes of these elements.

When a user selects two-dimensional figure elements 301, 302 and 303 in FIG. 24 as a figure which is the destination to which the object 304 is moved, and selects two-dimensional figure elements 305, 306 and 307 of the projection of the object 304 as a figure which is the target to be arranged, the CAD system searches for the three-dimensional figure elements of the solid object 304 which correspond the selected figure elements 305, 306 and 307 of the projection of the object in the 2D-3D link data base 21. As a result, the CAD system determines that the elements 305 and 306 belongs to a projection of the lateral surface of the cylindrical protrusion of the object 304 onto the front view plane and the element 306 belongs to a projection of the end face of the cylindrical protrusion.

As shown in FIG. 26(a), the CAD system computes a 4×4 transformation matrix to move the object 304 such that the projected figure elements 305, 306 and 307 in FIG. 25 of the solid object 304 to be arranged are coincident with the two-dimensional figure elements 303, 302 and 301 in FIG. 24 on the view plane. The transformation matrix is applied to the solid object 304. The result of the projection of the transformed object 304 onto the view plane (VW1) 308 including the two-dimensional figure element 301 is shown in FIG. 26(a). In this situation, the position of the object is not fixed with respect to the direction perpendicular to the view plane (VFW1) 308.

FIG. 26(b) shows an operation for determining the position of the object 304 with respect to the direction perpendicular to the view plane (VW1) 308. The CAD system temporarily creates a two-dimensional FIG. 310 by projection of the lateral surface of the cylindrical protrusion on the view plane (VW2) 309 which differs from the view plane (VW1) 308 on the basis of the information about the lateral surface of the cylindrical protrusion which results from the above searching operation. The CAD system searches two-dimensional figures which belong to the view plane (VW2) 309 and then detects the FIG. 312 which has the same shape as the FIG. 310 and is apart from the FIG. 310 in the direction of the vector 311 perpendicular to the view plane (VW1) 308. The CAD system transforms the translation vector V2 to make the two-dimensional FIG. 310 on the view plane (VW2) 309 overlap the two-dimensional 312 into the vector V3 in three space. The orthographic projection of the vector V3 in three space onto a vector perpendicular to the view plane (VW1) 308 yields a translation vector V4 for the object 304 lies along the direction perpendicular to the view plane (VW1) 308.

FIG. 26(c) shows an operation applying the translation vector V4 to the object. As shown in the figure, the projection of the object 304 on the view plane (VW1) 308 overlaps the two-dimensional figure which is the destination to which the object 304 is moved and the projection 313 of the object 304 on the view plane (VW2) 309 overlaps the two-dimensional FIG. 312. According to such the aforementioned operations, the CAD system of this embodiment can arrange a solid object in three space by referring to a two-dimensional figure and provide a desired drawing. In the above case, users need to position the object with respect to rotation about the axis of the cylindrical part.

In the case that the protrusion of the object has flat faces, when a user selects two-dimensional figure elements 321, 322 and 323 in FIG. 27 as a figure which is the destination to which the object 324 is moved, and selects two-dimensional figure elements 325, 326 and 327 of the projection of the object 324 as a figure which is the target to be arranged, the CAD system searches for the three-dimensional figure elements of the solid object 324 which correspond the selected figure elements 325, 326 and 327 of the projection of the object in the 2D-3D link data base 21. As a result, the CAD system determines that the elements 325 and 326 belongs to a projection of the lateral surfaces of the rectangular parallelepiped-shaped protrusion of the object 324 and the element 326 belongs to a projection of the end face of the rectangular parallelepiped-shaped protrusion.

As shown in FIG. 29(a), the CAD system computes a 4×4 transformation matrix to move the object 324 such that the projected figure elements 325, 326 and 327 in FIG. 28 of the solid object 324 to be arranged are coincident with the two-dimensional figure elements 323, 322 and 321 in FIG. 27 on the view plane. The transformation matrix is applied to the solid object 324. The result of the projection of the object 324 onto the view plane (VW1) 308 including the two-dimensional figure element 321 is shown in FIG. 29(a). In this situation, the position of the object is not fixed with respect to the direction perpendicular to the view plane (VW1) 308.

FIG. 29(b) shows an operation for determining the position of the object 324 with respect to the direction perpendicular to the view plane (VW1) 308. The CAD system temporarily creates a two-dimensional FIG. 328 by projection of the flat surfaces of the rectangular parallelepiped-shaped protrusion of the object 324 on the view plane (VW2) 309 which differs from the view plane (VW1) 308 on the basis of the information about the flat surfaces which results from the above searching operation. The CAD system searches two-dimensional figures which belong to the view plane (VW2) 309 and then detects the FIGS. 329 which are line segments parallel to the sides, which run in the direction of the vector 311, of the two-dimensional FIG. 328 and are apart from the FIG. 328 in the direction of the vector 311 perpendicular to the view plane (VW1) 308. As shown in FIG. 29(b), the length of the FIGS. 329 is not equal to those of the sides, which run in the direction of the vector 311, of the two-dimensional FIG. 328. The CAD system transforms the translation vector V2 to make the midpoints of the two sides of the two-dimensional FIG. 328 on the view plane (VW2) 309 overlap the midpoints of the two-dimensional FIGS. 329 into the vector V3 in three space. The orthographic projection of the vector V3 in three space onto a vector perpendicular to the view plane (VW1) 308 yields a translation vector V4 for the object 324 lies along the direction perpendicular to the view plane (VW1) 308.

FIG. 29(c) shows an operation applying the translation vector V4 to the object. As shown in the figure, the projection of the object 324 on the view plane (VW1) 308 overlaps with the two-dimensional figure which is the destination to which the object 324 is moved and the projection 330 of the object 324 on the view plane (VW2) 309 overlaps the two-dimensional FIG. 329. According to the aforementioned operations, the CAD system of this embodiment can arrange a solid object in three space by referring to a two-dimensional figure and provide a desired drawing. In the above case, users need to position the object with respect to the viewing direction perpendicular to the first view plane.

Figure 30:
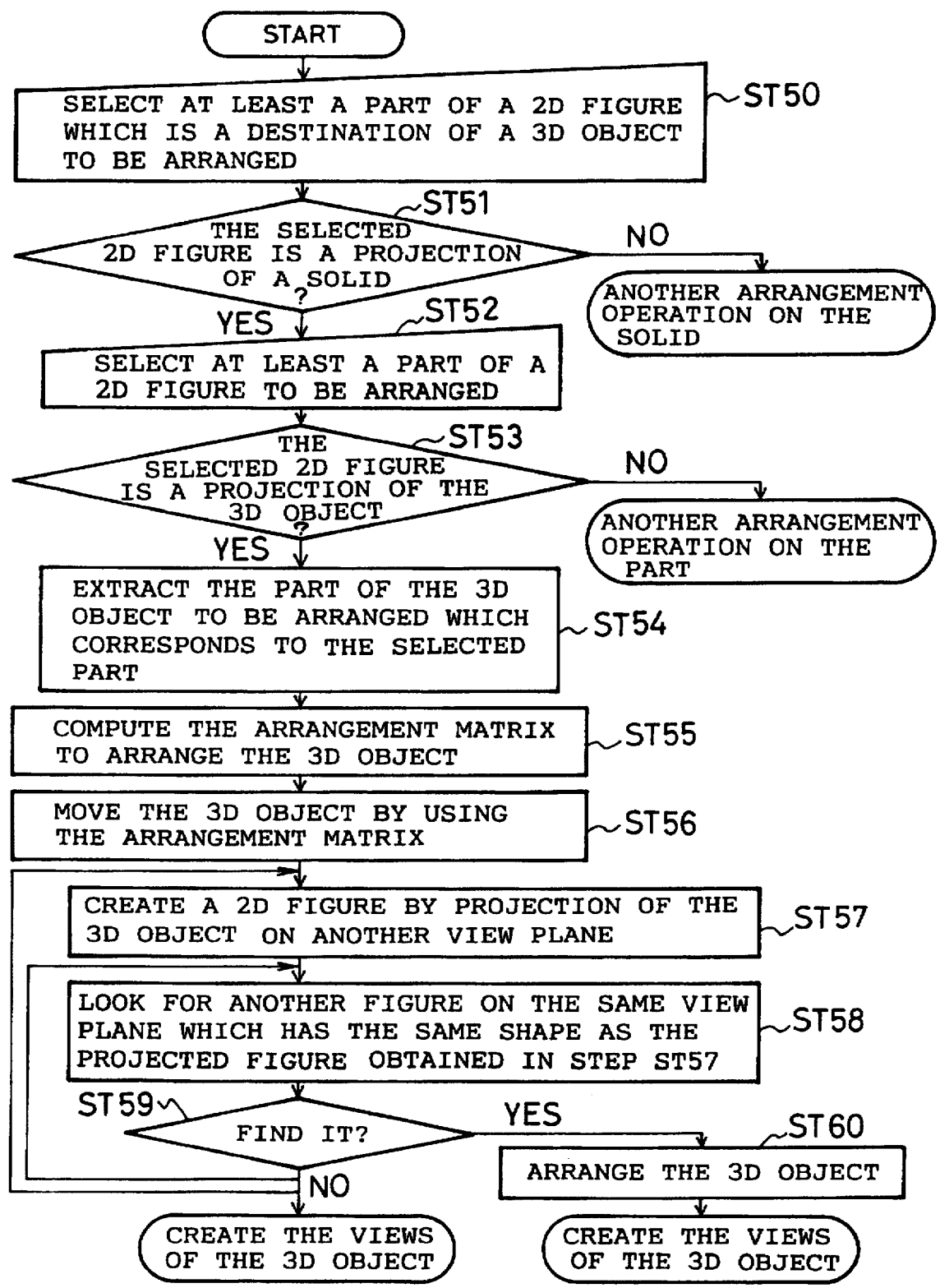
FIG. 30 is a flow diagram showing the above placement operations using two-dimensional figure elements according to the embodiment.

Referring now to FIG. 30, it illustrates a flow diagram showing the above placement operation of this embodiment. In step ST50, a user selects the two-dimensional figure which is the destination to which a product model is arranged. Then, the CAD system, in step ST51, judges whether or not the selected two-dimensional figure is a projection of a solid object. If the selected figure is a projection of an object, the CAD system shifts to perform another placement operation on the object. However, if the selected figure is a figure created with the two-dimensional drawing function of the CAD system, the CAD system then advances to step ST52 wherein the user further selects a figure of a solid object to be arranged. In step ST53, the CAD system judges whether or not the figure is a projection of the solid object to be arranged. If the selected figure is not a projection, the CAD system shifts to perform another placement operation on the figure. However, if the selected figure is a projection of the solid object, the CAD system proceeds to step ST54 to retrieve the shape of the solid object and the three-dimensional figure elements of the solid object which correspond to the two-dimensional figure selected as the target of the placement operation from the 2D-3D link data base 21. Then, in step ST55, the CAD system computes a 4×4 transformation matrix to make the two-dimensional figure, which is the target of the placement operation, overlap the other two-dimensional figure, which is the destination of the solid object to be arranged, in consideration of the view plane. The CAD system advances to step ST56 wherein it applies the matrix to the solid object to move the solid object.

The CAD system, in step ST57, temporarily creates a two-dimensional figure by projection of the solid object to be arranged on another view plane which differs from the view plane and stores the created two-dimensional figure data in a memory. The CAD system advances to step ST58 wherein it compares two-dimensional figures which belong to the other view plane with the above two-dimensional figure temporarily stored in the memory. Then, the CAD system looks for a figure on the other view plane, which corresponds to the destination figure, which has the same shape as the temporarily projected two-dimensional figure and are apart from the temporarily projected two-dimensional figure in the direction of the viewing vector of the view plane (VW1) 308. In step ST59, the CAD system judges whether or not there exists such a figure on the other view plane. If there exists a figure which satisfies the above condition, the CAD system obtains the transformation matrix to move the solid object from the translation vector to make the temporarily projected two-dimensional figure overlap the other two-dimensional figure found in step ST58, in step ST60. After the CAD system applies the transformation matrix to the solid object, the CAD system enables the drawing processing section to create two-dimensional orthographic views of the constructed product model. The CAD system repeats steps ST58 and ST59 until it finds a figure which has the same shape as the temporarily projected two-dimensional figure and are apart from the temporarily projected two-dimensional figure in the direction of the viewing vector of the view plane (VW1) 308. If there does not exist a figure which satisfies this condition, the CAD system returns to step ST 57 wherein it temporarily creates a two-dimensional figure by projection of the solid object to be arranged on another view plane and stores the temporarily created two-dimensional figure data in the memory. After that, the CAD system repeats steps ST58 and ST59.

Thus, the CAD system arranges a solid object in three-dimensional model space using fewer operations by reference to a two-dimensional figure, which is the destination of the solid object, created with the two-dimensional drawing function of the CAD system so as to obtain a desired drawing.

Since the CAD system according to this embodiment automatically determines the three-dimensional placement parameters for a placement operation on the basis of information about a plurality of views and information about the shapes of a product model to perform a placement operation on the product model in three space, it is not necessary to designate figure elements of solid objects to be arranged on plural view planes and input coordinates of solid objects to be arranged on plural view planes. Thereby the amount of input data required for the three-dimensional placement operations are reduced.

Next, the description will be directed to another embodiment of the present invention. The CAD system according to the embodiment is also provided with the structural elements shown in the block diagram of FIG. 12.

In the stage of creating two-dimensional orthographic views from a product model, the drawing processing section 20 produces a two-dimensional figure on each view plane in consideration of attribute data representing shapes of details of the product model. That is, when a user provides an end portion, e.g., a side or the like of a two-dimensional figure on a view plane, with a particular shape such as a fillet or a chamfer by use of a two-dimensional modifying operation, the CAD system modifies the two-dimensional drawn figure by use of a two-dimensional drawing operation if the figure is created by the user. However, the CAD system judges that the fillet or chamfer is the one given to a corresponding edge of the product model if the figure is a projection of the product model. In this case, the 2D to 3D transformation processing section 17 provides an edge of an object with a fillet or chamfer attribute without modifying a three-dimensional geometric data of the object. When projecting a product model with a shape attribute onto a view plane, the drawing processing section 20 performs a two-dimensional drawing processing on the projection of the three-dimensional object on the view plane in accordance with the shape attribute to realize the detailed shape of a part of the projection. Thus, the CAD system obtains two-dimensional projected figures of the three-dimensional product model, the details of which are defined by shape attributes such as fillet attributes and chamfer attributes.

Figure 31:
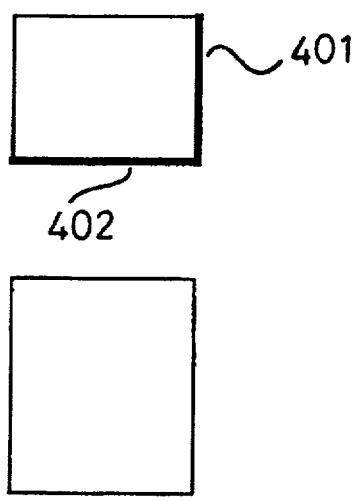
FIG. 31 is a diagram showing an example of a drawing on which the drawing process using a fillet attribute is performed by a CAD system according to another embodiment of the present invention.
Figure 32:
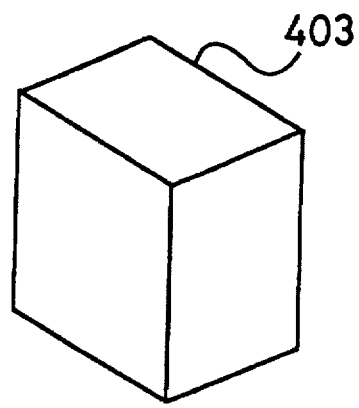
FIG. 32 is a diagram showing the solid object which is the source of the two-dimensional projected figures shown in FIG. 31 and is a target of the fillet attribute.
Figure 33:
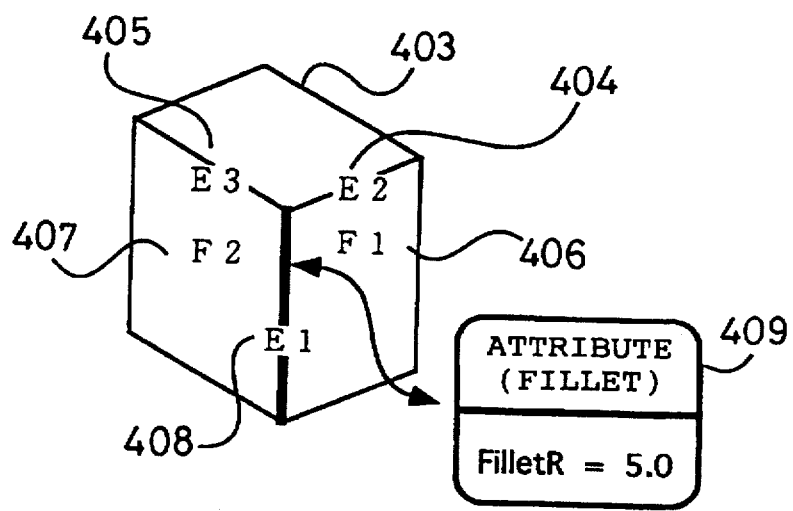
FIGS. 33(a) and 33(b) are diagrams showing the solid object having an edge to which the fillet attribute is added and a relationship between the edge and other three-dimensional figure elements of the object.
Figure 33:
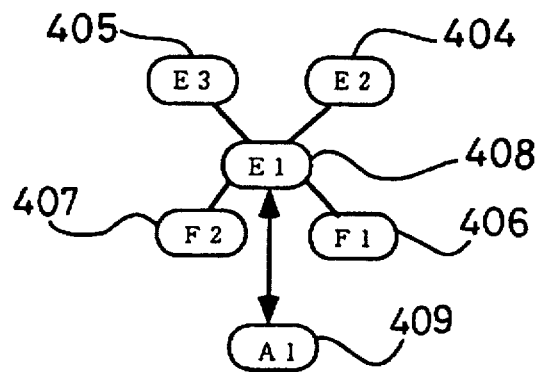

Next, the description will be directed to the operation of the 2D and 3D integrated CAD system according to this embodiment by reference to FIGS. 31 to 37. FIG. 31 shows two-dimensional projections of a three-dimensional object which is built by the CAD system. Reference numerals 401 and 402 denote two-dimensional figure elements, i.e., sides of the figure selected by a user to provide the corner where the two sides 401 and 402 join with a fillet. FIG. 32 shows the product model 403 which is the source of the two-dimensional figures in FIG. 31.

FIGS. 33(a) and 33(b) illustrate the figure elements of the product model 403 which correspond to the two-dimensional figure elements 401 and 402, and a relationship among the three-dimensional figure elements. The figure elements of the object are shown in FIG. 33(a) and the relationship is shown in FIG. 33(b). The two-dimensional figure element 401 in FIG. 31 is obtained by projection of the edge (E2) 404 and surface (F1) 406 in FIG. 33(a). The two-dimensional FIG. 402 in FIG. 31 is obtained by projection of the edge (E3) 405 and surface (F2) 407 in FIG. 33(a). The CAD system finds the edge (E1) 408 connected with the two surfaces of the solid object 403 which correspond to the two-dimensional FIGS. 401 and 402, i.e., the surface (F1) 406 and surface (F2) 407, by searching the connecting relationship in FIG. 33(b). Then, the CAD system adds the attribute (A1) 409 to the edge (E1) 408. The attribute (A1) 409 is a fillet attribute provided with information about dimensions of a fillet, i.e., the R of a fillet (or the radius of a fillet).

Figure 34:
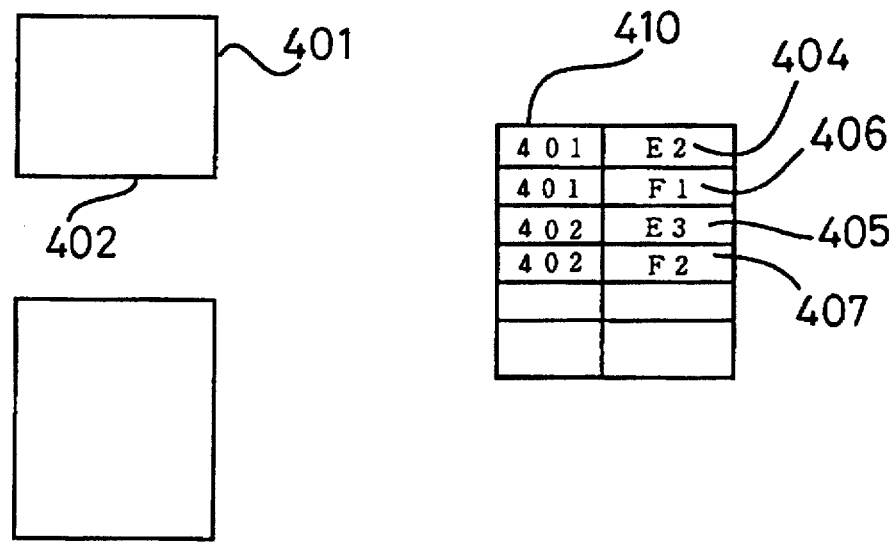
FIG. 34 is a diagram showing projections of the solid object with the fillet attribute shown in FIG. 33 and the 2D–3D link data table of the object.
Figure 35:
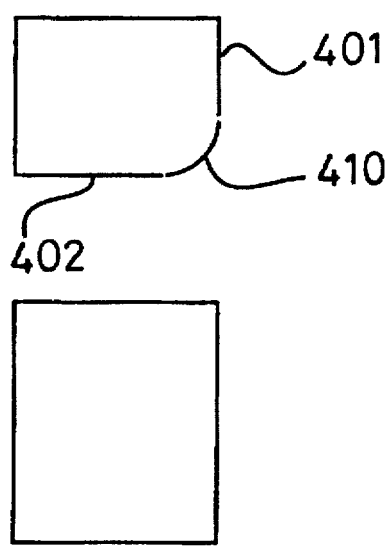
FIG. 35 is a diagram showing views obtained by projection of the solid object with the fillet attribute shown in FIG. 33.

Referring now to FIG. 34, it illustrates projections of the product model 403 and the 2D-3D link data table. The CAD system searches for attributes added to the object 403 and finds the attribute (A1) 409. Then, the CAD system searches for the figure element to which the attribute (A1) 409 is added and finally obtains the two surfaces connected with each other through the edge, i.e., the surface (F1) 406 and surface (F2) 407. The CAD system recreates the two-dimensional figure elements 401 and 402 from the 2D-3D link data by projection of the surfaces (F1,F2) 406 and 407. Furthermore, the CAD system performs the two-dimensional fillet process on the corner where the two-dimensional figure elements 401 and 420 join to form the fillet 410, as shown in FIG. 35.

Figure 36:
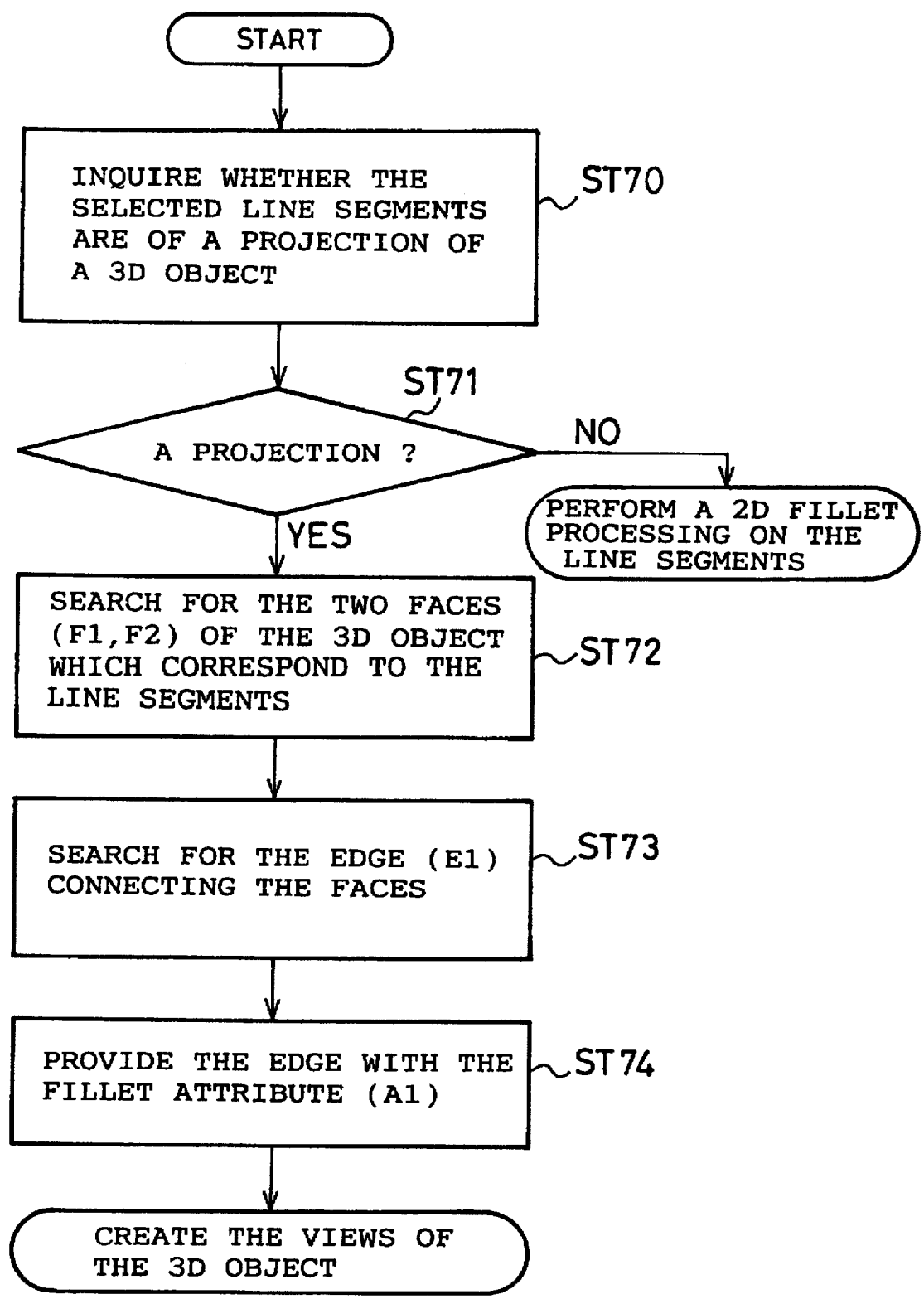
FIG. 36 is a flow diagram showing the operation of providing an edge of a product model with a fillet attribute.
Figure 37:
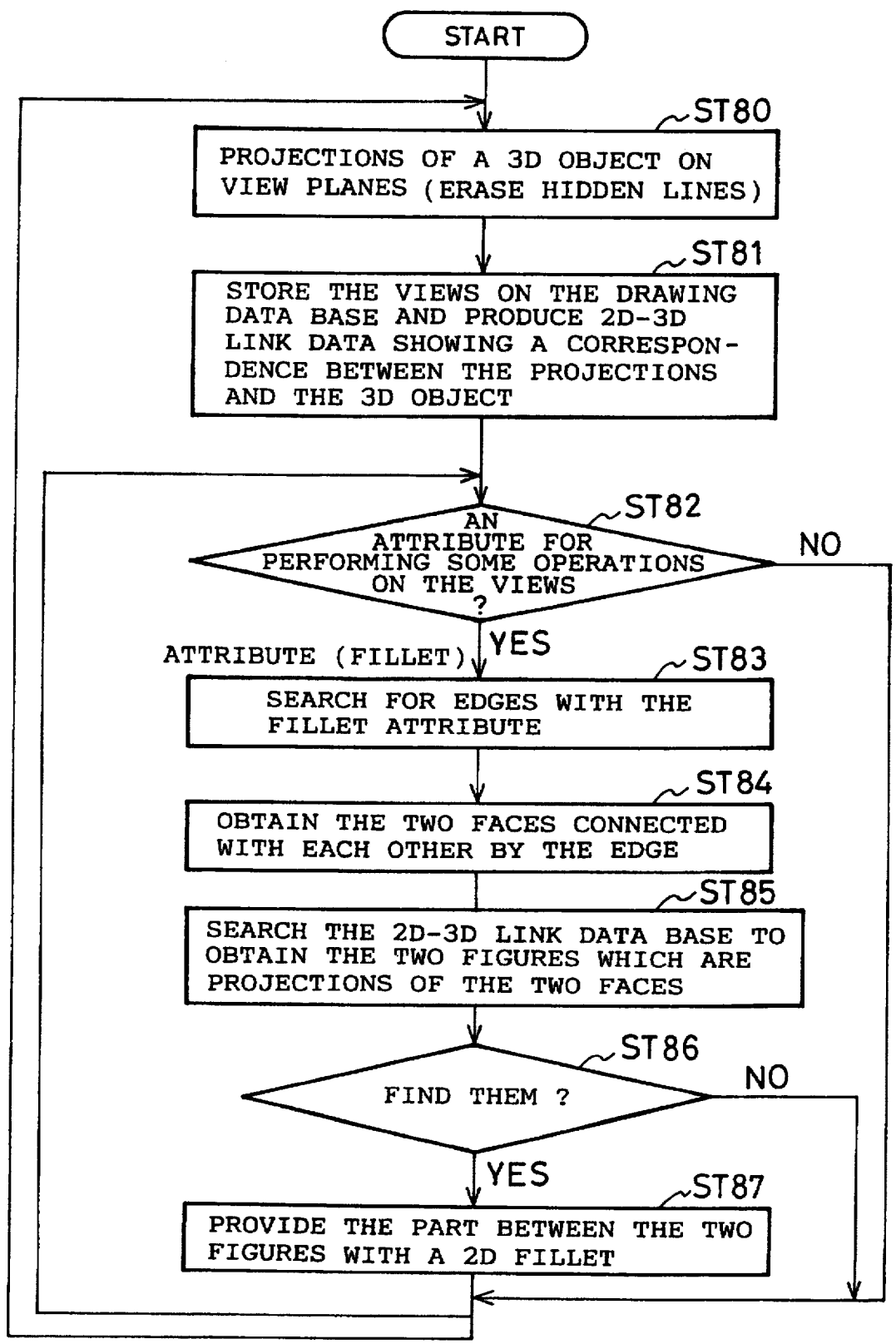
FIG. 37 is a flow diagram showing the operation of creating a two-dimensional drawing of a product model with fillet attribute.

Referring now to FIGS. 36 and 37, they illustrate flow diagrams showing the operations mentioned above. FIG. 36 shows the operation of providing an edge of a product model with a fillet attribute. FIG. 37 shows the operation of creating a drawing of a product model with a fillet attribute.

As shown in FIG. 36, the CAD system, in step ST70, inquires of the 2D and 3D integrated processing section 15 whether the two-dimensional figure elements, i.e., the two line segments (sides) selected as the target of a fillet attribute by a user are a part of an orthographic projection of a product model. In step ST71, the CAD system judges the answer from the 2D and 3D integrated processing section 15 and then advances to step ST71 to perform a two-dimensional fillet process on the selected elements if the answer is "No". If the selected figure elements are included in a projection of an object, the CAD system proceeds to step ST72 wherein it searches for the two surfaces F1 and F2 of the product model which is the projection source of the two line segments. Then, the CAD system, in step ST73, obtains the edge E1 of the object connected with both of the two surfaces F1 and Finally, the CAD system provides the edge E1 with the fillet attribute A1 in step ST74.

As shown in FIG. 37, when the CAD system starts up a drawing operation on a product model with a fillet attribute, it creates an orthographic view of the product model on a view plane and erases hidden lines on the view, as shown in step ST80. The CAD system advances to step ST81 wherein it stores the view data in the drawing data base 22 and produces the 2D-3D link data showing a correspondence between the projection and the object. Then, the CAD system, in step ST82, determines the type of an attribute added to the product model, that is, determines whether it needs to perform a further process for the drawing in accordance with an attribute. If the attribute does not require the further processing, the CAD system searches for another attribute and performs step ST82 again. On the contrary, the CAD system performs the following further process if the attribute requires the process. Hereinafter, the description will be directed to the further processing for a fillet attribute as an example. In step ST83, the CAD system searches for the edge E1 provided with the fillet attribute. The CAD system advances to step ST84 to obtain the two surfaces F1 and F2 connected with each other through the edge E1 by searching the relationship among the figure elements of the product model. Then, the CAD system, in step ST85, searches the 2D-3D link data base 21 to obtain the two-dimensional figures obtained by projection of the two surfaces F1 and F2 on the view plane perpendicular to the surfaces. If the CAD system can not find all of the projected figures in step ST86, it proceeds to search for another attribute. If there exist projected figures of both of the surfaces F1 and F2, the CAD system advances to step ST87 wherein it performs the two-dimensional fillet process defined by the fillet attribute on the corner where the two-dimensional projected figure elements 401 and 402 join.

However, according to this embodiment, the detailed shapes of views are not reflected in the shape of a corresponding product model. That is, the detailed shape of an edge of a product model appears only if it is projected on a view plane.

Thus, the CAD system can provide a two-dimensional projected figure with a detailed shape without forming a detailed shape of a product model by inputting geometric information about the shape of the product model, thereby reducing the total amount of input data.

According to the embodiment, the CAD system creates a particular shape of a detail such as an edge of a product model by adding an attribute to such an edge. Therefore, the CAD system can eliminate a three-dimensional forming process to provide a product model with a fillet or a chamfer, thereby lightening the load of the CAD system by reducing the amount of input data and three-dimensional processes. Furthermore, when a user intends to change the shape of a detail of a three-dimensional object, the user only changes the attribute added to the detail of the object. If users intend to obtain the original shape of a product model by cancelling all the particular shapes of details of the object, the user only erases all the shape attributes. In addition, since the CAD system creates two-dimensional projected figures of a three-dimensional product model, the detailed shape of which are defined by shape attributes such as a fillet attribute or a chamfer attribute, the CAD system can easily draw shaded lines required for realistically showing the shape of the object on a view plane to realize the realistic expression of details of a object on a two-dimensional drawing. That is, the CAD system can easily create shaded lines by adding an attribute about shaded lines to a product model and then performing a two-dimensional drawing process according on a two-dimensional projection of the product model.

The description will be directed to another embodiment of the present invention. The CAD system according to the embodiment is also provided with the structural elements shown in the block diagram of FIG. 12.

When a side or the like of a two-dimensional figure is modified by a user, the drawing processing section 20 provides the edge of the object which corresponds to the side with a projection attribute in accordance with the information about the modification to the two-dimensional figure. However, in the case that the modified figure is a two-dimensional drawn figure which is created by the user, the CAD system modifies the two-dimensional drawn figure by use of the two-dimensional drawing function of the CAD system. In the case that the modified two-dimensional figure is a two-dimensional projection of a product model, the CAD system determines the way of modifying the three-dimensional object according to the modification to the two-dimensional projected figure from the figure elements of the product model which correspond to the modified part of the two-dimensional projection and by reference to the information about the modification to the projection to obtain a processing procedure to realize the modification to the product model. Then, the CAD system performs the modification process on the product model. Furthermore, the CAD system obtains the processing procedure to recreate a two-dimensional projected figure which satisfies the two-dimensional modification made by the user and then performs the two-dimensional projection on the product model. To this end, the drawing processing section 20 projects not all the three-dimensional figure elements of the object, i.e., some of them onto view planes in accordance with projection attributes added to the three-dimensional object. That is, the CAD system Gives priority to reconstructing the two-dimensional projection which satisfies the modification which has previously been made by the user.

Hereinafter, the description will be directed to examples of the aforementioned operation of the CAD system according to this embodiment by reference to FIGS. 38 to 51. FIGS. 38 to 51 show operations of modifying some figure elements of a two-dimensional projected figure obtained by projection of a three-dimensional object by means of a two-dimensional modifying command. Reference numeral 501 in FIG. 38 denotes a three-dimensional object, reference numeral 502 in FIG. 39 denotes a two-dimensional projection obtained by projection of the three-dimensional object 501 onto a view plane, reference numerals 503 and 504 in FIG. 38 denote edges of the three-dimensional object, and reference numerals 505 and 506 in FIG. 39 denote two-dimensional projected figure elements obtained by projection of the edges 503 and 504 onto the view plane. Referring now to FIG. 40, it illustrates a part of the 2D–JD link data showing a correspondence between the three-dimensional object 501 and the two-dimensional projected FIG. 502 stored in the 2D–3D link data base 21. In this example, the projection attributes, i.e., the projection control flags of the edges 503 and 504 of the three-dimensional object are set to be "ON". Furthermore, the table shows that the two-dimensional projected figure elements 505 and 506 are obtained by projection of the edges 503 and 504.

Consider that a user modifies a figure element of the two-dimensional projected FIG. 502 by use of a two-dimensional modifying command such as a command of deleting the figure element, dividing the figure element into two parts, trimming the figure element, providing a corner of the figure element with a fillet, or the like. Next, the respective operations performed by the 2D and 3D integrated graphics processing section 15 for the respective modifying commands will be explained.

FIG. 41 shows an example of the operation of deleting the two-dimensional figure element, i.e., the side 505 of the two-dimensional projection 502. In this case, the 2D and 3D integrated graphics processing section 15 sets the projection control flag of the corresponding edge 503 of the three-dimensional product model 501 to be "OFF". As a result, the 2D–3D link data are updated as shown in FIG. 42.

FIG. 43 shows an example of the operation of dividing the two-dimensional figure element, i.e., the side 505 of the two-dimensional projection 502 into two-dimensional projected figure elements 505 and 507. In this case, the 2D and 3D integrated graphics processing section 15 divides the edge 503 of the three-dimensional object 501, which corresponds to the divided two-dimensional projected figure element 505, into edges 503 and 508, as shown in FIG. 44. Then, the 2D and 3D integrated graphics processing section 15 registers the 2D–3D link data showing a correspondence between the two-dimensional projected figure element 507 and the edge 508 as a new entry on the 2D–3D link data base 21, with the projection control flag of the edge 508 being kept in "ON" state. As a result, the 2D–3D link data are updated as shown in FIG. 45.

FIG. 46 shows an example of the operation of trimming the two-dimensional figure element 505, i.e., cutting off a part of the side 505 of the two-dimensional projection 502. In this case, the 2D and 3D integrated graphics processing section 15 divides the edge 503 of the three-dimensional object 501, which corresponds to the trimmed two-dimensional projected figure element 505, into edges 503 and 509, as shown in FIG. 47. Then, the 2D and 3D integrated graphics processing section 15 produces and registers the 2D–JD link data for the edge 509 as a new entry on the 2D–3D link data base 21, with the projection control flag of the edge 509 being set to be in "OFF" state. The field for two-dimensional figure elements which corresponds to the edge 509 is kept being empty. As a result, the 2D–JD link data are updated as shown in FIG. 48.

Figure 51:
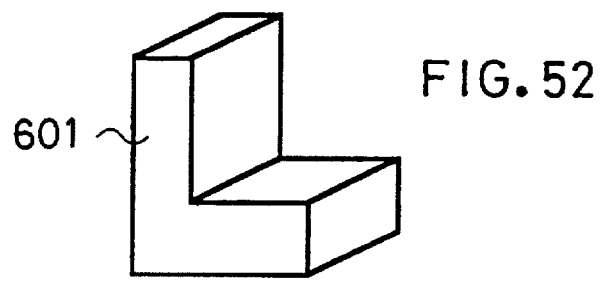
FIG. 51 is a part of a table showing projection control flags of two-dimensional figure elements of the modified view in FIG. 49.
Figure 52:
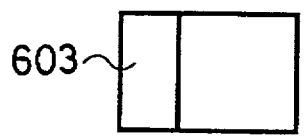
FIG. 52 is a diagram showing a solid object on which a modifying operation is performed by a CAD system according to an embodiment of the present invention.
Figure 53:
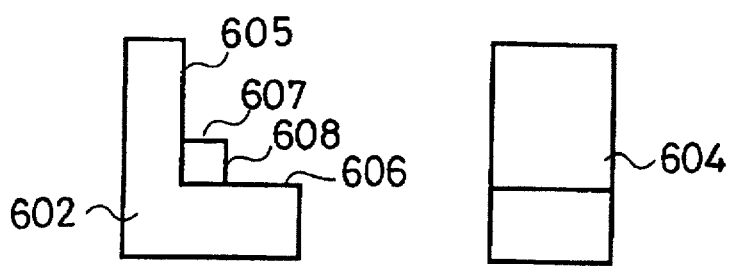
FIG. 53 is a diagram showing views of the solid object in FIG. 52 to which a two-dimensional drawn figure is connected.

FIG. 49 shows the operation of providing the corner where the two-dimensional figure elements 505 and 506 join with a fillet 510. In this case, the 2D and 3D integrated graphics processing section 15 divides the edges 503 and 504 of the three-dimensional object 501, which correspond to the two-dimensional projected figure elements 505 and 506, into edges 503 and 511 and edges 504 and 512, respectively, as shown in FIG. 50. Then, the 2D and 3D integrated graphics processing section 15 produces and registers the 2D–3D link data for the edges 511 and 512 as new entries on the 2D–3D link data base 21, with the projection control flags of the edges 511 and 512 being set to be in "OFF" state. The fields for two-dimensional figure elements which correspond to the edges 511 and 512 are kept being empty. As a result, the 2D–3D link data are updated as shown in FIG. 51. The two-dimensional fillet is created as a two-dimensional drawn figure, not a projection.

After the graphics processing section 20 completes any one of such the operations, it recreates or updates views in accordance with all the projection control flags of all the three-dimensional figure elements of a product model. The graphics processing section 20 performs a projection operation on all the figure elements of the object the projection control flags of which are set to be in "ON" state. That is, it omits to project a figure element the projection flag of which is set to be in "OFF" state. Therefore, the CAD system makes it possible to eliminate restrictions on a modifying operation on a two-dimensional projected figure by means of such the projection operation while maintaining a correspondence between two-dimensional projected figures and a corresponding product model, thereby providing a high level drawing processing.

When a two-dimensional projected figure is modified by a user, the CAD system reconstructs a product model and creates a two-dimensional drawing from the modified two-dimensional projected figure in consideration of a user's intention. However, the modification to a two-dimensional projection will not be reflected in a reconstructed product model. Thus, users do not need to conceive an operation to modify the shape of a three-dimensional object so as to obtain the desired shape of a two-dimensional projected figure of the three-dimensional object. In addition, there is no limit to modifying operations to a two-dimensional projected figure. That is, the two-dimensional drawing function of a conventional CAD system provides a modifying operation, such as a precise translation or a precise change of the shape of a view, on a figure element of a view such as a line segment, a circular arc, or the like, however, in General the three-dimensional shaping function does not provide such a precise modifying operation in three space. Thus, since the three-dimensional shaping function has more limitations than the two-dimensional drawing function, there does not exist all the three-dimensional shaping operations which correspond to all the two-dimensional drawing operations respectively. Therefore, a two-dimensional operation on a two-dimensional projected figure is limited within a region where a corresponding three-dimensional operation is applicable. To eliminate the limitation, the aforementioned means of the CAD system for creating a two-dimensional figure based on projection attributes provides a modifying operation on a two-dimensional projected figure which has the same degree of freedom as a modifying operation on a two-dimensional drawn figure which is not a projection of an object. Therefore, users do not need to worry about the possibility that an intended two-dimensional operation is performed and conceive two-dimensional drawing operations to obtain a desired three-dimensional shaping operation.

The description will be directed to another embodiment of the present invention. The CAD system according to this embodiment is also provided with the structural elements shown in the block diagram of FIG. 12.

If a two-dimensional projected figure, which is in contact with a two-dimensional figure drawn by a user, is modified, the 2D and 3D integrated graphics processing section 15 of the CAD system automatically performs a modification operation on the two-dimensional drawn figure linked with the modification to the view by reference to the information about the connection between the two-dimensional projection and the two-dimensional drawn figure. That is, the CAD system is adapted to move or transform a two-dimensional drawn figure element which is drawn by a user in accordance with a modification to a two-dimensional drawn figure element which belongs to a projection of a product model and in consideration of the connection between the two-dimensional drawn figure element and the two-dimensional projected figure element. To this end, the 2D and 3D integrated graphics processing section 15 is adapted to detect the connection between the two-dimensional drawn figure and the two-dimensional projection, compute modification parameters, which are required for maintaining the connection between the figures, such as an amount of movement of the two-dimensional drawn figure, an amount of transformation of the two-dimensional drawn figure and the like, and then perform the modification operation defined by the modification parameters on the drawn two-dimensional drawn figure.

Next, the description will be directed to an example of the operation of the CAD system according to this embodiment by reference to FIGS. 52 to 55. FIGS. 52 to 55 show a modification to a two-dimensional projected figure followed by a modification to a two-dimensional drawn figure which is produced by a user by using the information about a connection between the two-dimensional projected figure obtained by projection of a three-dimensional object and the two-dimensional drawn figure. Reference numeral 601 in FIG. 52 denotes a three-dimensional object which is the target of projection, reference numerals 602, 603 and 604 in FIG. 53 denote two-dimensional projections, i.e., a front view, a top view and a right side view obtained by projection of the three-dimensional object 601 onto view planes, reference numerals 605 and 606 in FIG. 53 denote figure elements, i.e., sides of the two-dimensional projection 602, and reference numerals 607 and 608 in FIG. 53 denote figure elements, i.e., sides of a two-dimensional which is created by a user. In this example, one ends of the two-dimensional drawn figure elements 607 and 608 are connected with each other with the figure elements being perpendicular to each other, and the other ends of the two-dimensional drawn figure elements 607 and 608 are connected with the figure elements 605 and 606 of the two-dimensional projection 602, respectively.

Figure 54:
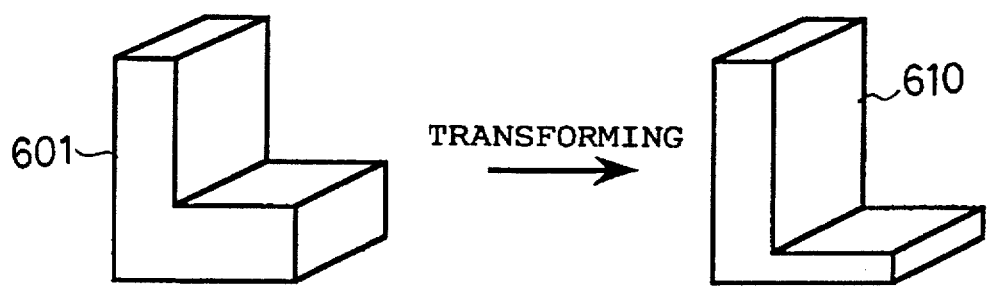
FIG. 54 is a diagram showing a transformation of the solid object shown in FIG. 52.

Consider that a user transforms the three-dimensional object 601 into a three-dimensional object 610 by a modification to the two-dimensional projection 602 to translate the projected figure element 606 in parallel with itself, as shown in FIG. 54. Then, the drawing processing section 20 recreates two-dimensional projected FIGS. 612, 613 and 614 shown in FIG. 55, which correspond to the two-dimensional projections 602, 603 and 604, based on the transformed three-dimensional object 601.

The 2D and 3D integrated graphics processing section 15 obtains the information about the connection between the two-dimensional drawn figure one end of which is connected with the two-dimensional projected figure and the two-dimensional projection in advance of the update process for the projections. For example, the 2D and 3D integrated graphics processing section 15 computes distances between all the ends of the figure elements of the two-dimensional drawn figure and all the figure elements of the two-dimensional projection and presumes that every end, which is within a predetermined distance from each figure element of the projection, is connected with the figure element.

After the graphics processing section 20 completes the aforementioned updating process for the two-dimensional projection, after the updating process is completed the 2D and 3D integrated graphics processing section 15 judges whether or not the two-dimensional drawn figure is still connected with the figure elements of the two-dimensional projection. If there is a two-dimensional drawn figure element which is not connected with the modified projection among the figure elements of the two-dimensional drawn figure after the updating process is finished, the 2D and 3D integrated graphics processing section 15 determines whether the separated figure element can be connected with the modified two-dimensional projected figure again by performing a transformation of the figure element such as a translation, a rotation, a trimming, an extension, or a combination of some of them. If there is a possibility of success, the 2D and 3D integrated graphics processing section 15 performs a transformation operation on the figure element to modify the two-dimensional drawn figure. In the example shown in FIGS. 53 to 55, since there is a possibility that the two-dimensional drawn figure elements 607 and 608 connects with the figure elements 615 and 616 of the two-dimensional projection 612 by translating the figure elements 607 and 608, the 2D and 3D integrated graphics processing section 15 performs the translation operations on the figure elements, respectively.

Figure 55:
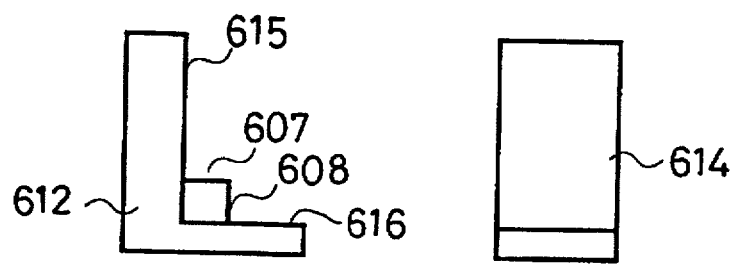
FIG. 55 is a diagram showing views of the solid object obtained by automatically modifying the two-dimensional drawn figure which was connected with solid object in connection with the modification to the view show in FIG. 54.
Figure 56:
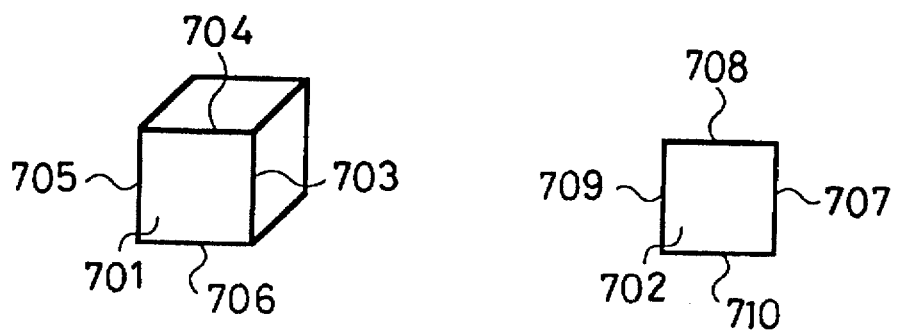
FIG. 56 a diagram showing a solid object and a view on which a modifying operation is performed by a CAD system according to an embodiment of the present invention.

The result of the above operations on the product model is shown in FIG. 55. Thus, the modifying operation on the two-dimensional projection 602 is automatically followed by the modifying operation on the two-dimensional drawn figure elements 607 and 608 which were connected with the projection. That is, when a projection is modified by a user, the CAD automatically modifies not only other projections but also a two-dimensional drawn figure which was connected with the modified projection before the modification. Thereby, the efficiency of drawing work can be improved, since users do not need to check a connection between a two-dimensional drawn figure and a two-dimensional projected figure and perform a transformation operation on the two-dimensional drawn figure.

When a user draws a two-dimensional drawn figure in addition to a two-dimensional projection in such a manner that the figure is in contact with the projection, the CAD system concludes that they have a close relationship between the added figure and the two-dimensional projected figure and it is necessary to manipulate both of them sequentially. In this embodiment, if a two-dimensional projected figure, which is connected with a two-dimensional drawn figure created by a user, is modified for the purpose of a modification to a product model, the CAD system automatically performs a modification operation on the two-dimensional drawn figure linked with the modification to the view if necessary, thereby eliminating a further user's operation to modify the two-dimensional drawn figure through the two-dimensional modifying function of the CAD system. The description will be directed to another embodiment of the present invention. The CAD system according to this embodiment is also provided with the structural elements shown in the block diagram of FIG. 12.

The 2D to 3D transformation processing section 17 is adapted to transform figure elements of a two-dimensional drawn figure created by a user into three-dimensional figure elements and add them to an existing product model by reference to information about a connection between the figure elements of the two-dimensional drawn figure and a two-dimensional projected figure of a product model. According to the CAD system of this embodiment, when a user creates a two-dimensional drawn figure in addition to a two-dimensional projection, which has been previously opened by the system of the embodiment shown in FIGS. 38 to 51, in such a manner that the figure is in contact with the periphery of the opening of the projected figure, the 2D and 3D integrated graphics processing section 15 detects the connection and determines whether the addition of such the two-dimensional drawn figure is intended to modify the shape of the product model which is the source of the projection. If the addition is intended to modify the shape of the product model, the 2D and 3D integrated graphics processing section 15 enables the 2D to 3D transformation processing section 17 to transform the two-dimensional modifying operation into a corresponding three-dimensional modifying operation, e.g., a local operation of adding a corresponding three-dimensional object to the existing product model. That is, the CAD system judges that a modifying operation of adding a figure created by a user to an opening of a projection is intended to modify the corresponding object which is the origin of the projection. Therefore, users are able to perform such the three-dimensional operation without thinking of how to manipulate a complicated three-dimensional operation to obtain a desired product model.

Next, the description will be directed to an example of the operation of the 2D and 3D integrated CAD system according to this embodiment by reference to FIGS. 56 to 60. FIGS. 56 to 60 show a transformation of a two-dimensional drawn figure created by a user into three-dimensional figure elements and add them to an existing product model by reference to information about a connection between the two-dimensional drawn figure and a two-dimensional projected figure of a product model. Reference numeral 701 in FIG. 56 denotes a three-dimensional object which is the target of projection, reference numeral 702 denotes a two-dimensional projection, i.e., a front view obtained by projection of the three-dimensional object 701 onto a view plane. In the figure, the edges 703, 704, 705 and 706 of the three-dimensional object 701 correspond to the figure elements 707, 708, 709 and 710 of the two-dimensional projected FIG. 702. The correspondence between them is stored in the 2D–3D link data base 21.

Figure 57:
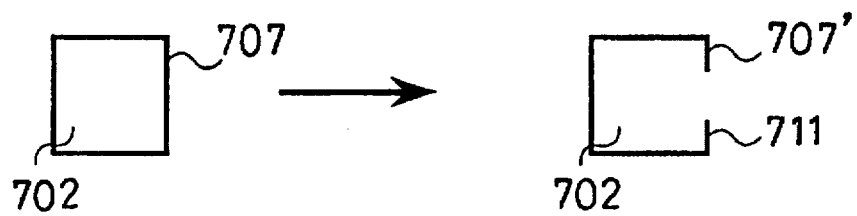
FIG. 57 is a diagram showing a modification to the view in FIG. 56.
Figure 58:
FIG. 58 is a diagram showing the modification to the solid object which corresponds to the modification to the view shown in FIG. 57.

Consider that a user trims a figure element of the two-dimensional projection 702, e.g., the side 707, and divides the side 707 into figure elements 707' and 711 by means of a modifying operation, as shown in FIG. 57. As shown in FIG. 58, the 2D and 3D integrated graphics processing section 15 divides the edge 703' of the three-dimensional object 701, which corresponds to the figure element 707', into three edges 703', 712 and 713 by means of a modifying method, e.g., the method according to the aforementioned embodiment shown in FIGS. 38 to 51. Applying this method to this case, the projection control flag of the edge 712 is set to be in "OFF" state in order to establish a correspondence between the modified two-dimensional projected FIG. 702 and the three-dimensional object 701.

Figure 59:
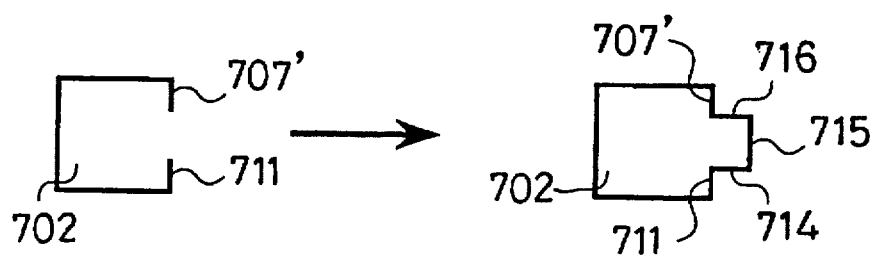
FIG. 59 is a diagram showing an operation to connect the modified the view shown in FIG. 57 with a two-dimensional drawn figure.
Figure 60:
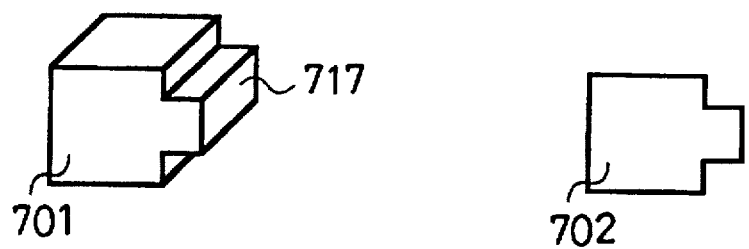
FIG. 60 is a diagram explaining a transformation the added two-dimensional drawn figure in FIG. 59 into a corresponding solid for modifying the original shape of the solid object.

Furthermore, consider that the user creates a two-dimensional drawn figure having figure elements 714, 715 and 716 in addition to the modified projection 702 in such a manner that the figure is in contact with the figure elements 707' and 711 of the view 702, as shown in FIG. 59. The 2D and 3D integrated drawing processing 15 detects that the two-dimensional drawn figure composed of the figure elements 714, 715 and 716 is connected with the figure elements 707' and 711 of the two-dimensional objection 702, and then obtains the edges 703' and 713 which correspond to the figure elements 707' and 711. The 2D and 3D integrated drawing processing 15 determines that the added two-dimensional drawn figure is a figure for requesting a modification to the three-dimensional object 701 in consideration of the fact that the projection control flag of the edge 712 located between the edges 703' and 713 is in "OFF" state. The 2D and 3D integrated drawing processing 15 enables the 2D to 3D transformation processing section 17 and solid object building section 18 to reconstruct the product model by adding a partial solid 717 in FIG. 60, which is obtained by extension of the two-dimensional figure in the direction perpendicular to the view plane in FIG. 59, to the original three-dimensional product model 701. The result of the operation of transforming the shape of the three-dimensional object 701 into the shape with the partial solid 717 is shown in FIG. 60.

Thus, the CAD system provides such a CAD environment in which users are able to perform such the three-dimensional modifying operation without thinking of how to manipulate a complicated three-dimensional operation to obtain a desired product model, thereby reducing the user's time required for processing and hence improving the efficiency of drawing work. Furthermore, users do not need to master such a complicated three-dimensional operation.

As mentioned above, the CAD system judges that the addition of a two-dimensional figure in a drawing with the figure being connected to a two-dimensional projection means a close relationship between the added figure and the two-dimensional projected figure. Both of them need to be manipulated in connection with each other. According to this embodiment, the linkage between the addition of a two-dimensional drawn figure and the three-dimensional operation for reconstructing a product model makes it possible for users to perform such the three-dimensional operation without thinking of how to manipulate a complicated three-dimensional operation to obtain a desired product model.

As previously mentioned, the present invention offers the following advantages.

In particular, the CAD system according to an embodiment of the present invention makes it possible to construct a product model by use of graphic data or annotations on a drawing by reference to placement rules governing the CAD drafting, and hence it provides a CAD environment in which users are able to build a three-dimensional product model in such a manner as to create a normal drawing.

The CAD system according to an embodiment of the present invention makes it possible to build a product model in accordance with attributes provided by users. Therefore, users are able to construct a product model by using terms which are familiar to users.

The CAD system according to an embodiment of the present invention makes it possible to automatically create a plurality of views such as a front view, a top view and a right side view from a product model. Therefore, the time required for creating or editing a drawing can be reduced, and inconsistency between the views can be prevented.

The CAD system according to an embodiment of the present invention makes it possible to perform a three-dimensional placement operation for arranging an object in three-dimensional model space by using information about a drawing which has been already created, thereby reducing input processes and input data required for the three-dimensional placement. Users are able to manipulate product models with a two-dimensional CAD function which is familiar to users. Therefore, the time required for users to obtain such a three-dimensional placement operation can be reduced and the efficiency of drawing work can be improved.

The CAD system according to an embodiment of the present invention makes it possible to perform a three-dimensional placement operation for arranging an object in three-dimensional model space in accordance with drawing regulations, thereby reducing input processes and input data required for the three-dimensional placement. Users are able to manipulate product models with a two-dimensional operation which is familiar to users. Therefore, the time required for users to obtain such a three-dimensional placement operation can be reduced and the efficiency of drawing work can be improved.

The CAD system according to an embodiment of the present invention makes it possible to automatically compute placement parameters in three space for arranging an object by using information about a two-dimensional figure which is selected as a reference figure for arranging the object, information about the shape of the solid object and information about projections of the object on a plurality of view planes. Therefore, the time required for users to obtain such a three-dimensional placement operation can be reduced, and hence input data and processes required for the three-dimensional placement operation can be reduced. Users are able to manipulate a product model by means of a two-dimensional operation which is familiar to users without performing a complicated calculation of projection of the object. Thereby, the time required for users to obtain such a three-dimensional placement operation can be reduced, and hence the efficiency of drawing work can be improved.

The CAD system according to an embodiment of the present invention makes it possible to automatically compute placement parameters in three space for arranging an object by using information about a two-dimensional figure on which a projection of the object is to be placed, information about the shape of the solid object and information about projections of the object on other view planes. Therefore, users are able to manipulate the product model by means of a two-dimensional operation and then perform a three-dimensional placement operation on the object without thinking of a complicated three-dimensional operation to arrange the product model. Thereby, the time required for users to obtain such a three-dimensional placement operation can be reduced, and hence the efficiency of drawing work can be improved.

The CAD system according to an embodiment of the present invention makes it possible to eliminate a three-dimensional forming process to provide a product model with a fillet or a chamfer, thereby lightening the load of the CAD system. Therefore, the response of a computer which constructs the CAD system is improved, so that CAD operations can be performed more smoothly. Furthermore, since only a change of attributes makes it possible to change the shape of an object and obtain the original shape of an object, users can easily make a change of design. In addition, since the CAD system can easily draw shaded lines required for realistically showing the shape of an object on a drawing. Thereby, drawings with high quality can be created automatically.

When a two-dimensional projection is modified by a user, the CAD system according to an embodiment of the present invention makes it possible to reconstruct a product model and creates a two-dimensional drawing from the modified two-dimensional projected figure in consideration of the user's intention. Therefore, users do not need to conceive an operation to modify the shape of a three-dimensional object so as to obtain the desired shape of a two-dimensional projected figure of the three-dimensional object, and hence the time required for examination of such an operation and the efficiency of design work is improved. In addition, the CAD puts no limit on modifying operations on a two-dimensional projected figure, thereby providing a high level drawing environment.

When a two-dimensional projection is modified by a user, the CAD system according to an embodiment of the present invention makes it possible to automatically modify not only other projections but also a two-dimensional drawn figure which has a close relationship with the modified projection in connection with the modification to the two-dimensional projected figure. Thereby, the efficiency of drawing work can be improved, since users do not need to check a connection between the two-dimensional drawn figure and the modified two-dimensional projected figure and perform a transformation operation on the two-dimensional drawn figure.

The CAD system according to an embodiment of the present invention makes it possible to perform a local operation, which is a kind of three-dimensional shaping operation, on a two-dimensional drawing. Therefore, users are able to perform such a three-dimensional operation without thinking of how to manipulate a complicated three-dimensional operation required for a local operation in order to obtain a desired product model. Users are able to manipulate product models with a two-dimensional operation which is familiar to users. Therefore, the time required for users to manipulate a product model or the like can be reduced and hence the efficiency of drawing work can be improved. Furthermore, users do not need to master such a complicated three-dimensional operation.

Many widely different embodiments of the present invention may be constructed without departing from the spirit of scope of the present invention. It should be understood that the present invention is not limited to the specific embodiments described in the specification, except as defined in the appended claims.

What is claimed is:

1. A CAD system for creating a product model from a two dimensional drawing, said CAD system comprising:

means for defining a correspondence between predetermined drawing regulations and three-dimensional objects;

means for building a three dimensional product model on the basis of a two-dimensional drawing, which is created under one of said predetermined drawing regulations, by reference to said means for defining; and means for creating a plurality of two-dimensional views of the three-dimensional product model constructed by said means for building by reference to said means for defining and in accordance with a shape attribute added to a view of the product model.

2. A CAD system according to claim 1, wherein said CAD system further comprises means, responsive to an instruction input by users, for providing a two-dimensional drawing with shape attribute for showing a three-dimensional shape of a corresponding product model, and wherein said means for building forms a shape of a product model in accordance with shape attribute added to a view of the product model.

3. A CAD system according to claim 1, wherein said means for building includes means for modifying a product model in accordance with a modification to a view of the product model, and after the modification by said means for modifying said view means for creating creates other views of the product model modified by said means for modifying.

4. A CAD system for creating a product model from a two-dimensional drawing, said CAD system comprising:

means, responsive to an instruction input by users, for providing a two-dimensional drawing with a shape attribute for showing a three-dimensional shape of a corresponding product model;

means for building a three-dimensional product model from a two-dimensional drawing in accordance with a shape added to a view of the product model; and means for creating a plurality of views of a three-dimensional product model constructed by said building means in accordance with a shape attribute added to a view of the product model.

5. A CAD system according to claim 4, wherein said means for building includes means for modifying a product model in accordance with a modification to a view of the product model, and after the modification by said means for modifying said view creating means creates other views of the product model modified by said means for modifying.

6. A CAD system comprising:

projection means for creating two-dimensional projected figures by projection of a three-dimensional product model;

means for storing information about a correspondence between two-dimensional projected figures and a three-dimensional product model which is the origin of the two-dimensional projected figures;

means for defining rules each for relating a predetermined piece of information about drawings to a placement or a construction of a three-dimensional product model; and means, responsive to an input command of placement and one said predetermined piece of information given, for arranging a two-dimensional projected figure, which is the target of the input command, on a drawing in accordance with a rule which corresponds to the given piece of information and by reference to information about a correspondence between the view and a corresponding three-dimensional product model stored in said means for storing, and for arranging the corresponding product model in three-dimensional model space in accordance with the placement of the two-dimensional projected figure.

7. A CAD system according to claim 6, wherein said means for defining defines a rule for relating an annotation such as a symbol, note or the like shown on a drawing as one said determined piece of information about drawings to a placement of a two-dimensional projected figure on the drawing which is the target of the input command so as to arrange a corresponding product model in three-dimensional model space.

8. A CAD system according to claim 7, wherein said annotation is any one of characters or a symbol for showing an absolute direction in three-dimensional model space or a direction relative to a two-dimensional figure, and a symbol for showing a shape of a corresponding product model.

9. A CAD system according to claim 6, wherein said means for defining defines a rule for relating a predetermined two-dimensional figure such as a dashed line segment, a dashed cross line or the like, which is based on a drawing method defined by drawing regulations, input by users as one said predetermined piece of information about drawings to a placement of a two-dimensional projected figure on a drawing which is the target of the input command so as to arrange a corresponding product model in three-dimensional model space.

10. A CAD system according to claim 9, wherein when one said predetermined piece of information about drawings is given on a two-dimensional projected figure of an existing three-dimensional object on a view plane, said means for building creates and arranges a two-dimensional projection of another three-dimensional object on the former view in accordance with the given piece of information about drawings, and, in order to determine a position of the other three-dimensional object in a direction perpendicular to the view plane, said means for building searches for at least a surface of the existing three-dimensional object which intersects with a three-dimensional figure obtained by indefinitely extending the other object in the direction.

11. A CAD system according to claim 6, wherein said means for defining defines a rule for relating at least a two-dimensional figure on a drawing and at least a part of a three-dimensional object which are selected as one said predetermined piece of information about drawings by users by establishing a correspondence between the two-dimensional figure and the part of the three-dimensional object to a placement of a two-dimensional projected figure of the object on the drawing for making the view overlap the two-dimensional figure so as to arrange the corresponding object in three-dimensional model space.

12. A CAD system according to claim 6, wherein said means for defining defines a rule for relating at least a two-dimensional figure on a drawing and at least a part of a three-dimensional object which are selected as one said piece of information about drawings by users by establishing a correspondence between the two-dimensional figure and the part of the three-dimensional object to a placement of a two-dimensional projected figure of the object on the drawing for making the center of the view overlap the center of the two-dimensional figure so as to arrange the corresponding object in three-dimensional model space.

13. A CAD system according to claim 6, wherein said means for defining defines a rule for relating at least a two-dimensional figure and at least a part of a two-dimensional figure on a view plane which are selected as one said piece of information about drawings by users by establishing a correspondence between the parts of the two-dimensional figures to a placement of the two-dimensional figures on the view plane for making the part of one of the two-dimensional figures abut on the part of the other figure and for arranging corresponding objects in three-dimensional model space in consideration of other two-dimensional figures of the objects on another view plane, at least one of which is obtained by projection of the corresponding object, which correspond to the former two-dimensional figures, respectively.

14. A CAD system according to claim 6, wherein said CAD system further comprises means for providing an edge of a three-dimensional product model with a shape attribute showing a detailed shape such as one of a fillet, and a chamfer and wherein when creating two-dimensional projected figures from a constructed product model said projection means creates them in accordance with a shape attribute added to the product model so that a projection of an edge with the shape attribute has a corresponding detailed shape.

15. A CAD system according to claim 6, wherein said CAD system further comprises means, according to a modification to a part of a two-dimensional projected figure of a three-dimensional product model, for providing an edge of the product model, which corresponds to the part of the view, with a projection attribute showing a way of projection of the edge on a view plane, which depends on the modification to the two-dimensional projected figure, and wherein when creating two-dimensional projected figures from a constructed product model said projection means creates them in accordance with a projection attribute added to the product model.

16. A CAD system according to claim 15, wherein said CAD system comprises means, according to a connection of a two-dimensional figure with a modified two-dimensional projected figure, for creating a three-dimensional figure which is connected with a three-dimensional object which corresponds to the modified two-dimensional projected figure from the added two-dimensional figure by reference to information about the connection between the two-dimensional projected figure and the two-dimensional figure and information about projection attributes.

17. A CAD system according to claim 6, wherein said CAD system comprises means for modifying a two-dimensional figure which is associated with a two-dimensional projected figure in accordance with a modification to the view and by reference to information about a relationship between the two-dimensional figure and the two-dimensional projected figure before the modification is performed and information about a correspondence between the modified two-dimensional projected figure and a corresponding product model stored in said means for storing.

18. A CAD system comprising:

projection means for creating a two-dimensional projected figure by projection of a three-dimensional project model;

means for storing information about a correspondence between two-dimensional projected figures and a product model which is the origin of the two-dimensional projected figures;

means for providing an edge of a three-dimensional product model with an attribute showing a detailed shape such as one of a fillet, and a chamfer; and means for creating a two-dimensional projected figure by reference to an attribute added to a corresponding product model so that a projection of an edge with an attribute has a corresponding detailed shape when said projection means creates two-dimensional projected figures from the product model.

19. A CAD system comprising:

projection means for creating two-dimensional projected figures by projection of a three-dimensional product model;

means for storing information about a correspondence between two-dimensional projected figures and a three-dimensional product model which is the origin of the two-dimensional projected figures; and means, according to a modification to a part of a two-dimensional projected figure of a three-dimensional product model, for providing an edge of the product model, which corresponds to the part of the view, with a projection attribute showing a way of projection of the edge on a view plane, which depends on the modification to the two-dimensional projected figure, said projection means having means for creating two-dimensional projected figures from a constructed product model in accordance with a projection attribute added to the product model.

20. A CAD system according to claim 19, wherein said CAD system comprises means for modifying a two-dimensional figure which is associated with a two-dimensional projected figure in accordance with a modification to the view and by reference to information about a relationship between the two-dimensional figure and the two-dimensional projected figure before the modification is performed and information about a correspondence between the modified two-dimensional projected figure and a corresponding product model stored in said means for storing.

21. A CAD system comprising:

projection means for creating a two-dimensional projected figure by projection of a three-dimensional product model;

means for storing information about a correspondence between two-dimensional projected figures and a product model which is the origin of the two-dimensional projected figures;

means for modifying a two-dimensional figure which is associated with a two-dimensional projected figure in accordance with a modification to the view and by reference to information about a relationship between the two-dimensional figure and the two-dimensional projected figure before the modification is performed and information about a correspondence between the modified two-dimensional projected figure and a corresponding product model stored in said means for storing.

* * * * *